US012442944B2

(12) United States Patent
Petrovic et al.

(10) Patent No.: US 12,442,944 B2
(45) Date of Patent: Oct. 14, 2025

(54) DEPLOYMENT OF QUASI-PLANAR SHOCK WAVE GENERATORS IN ASSOCIATION WITH SEISMIC EXPLORATION

(71) Applicant: Orica International Pte Ltd, Singapore (SG)

(72) Inventors: Eddie Petrovic, Brunswick (AU); Clint Brealey, Montmorency (AU); Steve Kotsonis, Brunswick (AU); Melanie Bradley, Essendon (AU); Dale S. Preece, Saratoga Springs, UT (US)

(73) Assignee: Orica International Pte Ltd, Singapore (SG)

( * ) Notice: Subject to any disclaimer, the term of this patent is extended or adjusted under 35 U.S.C. 154(b) by 341 days.

(21) Appl. No.: 17/596,573

(22) PCT Filed: Jun. 26, 2020

(86) PCT No.: PCT/SG2020/050371
§ 371 (c)(1),
(2) Date: Dec. 13, 2021

(87) PCT Pub. No.: WO2020/263194
PCT Pub. Date: Dec. 30, 2020

(65) Prior Publication Data
US 2022/0236433 A1    Jul. 28, 2022

Related U.S. Application Data

(60) Provisional application No. 62/867,193, filed on Jun. 26, 2019.

(51) Int. Cl.
*G01V 1/104* (2006.01)
*F42D 1/055* (2006.01)
(Continued)

(52) U.S. Cl.
CPC ............ *G01V 1/104* (2013.01); *F42D 1/055* (2013.01); *F42D 3/00* (2013.01); *G01S 19/01* (2013.01);
(Continued)

(58) Field of Classification Search
CPC .. G01V 1/104; G01V 1/181; G01V 2210/121; G01V 2210/1299;
(Continued)

(56) References Cited

U.S. PATENT DOCUMENTS 2,601,522 A    6/1952    Heiland
2,615,522 A    10/1952    Poulter
(Continued)

FOREIGN PATENT DOCUMENTS

WO    WO 2018/224585    12/2018

OTHER PUBLICATIONS

Carton, E. P., Ph.D.; "Air Blast Mitigation Using Water Foam Coverage"; Conference Paper. Conference: Military Aspects of Blast and Shock (25th MABS), At The Hague (The Netherlands) Sep. 28, 2018 (7 pages).
(Continued)

*Primary Examiner* — Isam A Alsomiri
*Assistant Examiner* — Abdallah Abulaban
(74) *Attorney, Agent, or Firm* — Nixon Peabody LLP

(57) ABSTRACT

Disclosed is a geophysical or seismic exploration system. The system comprises a set of explosive device magazines configured for carrying a plurality of explosive device components, wherein the explosive device components are configurable to form individual explosive devices, and wherein each explosive device carries a set of explosive compositions and is configured for collimating an explosive shock wave produced thereby into a quasi-planar shock wave output from a distal end of the explosive device to
(Continued)

produce a geophysical or seismic exploration wave. The system also includes a set of unmanned explosive device deployment support vehicles, wherein each unmanned explosive device deployment support vehicle comprises an aerial or land-based unmanned vehicle configured for carrying an explosive device magazine and delivering the explosive device magazine to a first in-field location at which each explosive device is deployable for carrying out a geophysical or seismic exploration operation.

3 Claims, 31 Drawing Sheets

(51) Int. Cl.
*F42D 3/00* (2006.01)
*G01S 19/01* (2010.01)
*G01V 1/18* (2006.01)

(52) U.S. Cl.
CPC ........ *G01V 1/181* (2013.01); *G01V 2210/121* (2013.01); *G01V 2210/1299* (2013.01); *G01V 2210/1425* (2013.01)

(58) Field of Classification Search
CPC ... G01V 2210/1425; F42B 1/055; F42D 3/00; G01S 19/01
See application file for complete search history.

(56) References Cited

U.S. PATENT DOCUMENTS

| | | |
|---|---|---|
| 3,431,848 A | 3/1969 | Foster |
| 3,856,095 A | 12/1974 | Adair |
| 4,442,018 A | 4/1984 | Rand |
| 6,701,818 B1 | 3/2004 | O'Dwyer |
| 9,797,693 B1 | 10/2017 | Patel |
| 2005/0022657 A1* | 2/2005 | O'Dwyer ............... F42B 5/035 89/1.41 |
| 2015/0138917 A1 | 5/2015 | Jurok |
| 2018/0246234 A1 | 8/2018 | Chatenay |
| 2018/0357885 A1* | 12/2018 | Estival ................... G08B 21/00 |

OTHER PUBLICATIONS

Del Prete, E. et al.; "Blast wave mitigation by dry aqueous foams"; Shock Waves, 23:39-53; Aug. 2, 2012 (15 pages).
Hartman, W. F. et al.; "Blast Mitigation Capabilities of Aqueous Foam"; Sandia report prepared by Sandia National Laboratories Albuquerque, NM; Feb. 2006 (98 pages).
Pater, L. L. et al.; "Use of Foam to Reduce Gun Blast Noise Levels"; An Internet report by the US Naval Surface Weapons Centre; Mar. 1981 (86 pages).
Raspet, R.; "Use of Aqueous Foam to Mitigate Demolitions Noise"; Technical Report N-112 by the US Army Construction Engineering Research Laboratory; Dec. 1981 (42 pages).
Raspet, R. et al. "The Reduction of Blast Overpressures from Aqueous Foam in a Rigid Confinement"; Applied Acoustics, vol. 22, pp. 33-45; 1987; 0003-682X/87/S03-50 (11 pages).
Van der Eerden, F. et al.; "Mitigation of open-Air explosions by blast absorbing barriers and foam"; Conference Paper, Conference: 41st International Congress and Exposition on Noise Control Engineering 2012 (INTER-NOISE 2012); Jan. 2012 (12 pages).
International Search Report and Written Opinion of International Searching Authority for Application No. PCT/SG2020/050371, mailed Oct. 6, 2020 (13 pages).
Examination Report No. 1 in related Australian Patent Application No. 2020303855, dated May 12, 2025 (3 pages).

* cited by examiner

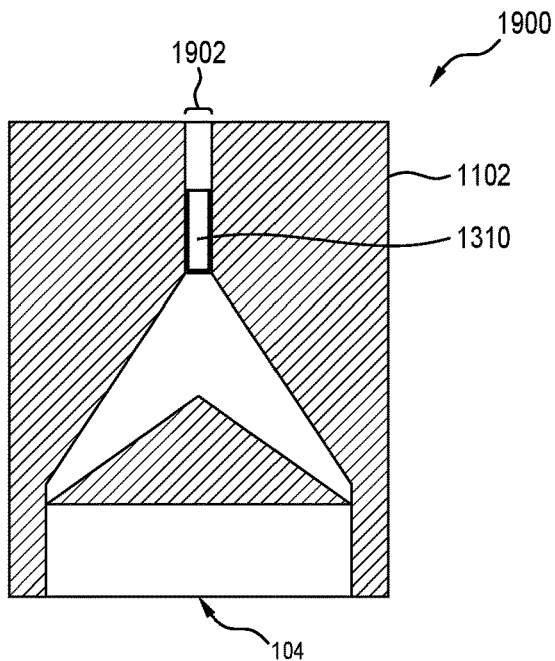
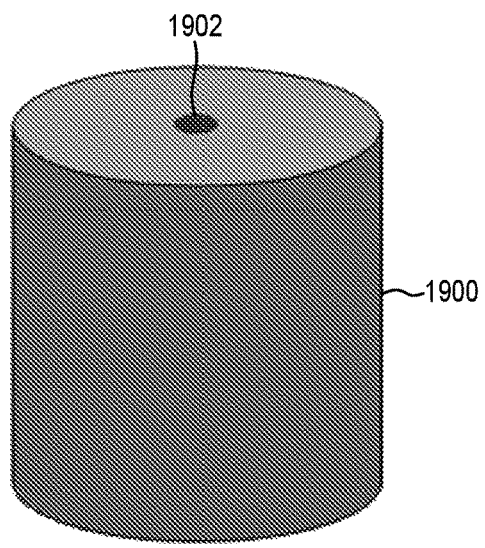
Figure 9A    Figure 9B
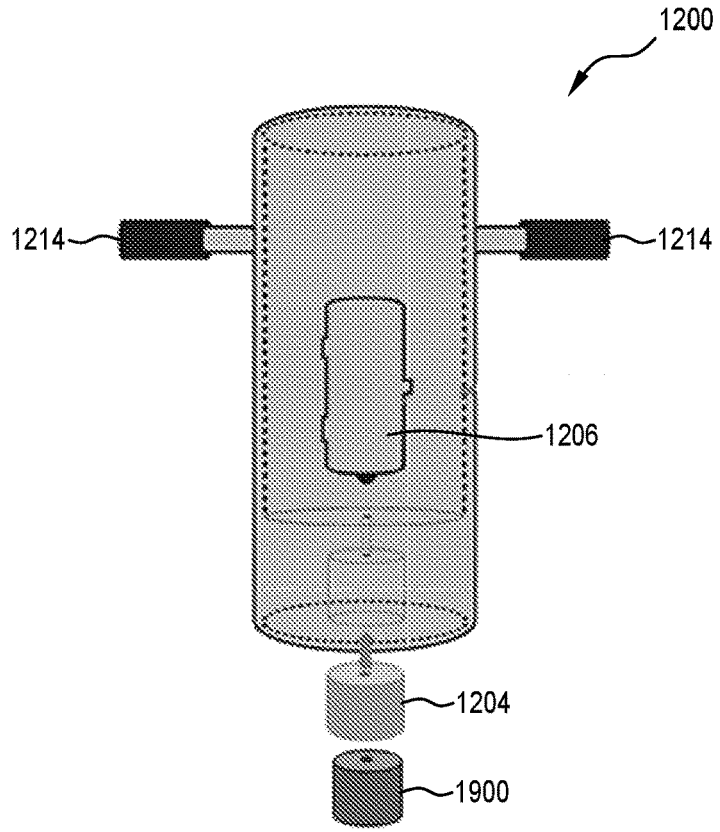
Figure 10

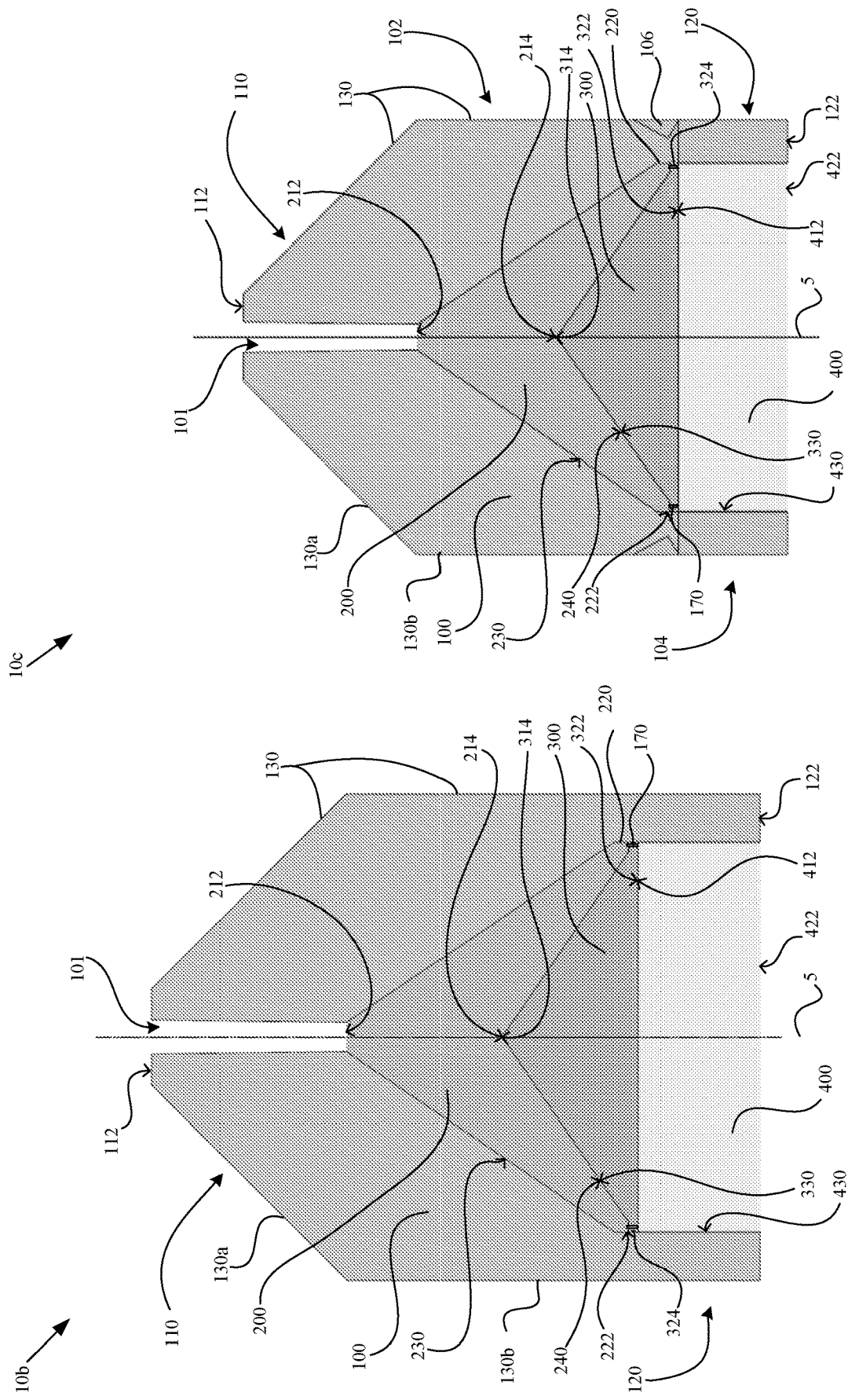

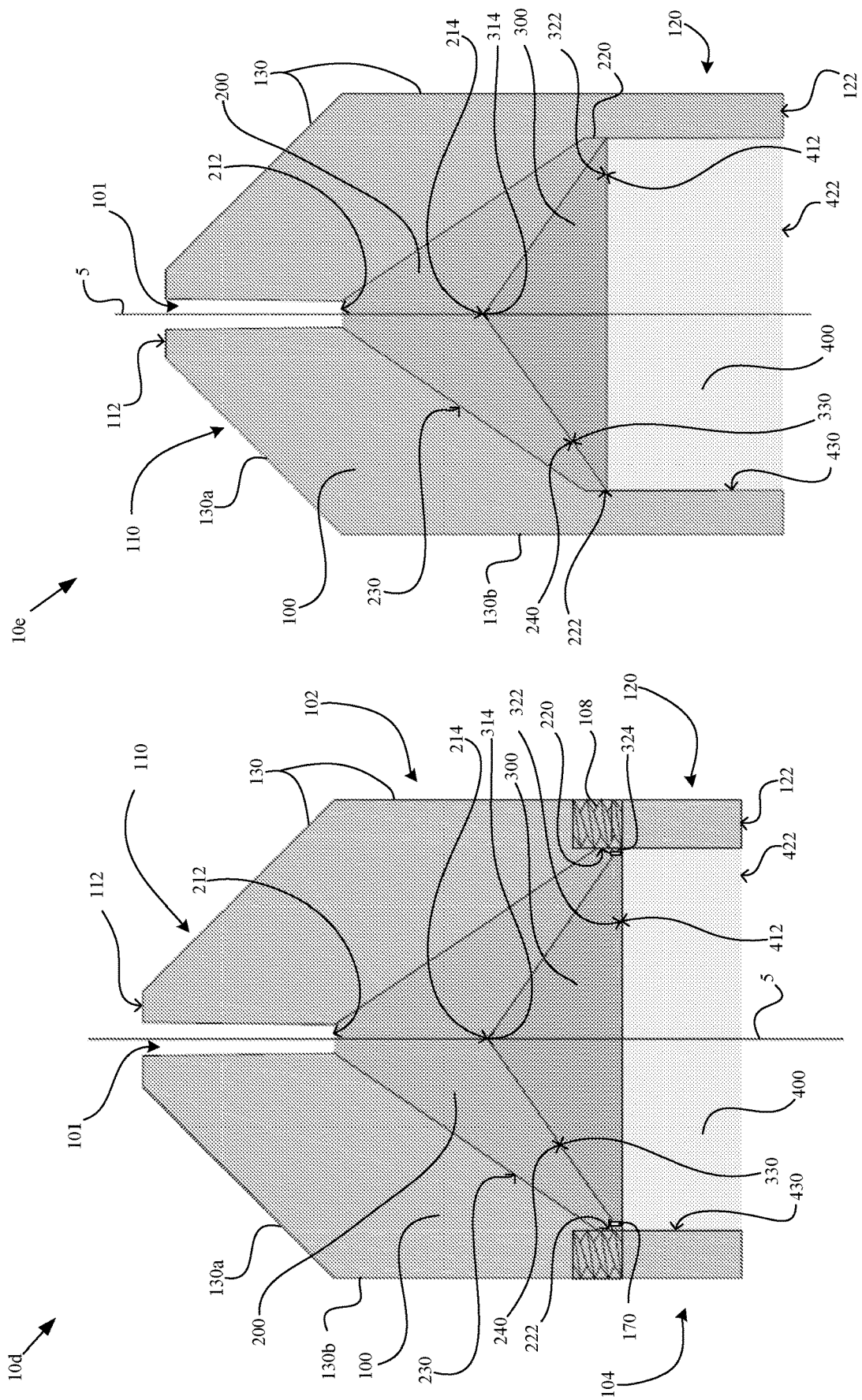

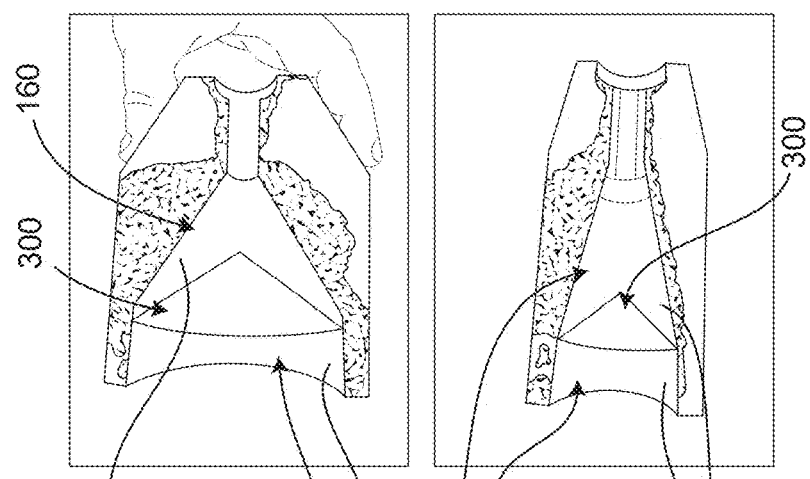
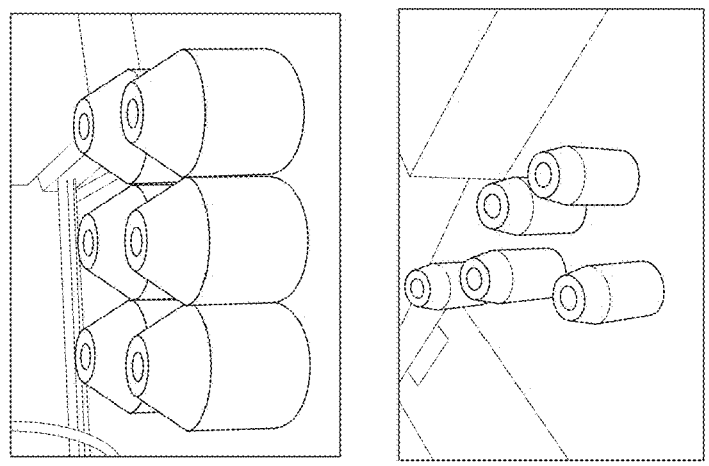
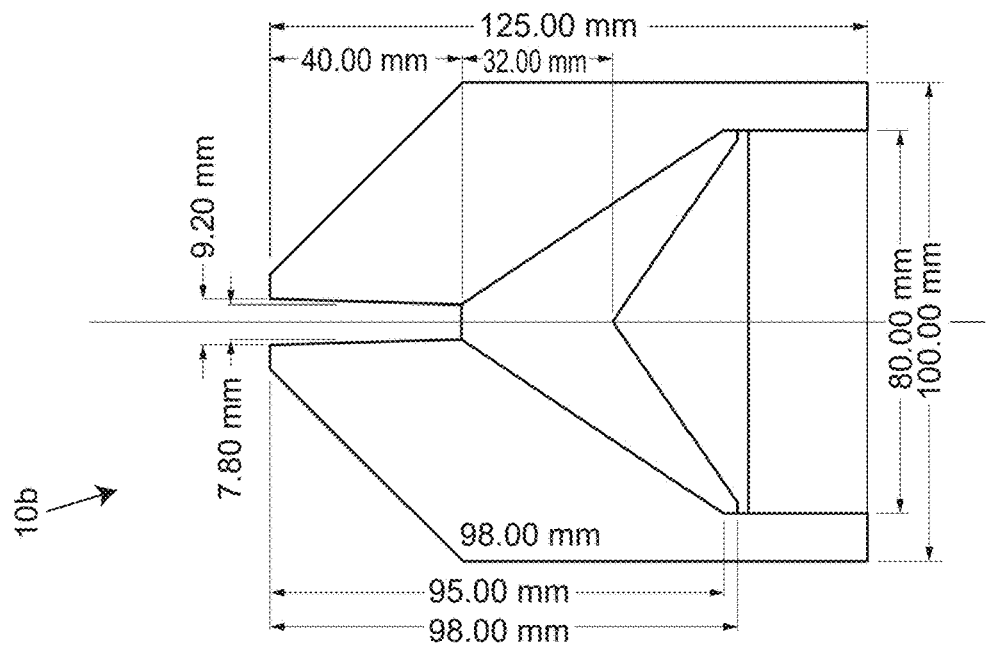

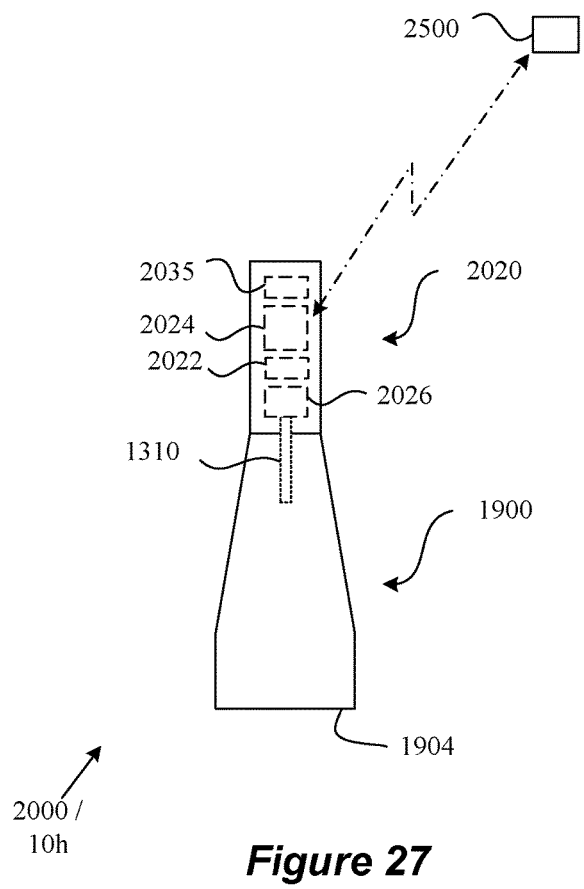
*Figure 27*
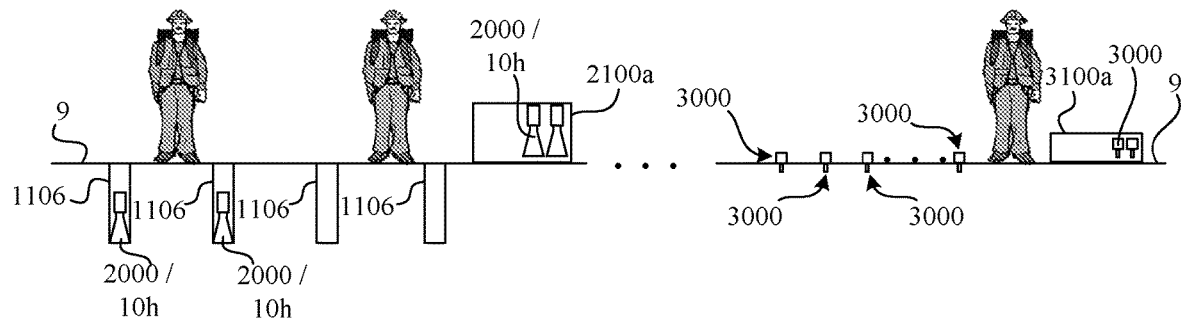
*Figure 28A*

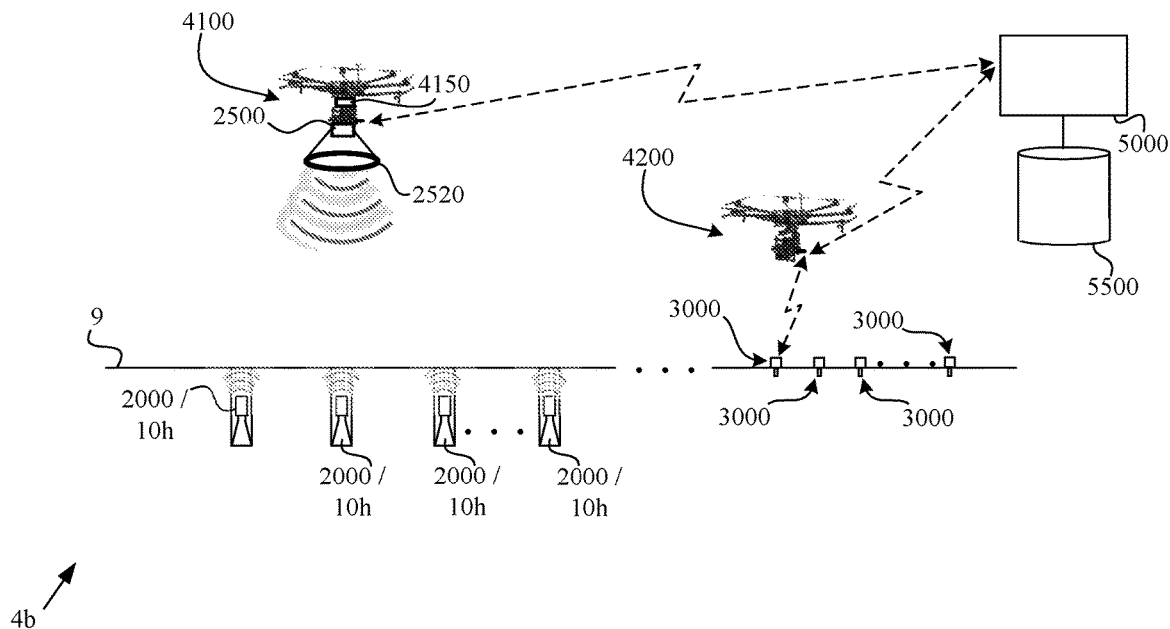
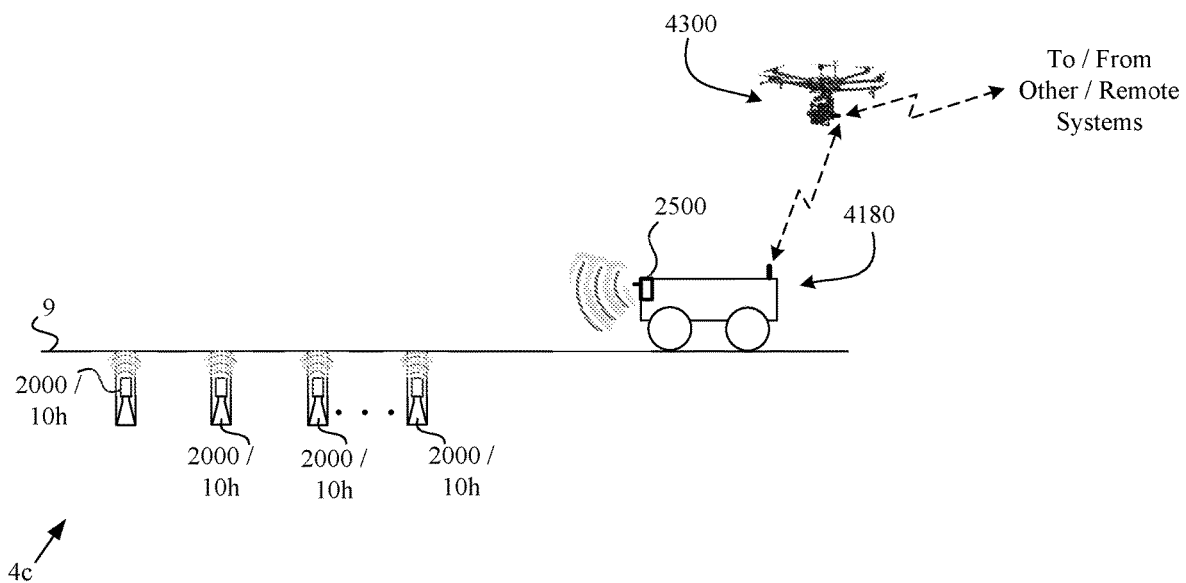
*Figure 29B*
*Figure 29C*

DEPLOYMENT OF QUASI-PLANAR SHOCK WAVE GENERATORS IN ASSOCIATION WITH SEISMIC EXPLORATION

RELATED APPLICATIONS

This application is a U.S. National Stage of International Application No. PCT/SG2020/050371, filed Jun. 26, 2020, which claims priority to and the benefit of U.S. Provisional Patent Application No. 62/867,193, filed Jun. 26, 2019, each of which is hereby incorporated by reference herein in its entirety.

TECHNICAL FIELD

Aspects of the present disclosure relate to kits, systems, apparatuses, devices, and methods for deploying explosive devices or charges in association with geophysical or seismic exploration operations, processes, or procedures, including explosive devices or charges configured for preferentially generating or outputting quasi-planar shock waves across portions of first, distal, terminal, or target ends thereof.

BACKGROUND

Exploration geophysical tools and techniques are used to explore physical properties of the Earth's subsurface, e.g., geological deposits, hydrocarbons, groundwater reservoirs, etc. Seismic exploration uses seismic waves for geophysical exploration, e.g., in reflection seismology and seismic refraction.

However, existing kits, systems, apparatuses, devices, and methods for geophysical or seismic exploration can be dangerous for operators and wildlife, can be damaging to the environment, can be undesirably time consuming to use, and/or can require heavy, expensive and slow-moving equipment.

It is desired to address or ameliorate one or more disadvantages or limitations associated with the prior art, or to at least provide a useful alternative.

SUMMARY

Described herein is a geophysical or seismic exploration system, comprising:
 a. a set of explosive device magazines configured for carrying a plurality of explosive device components, wherein the explosive device components are configurable to form individual explosive devices, and wherein each explosive device carries a set of explosive compositions and is configured for collimating an explosive shock wave produced thereby into a quasi-planar shock wave output from a distal end of the explosive device to produce a geophysical or seismic exploration wave; and
 b. a set of unmanned explosive device deployment support vehicles, wherein each unmanned explosive device deployment support vehicle comprises an aerial or land-based unmanned vehicle configured for carrying an explosive device magazine and delivering the explosive device magazine to a first in-field location at which each explosive device is deployable for carrying out a geophysical or seismic exploration operation.

Each explosive device can comprise:
 a. a body structure confining the set of explosive compositions structurally organized for outputting a quasi-planar shock wave at its distal end in response to explosive initiation thereof; and
 b. a wireless control unit configured for wirelessly receiving and executing commands for selectively controlling the explosive initiation of the explosive device.

Each explosive device can further comprise an initiation element coupled to the wireless control unit and the set of explosive compositions, and configured for programmably explosively initiating the set of explosive compositions.

The wireless control unit can comprise:
 a. a set of power sources;
 b. a wireless communication unit coupled to the set of power sources and configured for at least receiving commands and data; and
 c. an initiation control unit coupled to the wireless communication unit, the initiation control unit comprising integrated circuitry including a processing unit and a memory, and configured to control the activation of the initiation element to programmably trigger the explosive initiation of the set of explosive compositions.

The wireless control unit can be joined together with the body structure such that the wireless control unit and the body structure form a unified structure; or the wireless control unit or the wireless communication unit of the wireless control unit can be electrically coupled to the body structure by way of a cord having a predetermined length and which establishes an intended physical separation distance between the wireless control unit or the wireless communication unit and the body structure.

The wireless control unit can further comprise a global navigation satellite system (GNSS) unit configured for receiving GNSS signals corresponding to a geolocation of the explosive device.

The wireless communication unit can be further configured for wirelessly transmitting data to a destination external to the explosive device.

The wireless communication unit can be configured for sending and/or receiving wireless communication signals by way of radio frequency (RF) communication signals and/or magnetic induction (MI) communication signals.

The geophysical or seismic exploration system can further comprise:
 a. a set of seismic signal detector magazines in which wireless nodal geophone devices reside; and
 b. a set of unmanned seismic signal detector deployment support vehicles, wherein each unmanned seismic signal detector deployment support vehicle comprises an unmanned aerial or land-based vehicle configured for carrying a seismic signal detector magazine configured for holding a plurality of wireless nodal geophone devices and delivering the seismic signal detector magazine to a second in-field location at which the nodal geophone devices are deployable for carrying out the geophysical or seismic exploration operation.

The geophysical or seismic exploration system can further comprise a set of unmanned seismic signal sensing support vehicles configured for wireless communication with wireless geophone devices deployed at the second in-field location.

The geophysical or seismic exploration system can further comprise: a set of unmanned blast support vehicles, wherein each unmanned blast support vehicle is configured for selectively programming and controlling the explosive initiation of explosive devices deployed at the first in-field location by way of wireless communication with the explosive devices.

Described herein is an explosive device for geophysical or seismic exploration, comprising:
a. a body structure confining a set of explosive compositions structurally organized for outputting a quasi-planar shock wave at its distal end in response to explosive initiation thereof; and
b. a wireless control unit configured for wirelessly receiving and executing commands for selectively controlling the explosive initiation of the explosive device, wherein the wireless control unit comprises:
 i. a set of power sources;
 ii. a wireless communication unit coupled to the set of power sources and configured for at least receiving commands and data;
 iii. an initiation control unit coupled to the wireless communication unit, the initiation control unit comprising integrated circuitry including a processing unit and a memory, and configured to control the activation of the initiation element to programmably trigger the explosive initiation of the set of explosive compositions; and
 iv. a global navigation satellite system (GNSS) unit configured for receiving GNSS signals corresponding to a geolocation of the explosive device.

The explosive device can further comprise an initiation element coupled to the wireless control unit and the set of explosive compositions, and configured for programmably explosively initiating the set of explosive compositions.

Described herein is a kit for geophysical or seismic exploration, comprising:
a. at least one explosive device for propagating a seismic wave into the Earth, wherein each explosive device carries a set of explosive compositions and includes internal structures configured for collimating an explosive shock wave into a quasi-planar output shock wave that is output from a distal end of the explosive device to produce the seismic wave; and
b. at least one of:
 i. a digging device configured for digging a borehole to receive explosive devices; and
 ii. a stabilizer corresponding to each explosive device, wherein the stabilizer is configured for supporting at least portions of a particular explosive device above the surface of the Earth and maintaining the particular explosive device in a stable position during in-field deployment thereof.

The digging device can be configurable or configured for digging boreholes having a depth between approximately 0.2 m and 2 m.

The digging device can include at least one of: a shovel, a hand auger, and a powered drill having a drill bit of a length sufficient to form the boreholes.

The kit can further comprise at least one of:
a. an initiation device configurable for programmably triggering explosive initiation of the set of explosive compositions; and
b. a shock wave transference coupling material that can enhance shock wave coupling between the distal ends of explosive devices and the Earth.

Described herein is a method for geophysical or seismic exploration, comprising:
a. transporting a plurality of explosive devices to a first in-field location by way of a set of unmanned explosive device deployment support vehicles carrying a set of explosive device magazines, wherein each explosive device magazine is configured for holding a plurality of explosive device components corresponding to explosive devices configurable to form individual explosive devices, wherein each explosive device carries a set of explosive compositions and is configured for collimating an explosive shock wave produced thereby into a quasi-planar shock wave output from a distal end of the explosive device to produce a geophysical or seismic exploration wave, wherein each explosive device is configurable or configured for wireless communication, and wherein each unmanned explosive device deployment support vehicle comprises an aerial or land-based unmanned vehicle configured for carrying an explosive device magazine and delivering the explosive device magazine to a first in-field location at which each explosive device is deployable for carrying out a geophysical or seismic exploration operation;
b. deploying a first plurality of explosive devices at a first in-field location;
c. recording a set of Global Navigation Satellite System (GNSS) coordinates corresponding to each of the plurality of explosive devices deployed at the first in-field location; and
d. wirelessly programming each of the first plurality of explosive devices deployed at the first in-field location by way of a set of unmanned blast support vehicles configured for wireless communication with each of the first plurality of explosive devices deployed at the first in-field location, wherein wirelessly programming each of the first plurality of explosive devices includes programmably assigning a common group identifier (GID) to each of the plurality of explosive devices.

The method can further comprise:
a. transporting a plurality of wireless nodal geophone devices to a second in-field location by way of a set of unmanned seismic signal sensor deployment support vehicles carrying a set of geophone device magazines, wherein each geophone device magazine is configured for holding a plurality of wireless nodal geophone devices configurable or configured for wireless communication, wherein each unmanned seismic signal sensor deployment support vehicle comprises an aerial or land-based unmanned vehicle configured for carrying a geophone device magazine and delivering the geophone device magazine to a second in-field location at which each wireless nodal geophone is deployable for carrying out the geophysical or seismic exploration operation; and
b. deploying a second plurality of wireless nodal geophone devices at the second in-field location.

The method can further comprise:
a. activating the second plurality of wireless nodal geophone devices deployed at the second in-field location to detect and log or record seismic signals by way of a set of unmanned seismic signal sensing support vehicles configured for wireless communication with the second plurality of wireless nodal geophone devices;
b. issuing an ARM command to each of the first plurality of explosive devices by way of a set of unmanned blast support vehicles configured for wireless communication with the first plurality of explosive devices;
c. issuing a FIRE command to each of the plurality of explosive devices by way of the set of unmanned blast support vehicles; and
d. at least one of:
 i. recording a first time or time stamp corresponding to issuance of the FIRE command; and ii. for each explosive device, receiving at an unmanned blast support vehicle a second time or time stamp corresponding to a local explosive device time at which the explosive device received the FIRE command.

In embodiments, the explosive device is deployed on or in the Earth, such that its distal end couples directly or indirectly with the Earth. The explosive shock wave is directed in a direction from the explosive device's proximal end to the distal end. The borehole may be aligned longitudinally into the Earth substantially in the direction of gravity; or aligned longitudinally into the Earth at an angle substantially between vertical and horizontal with respect to the direction of gravity, optionally including between 25 degrees and 65 degrees from the direction of gravity. The explosive device may be deployed longitudinally aligned with a longitudinal direction of the borehole, or wherein the explosive device is deployed longitudinally transverse to the longitudinal direction the borehole. The kit and the system may include a rigid holding structure for suppressing noise, air blast, and/or debris from the explosive device. The kit and the system may include one or more blast suppression materials for suppressing noise, air blast, and/or debris from the explosive device, wherein the blast suppression materials optionally include energy absorbing materials that can include one or more foam based materials, including a foam. The foam may be contained in a foam containment device, which optionally includes an open floor, and an open ceiling, which can optionally include a lid, wherein the foam containment device is a blast-resistant wall which is optionally cylindrical. The kit and the system may include a foam generator for creating the foam, and foam generating solution, and one or more refillable foam supply containers. The kit and the system may include a sleeve structure configured for surrounding the explosive device with a base portion into which the explosive device is insertable, wherein the sleeve structure includes: (A) a door in a side of the sleeve structure for receiving an initiating device for the explosive device; (B) a detonation chamber element configured for mating engagement with a base of the sleeve structure; and/or (C) explosive gas venting structures.

In embodiments, the explosive device generates an output shock wave with a shock front curve with a closest-fit parabola focus value of $5.33 \times 10^{\wedge}(-4)$ or more, $1.09 \times 10^{\wedge}(-3)$ or more, or $9.65 \times 10^{\wedge}(-4)$ or more. The explosive device may have a net explosive mass of 330 grams or less, 110 grams or less, or 56 grams or less, or between 50 and 330 grams. The internal structures may include: a donor explosive charge mass ("donor"); and a non-explosive wave shaper ("shaper"). The donor may be configured for propagating the explosive shock wave radially from an initiation site. The donor may be non-cylindrical and non-conical. The donor may include a frustoconical section and a cylindrical section. The shaper may be configured for transforming the explosive shock wave from the donor into a quasi-planar shock wave. The shaper may exhibit a triangular or approximately triangular two dimensional (2D) profile within a vertical cross-section of the explosive device. The shaper may be a solid structure, optionally comprising one or more types of polymer or plastic materials. The shaper may have a shock Hugoniot slope between 1.5 and 1.7. The shaper may exhibit a vertical cross sectional area parallel to the central axis that geometrically corresponds to or is correlated with a triangle having an apex, and wherein an apex angle of the triangle is between 37.5 and 43.3 degrees. The internal structures may include: an acceptor explosive charge mass ("acceptor"). The acceptor may be configured for explosively amplifying the quasi-planar shock wave from the shaper while retaining or approximately maintaining wave front planarity of the propagated shock wave to generate the output shock wave. The output shock wave is a quasi-planar shock wave. The explosive device is a plane wave generator or plane wave explosive lens.

BRIEF DESCRIPTION OF THE DRAWINGS

Some embodiments are hereinafter described, by way of non-limiting example only, with reference to the accompanying drawings, in which:

FIG. 9A is a cross-sectional diagram of the explosive device formed in a cartridge;

FIG. 9B is a perspective diagram of the cartridge;

FIG. 10 is a cross-sectional diagram of a sleeve structure for housing the cartridge;

FIGS. 15, 16A, 16B, 17, 18, 19, 20, 21 and 22 are cross-sectional schematic illustrations of embodiments of the explosive device;

FIGS. 23A and 23B are images of representative implementations of the explosive device;

FIG. 27 is a block diagram of a wireless explosive device suitable for geophysical/seismic exploration;

FIGS. 28A-28B are block diagrams of geophysical/seismic exploration deployment systems for wireless explosive devices;

FIGS. 29A-29C are block diagrams of geophysical/seismic exploration control systems for wireless explosive devices;

DETAILED DESCRIPTION

Figure 1A:
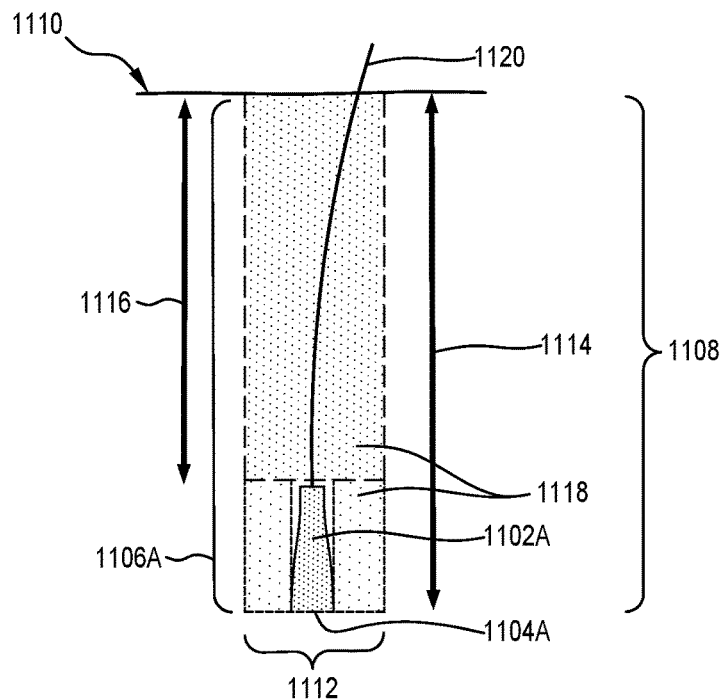
FIG. 1A is cross-sectional schematic diagram of an explosive device in a borehole oriented to face an end of the borehole.

Herein, reference to one or more embodiments, e.g., as various embodiments, many embodiments, several embodiments, multiple embodiments, some embodiments, certain embodiments, particular embodiments, specific embodiments, or a number of embodiments, need not or does not mean or imply all embodiments.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11: Properties of Finite Sets" (e.g., as indicated on p. 140), by Peter J. Eccles, Cambridge University Press (1998)). Thus, a set includes at least one element. In general, an element of a set can include or be one or more portions of a system, an apparatus, a device, a structure, an object, a process, a procedure, physical parameter, or a value depending upon the type of set under consideration.

The FIGs. included herewith show aspects of non-limiting representative embodiments in accordance with the present disclosure, and particular structural elements shown in the FIGs. may not be shown to scale or precisely to scale relative to each other. The depiction of a given element or consideration or use of a particular element number in a particular FIG. or a reference thereto in corresponding descriptive material can encompass the same, an equivalent, an analogous, categorically analogous, or similar element or element number identified in another FIG. or descriptive material associated therewith. The presence of "I" in a FIG. or text herein is understood to mean "and/or" unless otherwise indicated. The recitation of a particular numerical value or value range herein is understood to include or be a recitation of an approximate numerical value or value range, for instance, within +/−20%, +/−15%, +/−10%, +/−5%, +/−2.5%, +/−2%, +/−1%, +/−0.5%, or +/−0%. The term "essentially all" or "substantially" can indicate a percentage greater than or equal to 90%, for instance, 92.5%, 95%, 97.5%, 99%, or 100%.

Embodiments in accordance with the present disclosure relate to methods of deploying explosive devices in association with geophysical or seismic exploration operations, processes, or procedures, including explosive devices that in response to initiation are configured for preferentially (a) directing explosive energy toward a first, distal, terminal, or target end of thereof, and (b) outputting explosive energy at or across the first, distal, or target end with a quasi-planar explosive energy profile, rather than internally propagating and outputting explosive energy in a uniform or generally uniform radial manner. Particular representative embodiments of explosive devices configured for preferentially generating or outputting a shock wave, shock front, or detonation front having a quasi-planar profile at a first, distal, or target end thereof are described hereinafter. For purpose of brevity and simplicity, in the description that follows such types of explosive devices can be referred to as quasi-planar wave generators (QPWG).

In some embodiments, the QPWG can be couplable/coupled to or include a set of sensors configured for generating signals corresponding to external/environmental conditions or parameters corresponding to temperature, moisture/humidity, pressure, vibration, shock, the presence of one or more chemical species, and/or other conditions or parameters.

In various embodiments, following its initiation and/or detonation, the QPWG preferentially directs explosive energy in a direction from its proximal end towards its distal end, and out of its distal end into the Earth. The QPWG (re)shapes (or "collimates") an explosive shock wave, shock front, or detonation front propagating within the QPWG towards its distal end such that upon reaching the distal end, the explosive shock front exhibits a quasi-planar profile across significant portions of the cross-sectional area of the QPWG's distal end.

Compared to the explosive energy output by a conventional cylindrical explosive charge, which exhibits a generally uniform radial distribution relative to an initiation site or point therein, the QPWG outputs a significantly greater percentage of its explosive energy at its distal end relative to the explosive energy output by the QPWG in lateral, vertical, and radial directions above or away from its distal end.

QPWGs can be deployed in association with operations, processes, or procedures relating or similar to seismic exploration. Depending upon embodiment details and/or a seismic exploration situation under consideration, QPWGs can be deployed below the surface of the ground or earth (also referred to as "the Earth"), e.g., in cavities, holes, or boreholes, and more particularly, in shallow or very shallow cavities, holes, or boreholes in at least some embodiments; and/or QPWGs can be deployed on, at, or just above the surface of the Earth (referred to as the ground or the earth).

Figure 1B:
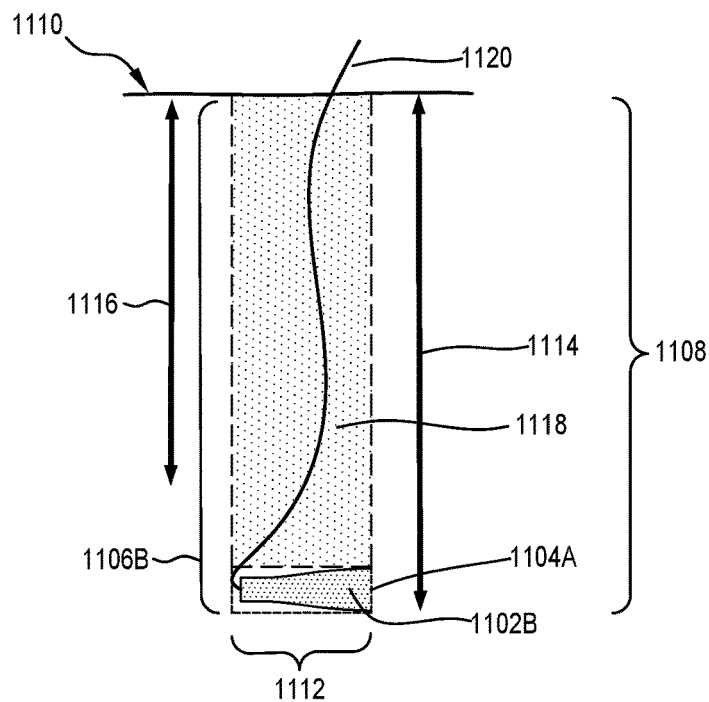
FIG. 1B is a cross-sectional schematic diagram of the explosive device in the borehole oriented to face a side of the borehole.
Figure 1C:
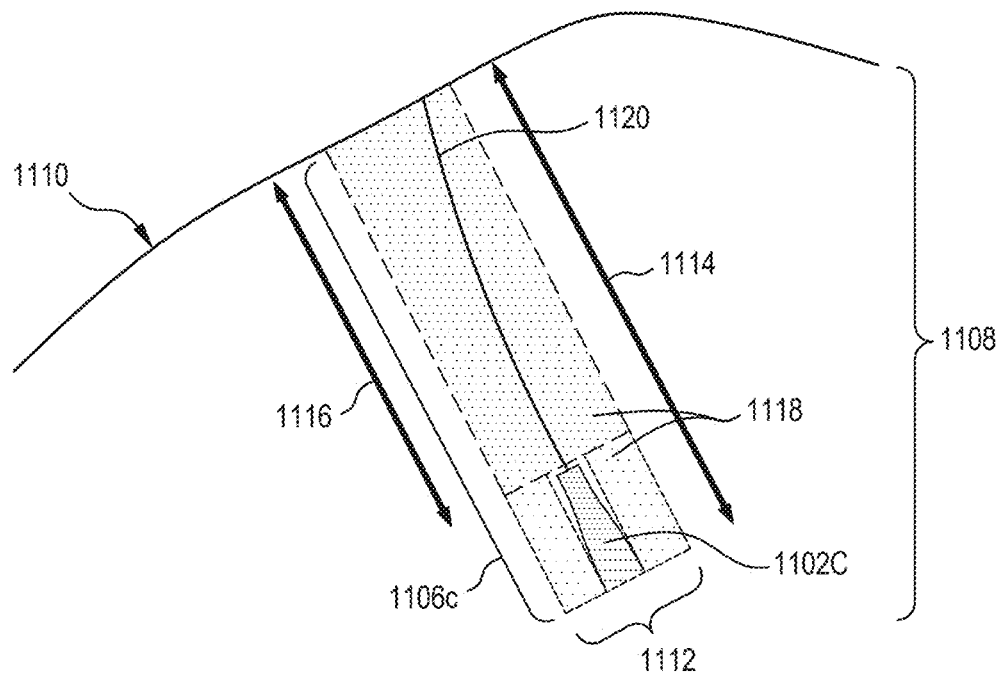
FIG. 1C is a cross-sectional schematic diagram of the explosive device in an angled borehole oriented to face an end of the borehole.

For instance, QPWGs, such as a QPWG providing an explosive charge having a total mass of 56 g, can be deployed in shallow or very shallow boreholes, e.g., in one or more orientations relative to the borehole direction, e.g., as shown in FIGS. 1A to 1C.

As shown in FIGS. 1A to 1C, a QPWG 1102A, B, C can be deployed and buried in a borehole 1106, which can be a vertical borehole 1106A, B (i.e., aligned longitudinally downward into the Earth 1108, substantially in the direction of gravity) or an angled borehole 1106C (i.e., aligned longitudinally into the Earth 1108 at an angle substantially between vertical and horizontal with respect to the direction of gravity, e.g., between 25 degrees and 65 degrees from the direction of gravity). The angled borehole 1106C can be used in an angled hill or hillside, i.e., when the surface 1110 of the Earth 1108 is at an angle substantially between vertical and horizontal with respect to the direction of gravity.

As shown in FIGS. 1A and 1C, the QPWG 1102A, C can be deployed longitudinally or approximately longitudinally aligned with a longitudinal direction (i.e., depth direction) of the borehole 1106A, C, i.e., in a substantially "upright" orientation relative to the depth direction of the borehole 1106A, C, i.e., with its distal end 1104A facing into a bottom end 1112 of the borehole 1106A, C. Alternatively, as shown in FIG. 1B, the QPWG 1102B can be deployed longitudinally transverse to the longitudinal direction (i.e., depth direction) of the borehole 1106B, e.g., in a substantially "prone" orientation relative to the depth direction of the borehole 1106B, i.e., with its distal end 104A facing a side wall (perpendicular to the bottom end 1112) of the borehole 1106B.

As shown in FIGS. 1A to 1C, each borehole 1106A, B, C has a borehole depth 1114 (along the longitudinal direction of the borehole 1106A, B, C), and each QPWG 1102A, B, C is deployed at a buried depth 1116 (or "deployment depth"). In general, boreholes 1106 can have a depth 1114 between 0.20 m to 10 m, depending upon embodiment and/or situational details. In several embodiments, the borehole depth 1114 can be substantially 0.25 metres (m) to 1.65 m, or substantially 0.35 m to 0.65 m. In such embodiments, the buried depth 1116 of the QPWG in the borehole 1106 can be substantially 0.10 m to 1.50 m, or substantially 0.20 m to 0.50 m, or substantially 1 m.

As shown in FIGS. 1A to 1C, once the QPWG 1102A, B, C is deployed in the borehole 1106A, B, C, the unfilled volume of the borehole 1106A, B, C can be filled with stemming material 1118, which can include rock, soil and/or other stemming materials agents described hereinafter.

As shown in FIGS. 1A to 1C, once deployed, the QPWG 1102A, B, C can be connected to a cord 1120 for wire-based signal transfer described hereinafter.

Such shallow or very shallow in-ground deployment may provide benefits or advantages such as (but not limited to):
  a. reduced drilling cost, reduced seismic exploration line clearing, and rendering large/cumbersome conventional drilling equipment (e.g., a drill rig) not necessary;
  b. simple, rapid deployment compared to the use of conventional drilling equipment;
  c. less disruptive to vegetation and environment;
  d. can be retested easily, e.g., if required to confirm or further resolution required;
  e. good, very good, or excellent shock wave signal to noise ratio; and/or
  f. good noise suppression, e.g., <115 dB for QPWGs deployed between approximately 20 centimetres (cm) and 50 cm beneath the ground or earth surface.

Such shallow or very shallow boreholes can be formed in various manners, e.g., manually or mechanically, by digging devices which are part of the described kits, systems and apparatuses described herein, potentially including one or more of:
  a. a shovel (for soft to moderate ground) which can be: simple equipment, lightweight, and mobile, with no need to carry fuel or batteries;
  b. a commercially available hand auger (or "post hole digger", for soft or moderate to hard ground) which may: require no powered equipment (so there is no need to carry or provide batteries or fuel), be lightweight, and be mobile;
  c. a special purpose pole or accessory (for soft/very soft ground), which: allows for direct deployment without predrilling or digging into very soft ground (e.g., mud, snow), and may be configured to allow booster accessories (for the QPWG) to be carried by or attached to the special purpose pole or accessory; and
  d. a handheld battery powered drill, configured for manual operation by a person, including a battery power source, which can allow for: easier penetration into harder ground compared to manual methods, and a narrower borehole for improved coupling into the ground.

Figure 2:
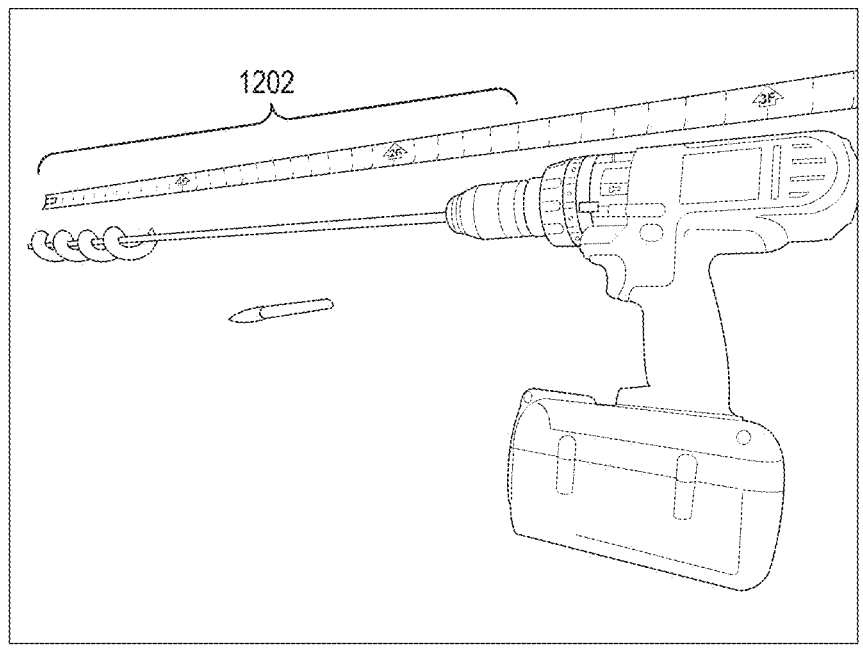
FIG. 2 is an illustration of a digging device.

As shown in FIG. 2, the powered drill (e.g., battery powered) can include a long drill bit 1202 for drilling into the Earth, i.e., providing a drill bit length substantially equal to the borehole depth.

Explosive energy or shock wave transference coupling between the distal end of the QPWG deployed in a borehole such as a relatively shallow, shallow or very shallow borehole (e.g., having a depth between approximately 0.2 m-10 m) and the ground can be achieved by way of one or more types of transference coupling materials, agents, or substances, such as stemming material(s) or agents, concrete, soil, mud, bentonite slurry, drill cuttings, and/or other materials, agents, or substances disposed between the QPWG and the bottom of the borehole and/or surrounding and above the QPWG in the borehole. With respect to stemming materials or agents, Orica Tekstem (which is commercially available) can be a useful or very useful representative type of stemming material or agent, e.g., due to: (a) better coupling/more efficient transfer of energy from the QPWG into the ground, e.g., compared to regular soil or drill cuttings, and compared to concrete; (b) faster deployment than bentonite slurry; and (c) reduced risk of rifling. In-hole QPWGs can further be covered or buried by one or more of such stemming material(s).

QPWGs can additionally or alternatively be deployed at, on, or just above the surface of the ground (referred to as being "on-surface"), i.e., not buried and in a cavity, hole, or borehole. In some embodiments, a QPWG can be deployed on-surface by way of a stabilizer in the form of one or more types of holding structures, devices, or apparatuses, such as stabilizing or stabilizer devices, for instance which include a set of support structures (e.g., deployable/adjustable support structures) configured for holding the QPWG in an intended orientation such that its distal end contacts and couples with the surface of the ground or earth.

Figure 3A:
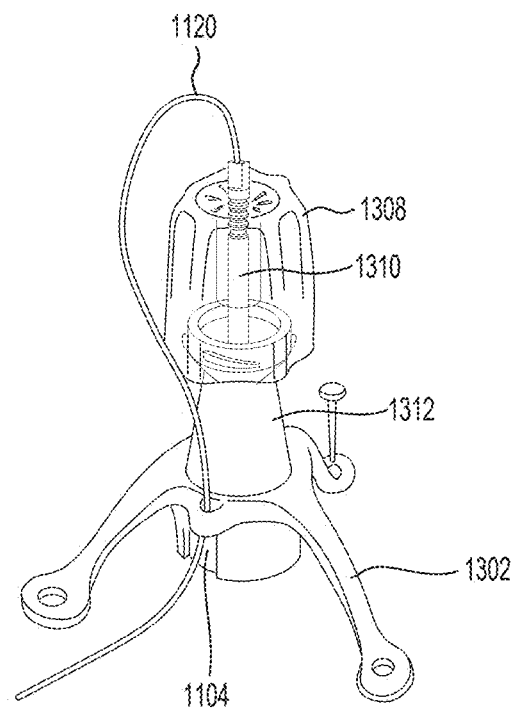
FIG. 3A is a perspective sketch of the explosive device held by a stabilizer with flexible elastic legs.
Figure 3B:
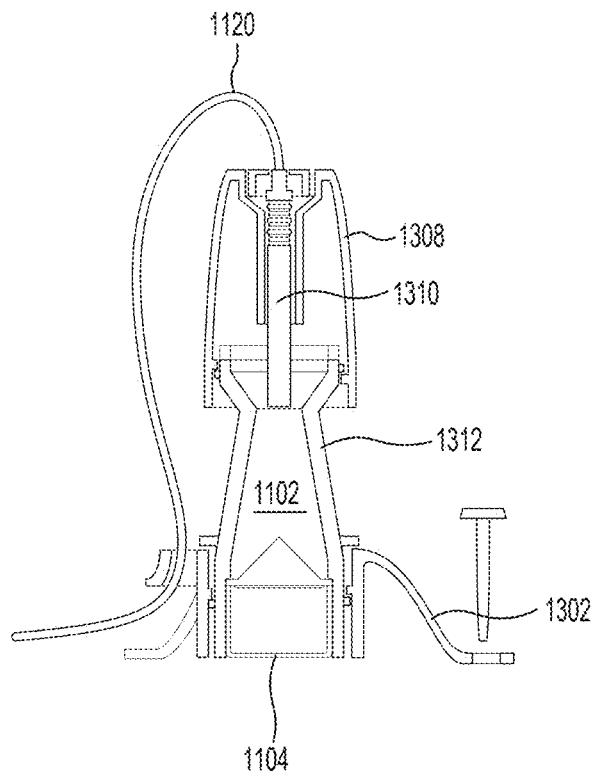
FIG. 3B is a cross-sectional view of the explosive device and the stabilizer of FIG. 3A.
Figure 3C:
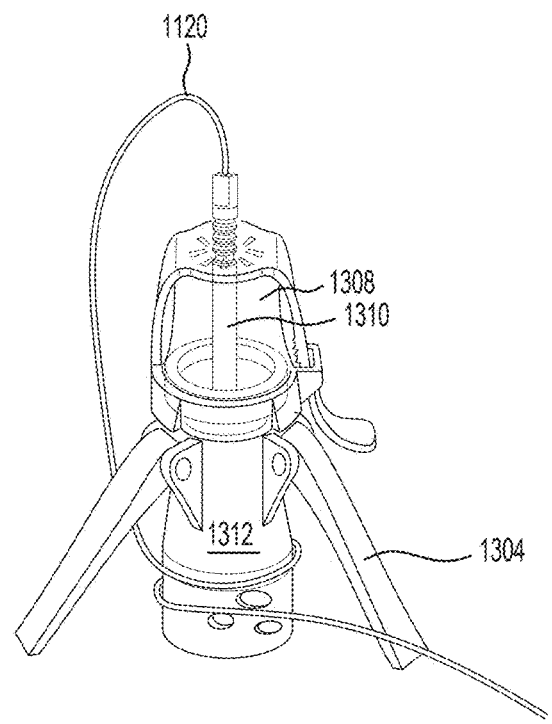
FIG. 3C is a perspective sketch of the explosive device held by a stabilizer with rigid legs and a snap-on initiating device support.

The stabilizer for providing surface deployment can include a tripod stabilizer. The tripod stabilizer can include the set of the support structures in the form of at least three legs for contacting the ground surface at at least three respective points distributed in mutually different thirds of a circle around the distal end 1104 of the QPWG 1102. The legs can include flexible (elastic or inelastic) leg portions 1302 as shown in FIGS. 3A, 3B and 5, or the legs can include rigid (inelastic) leg portions 1304 as shown in FIGS. 3C, 3D, 4A, 5B, 4C, 4D and 4E. The flexible leg portions 1302 can be elastic (e.g., formed of rubber or flexible plastic), e.g., as shown in FIGS. 3A and 3B or inelastic (e.g., formed of a flexible wire), e.g., as shown in FIG. 5.

Figure 3D:
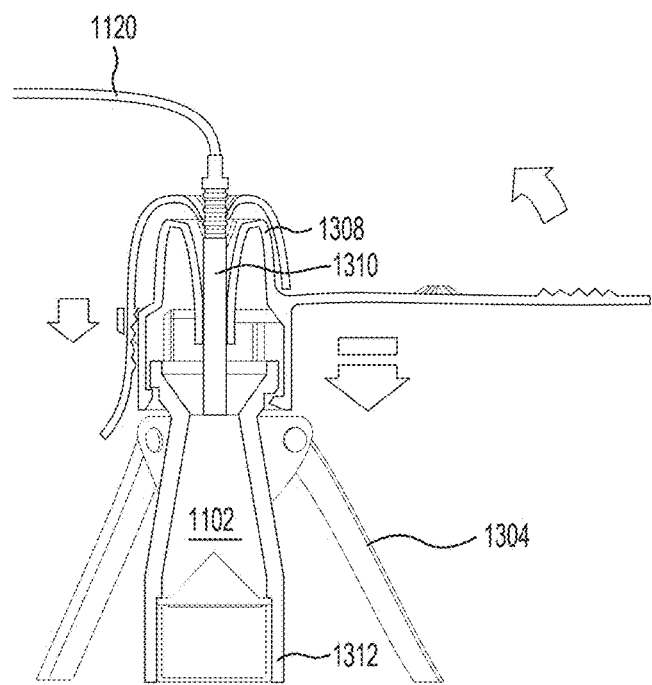
FIG. 3D is a cross-sectional view of the explosive device and the stabilizer of FIG. 3C.
Figure 4A:
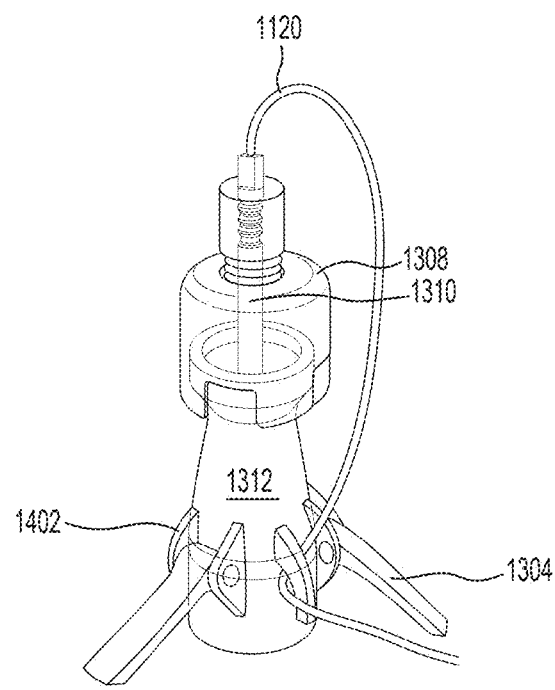
FIG. 4A is a perspective sketch of the explosive device held by a stabilizer with rigid legs and a screw-on initiating device support.
Figure 4B:
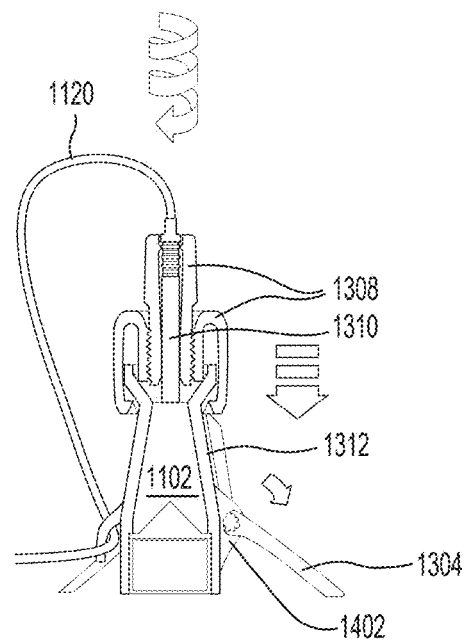
FIG. 4B is a cross-sectional view of the explosive device and the stabilizer of FIG. 4A.

The stabilizer can include an initiating device (ID) support 1308 that holds an initiating device 1310 (described hereinafter) in or on the QPWG 1102 (as described hereinafter), as shown in FIGS. 3A, 3B, 3C, 3D, 4A, 4B, 4C, 4E, 5, 6A, 6B, 7A, 7B, 8B, 8C and 8D. The QPWG 1102 includes or is coupled to an outer casing 1312 that further facilitates or enables QPWG support and/or positioning, and which can be defined as an outer or additional explosive device (ED) support 1312 that maintains or holds the QPWG 1102 in place (for use as described hereinbefore) relative to the ground surface (via the legs) and relative to the initiating device 1310 (via the ID support 1308). The ID support 1308 and ED support 1312 are configured to connect mechanically by hand (manually), which can include mutual snap portions for snap-fitting together (e.g., as shown in FIGS. 3B, 3D, 4B) and/or mutual threaded portions for screwing together (e.g., as shown in FIG. 4B).

Figure 4C:
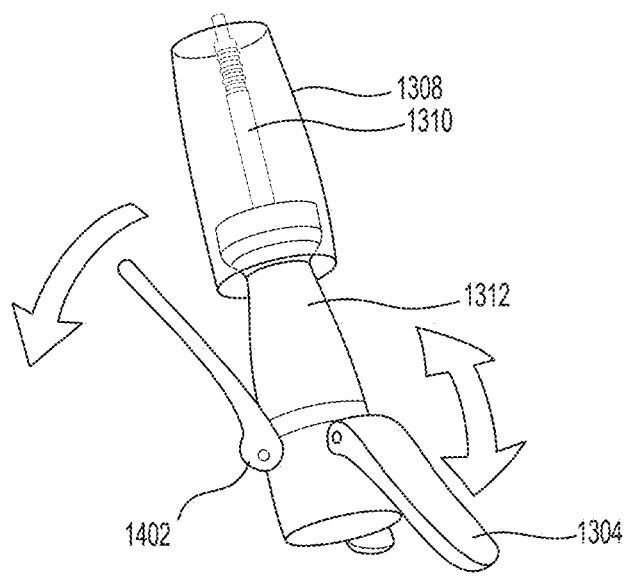
FIG. 4C is a perspective sketch of the explosive device held by a stabilizer with rigid legs and a ratcheting cam mechanism for each leg.
Figure 4D:
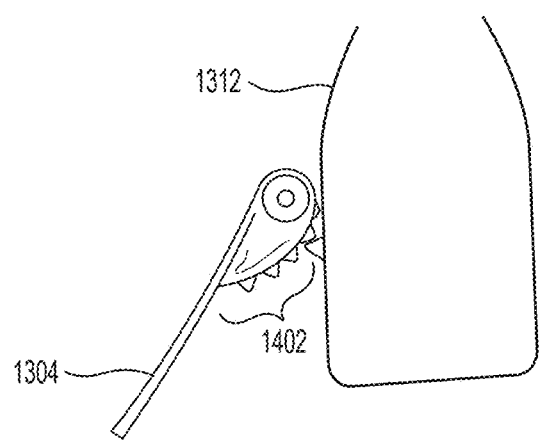
FIG. 4D is a side-view sketch of the ratcheting cam mechanism.

Each leg can be connected to the ED support 1312 by a ratcheting cam mechanism 1402, as shown in FIGS. 4A, 4B, 4C and 4D, that allows the legs to be manually moved from a storage condition (close to a body of the stabilizer) to a deployment condition (ready for contact with the ground surface) in the directions shown by the arrows in FIG. 4C. Alternatively, the legs can be configured to be manually rotated between the storage condition and the deployment condition as shown by the arrow in FIG. 4E, e.g., by including a rotatable locking mechanism between the ED support 1312 and the legs, wherein the rotatable locking mechanism includes a t-slot 1404 and a kick-bump lock 1406. Alternatively, the flexible legs can be manually bent between the storage condition and the deployment condition as shown in FIG. 5.

Figure 4E:
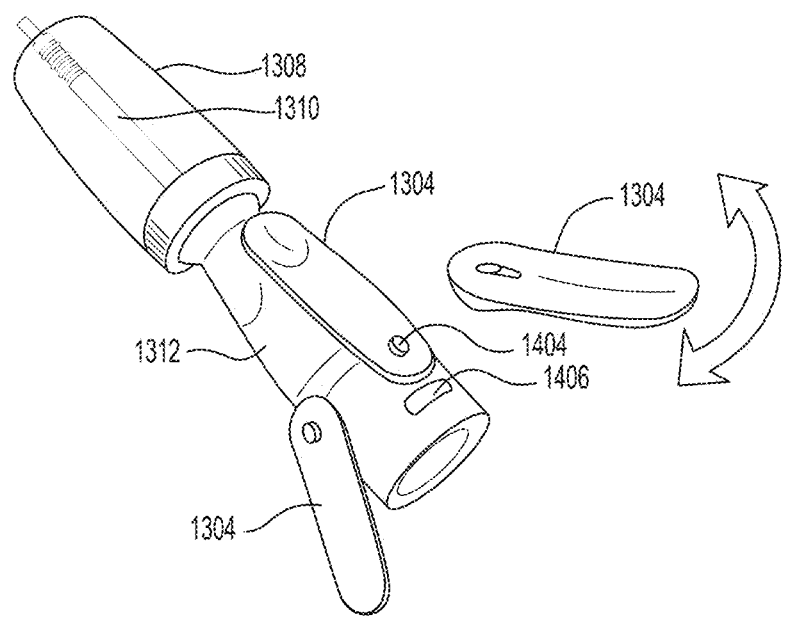
FIG. 4E is a perspective sketch of the explosive device held by a stabilizer with rigid legs and a rotatable locking mechanism for each leg.
Figure 5:
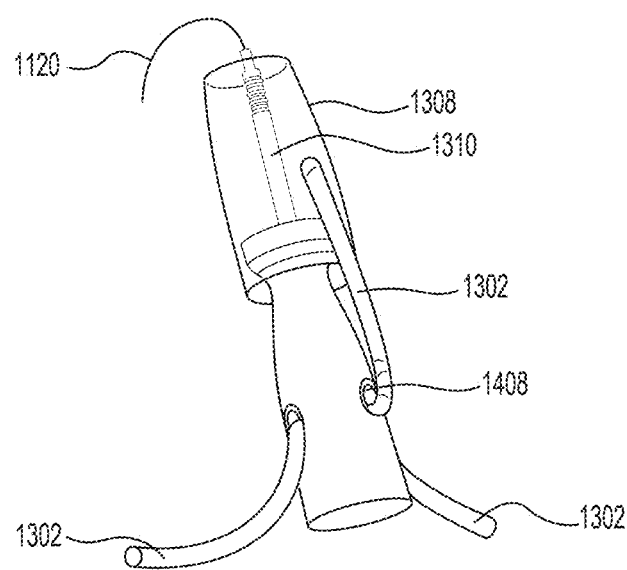
FIG. 5 is a perspective sketch of the explosive device held by a stabilizer with flexible inelastic legs.

The legs can be installed during manufacture of the stabilizer and/or manually during deployment, e.g., each leg can be attached by the t-slot 1404 as shown in FIG. 4E, or installed in a slot or groove 1408 in the ED support 1312 as shown in FIG. 5.

The stabilizer can include a cone stabilizer. The cone stabilizer can include the set of the support structures in the form of a cone support 1602 for contacting the ground surface at at least three respective points distributed in mutually different thirds of a circle around the distal end 1104 of the QPWG 1102 as shown in FIGS. 6A, 6B, 6C, 6D, 7A, 7B and 7C. The cone support 1602 can be formed of a flexible sheet or blank (which can include cardboard and/or plastic) that is flat in its storage condition, as shown in FIG. 6C, and is conical in its deployment condition as shown in FIG. 6D, with the conical shape held in place by manually connecting an anchor-in-slot mechanism (comprising an anchor 1606 that fits into a slot 1608) that is formed into the cone support 1602, as shown in FIG. 6C, and connected as shown by the arrow in FIG. 6D. The cone support 1602 can include an inflexible rigid cone, e.g., as shown in FIGS. 7A and 7B, with a flange or moulding 1701, 1702 to hold the QPWG 1102. The flange or moulding 1701 can hold the distal end of the QPWG 1102 as shown in FIG. 7A. The flange or moulding 1702 can hold projections from lateral sides of the QPWG 1102 (i.e., between its distal and proximal ends) as shown in FIG. 7B. As shown in FIG. 7C, a ground-contacting surface 1704 of the cone support 1602 can be circular or can include three or more cut aways to form a tripod with three ground-connect points (with an equivalent distribution around a circle to the three contact points formed by the legs). As shown by the arrow in FIG. 7C, the QPWG 1102 can be manually inserted into a central hole in the cone support 1602 for deployment. In the cone stabilizer, the central hole in the cone support 1602 and/or the flange or moulding 1701, 1702, acts as at least a portion of the ED support 1312 that contacts and supports the QPWG 1102.

Figure 6A:
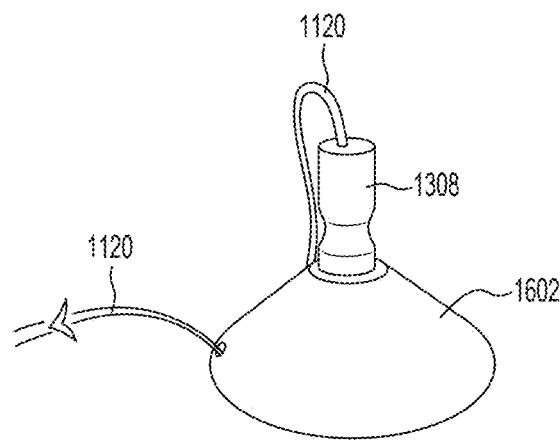
FIGS. 6A and 6B are a perspective sketches of the explosive device held by a cone stabilizer.
Figure 6B:
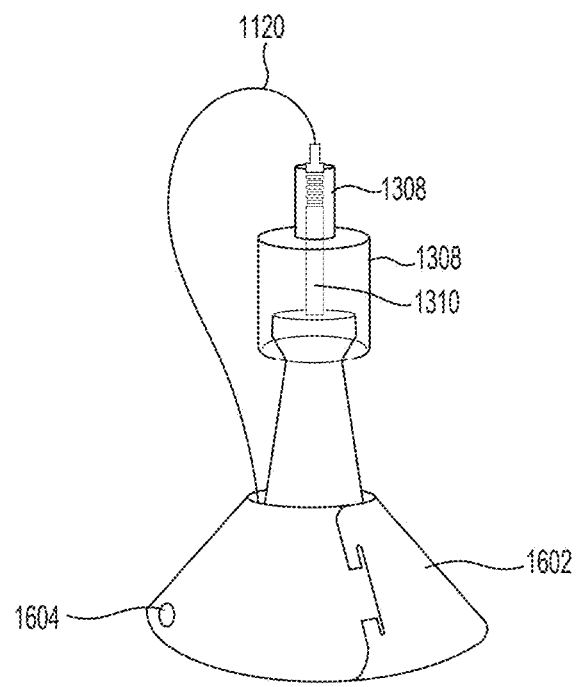
Figure 6C:
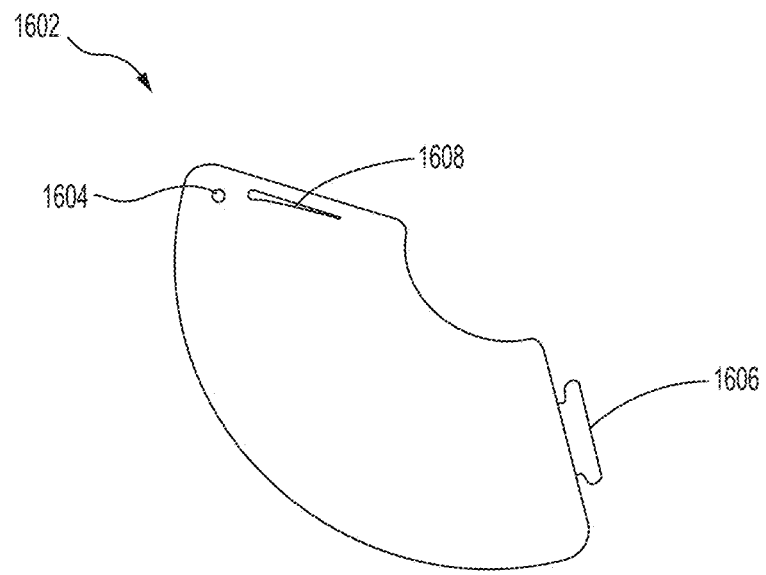
FIG. 6C is a sketch of a blank of the cone stabilizer.
Figure 6D:
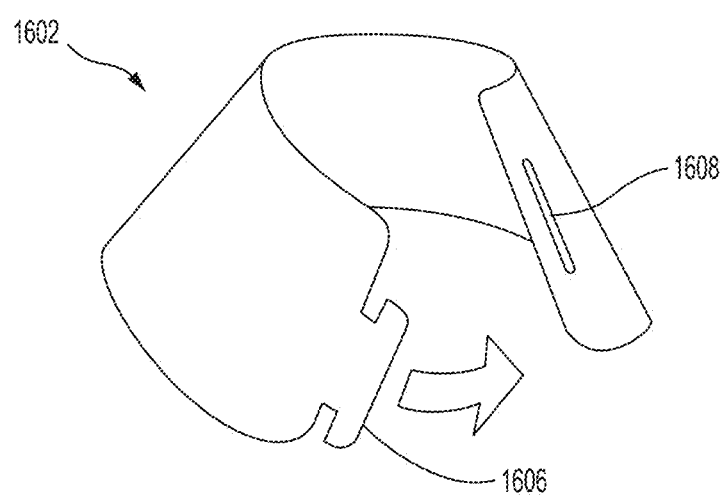
FIG. 6D is a sketch of the blank being folded to form the cone stabilizer.
Figure 7A:
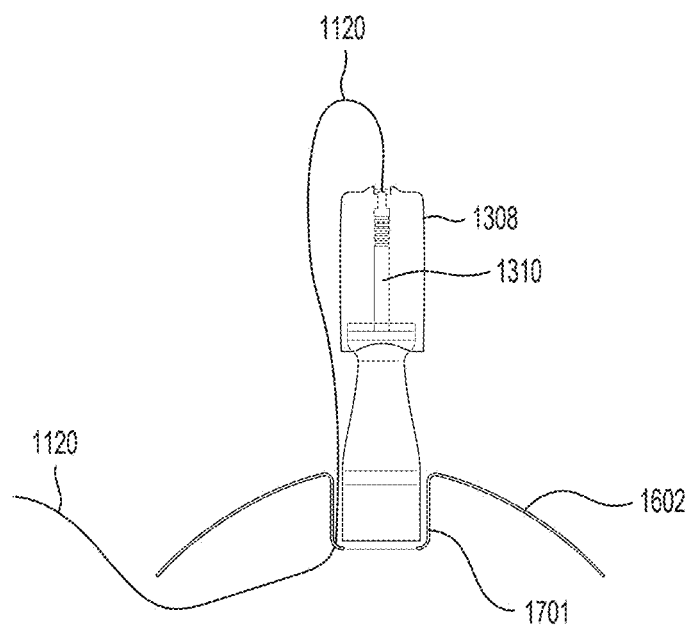
FIGS. 7A and 7B are a cross-sectional sketches of the explosive device held by alternative cone stabilizers.
Figure 7B:
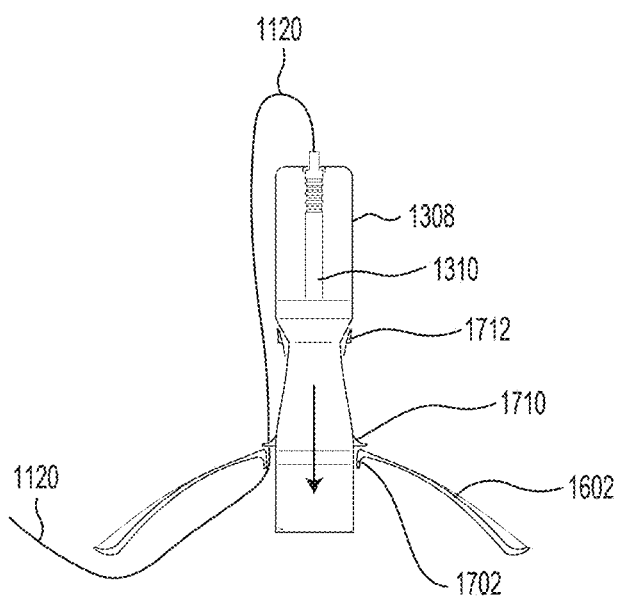
Figure 7C:
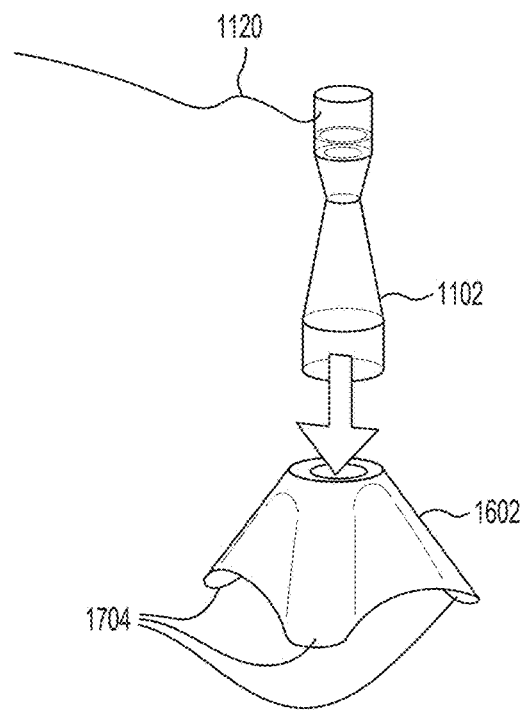
FIG. 7C is a perspective sketch of the explosive device being inserted into a cone stabilizer with cutouts forming a tripod.

As shown in FIGS. 6A, 6B, 7A and 7B, the cord 1120 can be held next to and along the QPWG 1102 by the stabilizer so the cord 1120 can exit or lead away from the QPWG 1102 from underneath the stabilizer for improved stability. The stabilizer may include a cord through hole 1605 for guiding the cord 1120 away from the stabilizer once deployed, e.g., as shown in FIG. 6B.

Figure 8A:
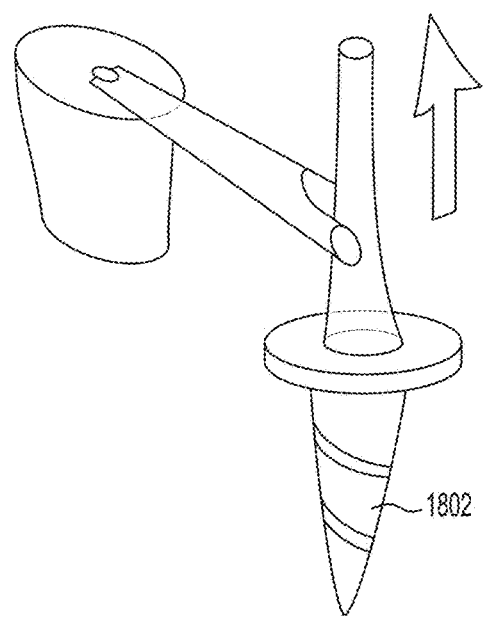
FIG. 8A is a perspective sketch of a spike for a spike stabilizer.
Figure 8B:
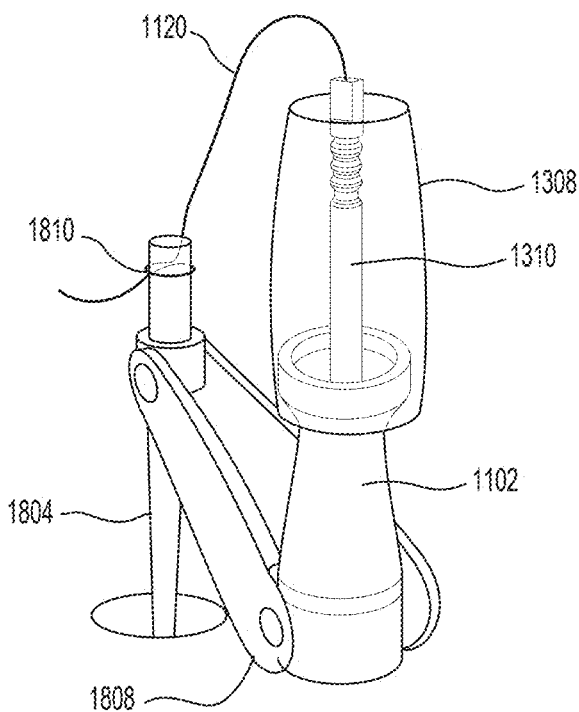
FIGS. 8B, 8C and 8D are a perspective sketches of the explosive device held by alternative spike stabilizers.
Figure 8C:
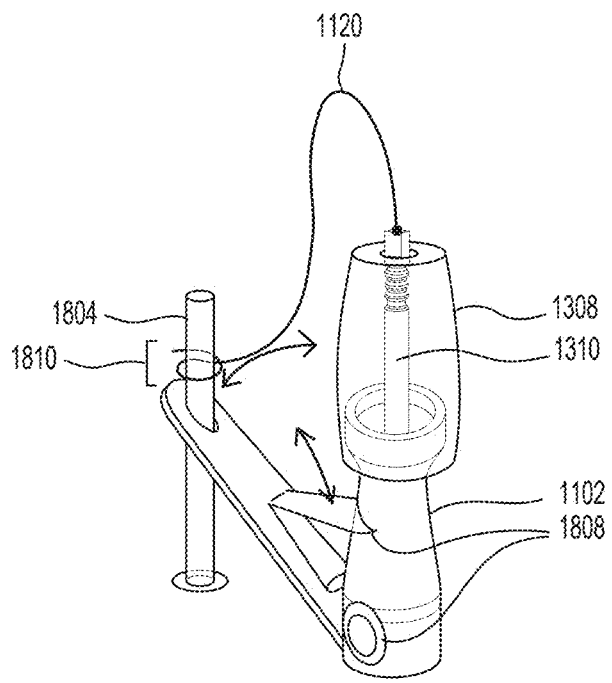
Figure 8D:
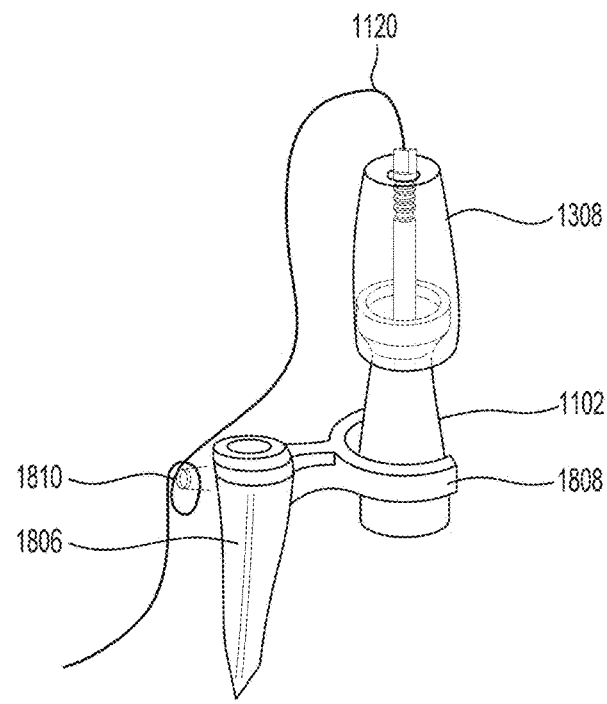

The stabilizer can include a spike stabilizer. The spike stabilizer includes the set of the support structures in the form of a ground penetrating element (referred to as a "spike") that, when deployed, is fixed relative to the Earth. The ground penetrating element can be a threaded screw 1802 as shown in FIG. 8A, a straight-sided post 1804 as shown in FIGS. 8B and 8C (which can slide into the threaded screw 1802), or a tapered peg 1806 as shown in FIG. 8D. The spike stabilizer includes an ED grip 1808 that holds the QPWG 1102 upright in its deployed condition with the distal end 1104 directed to the Earth. The spike stabilizer can hold and guide the cord 1120 away from the QPWG 1102, including with a cord loop 1810 as shown in FIGS. 8B, 8C and 8D.

Figure 8E:
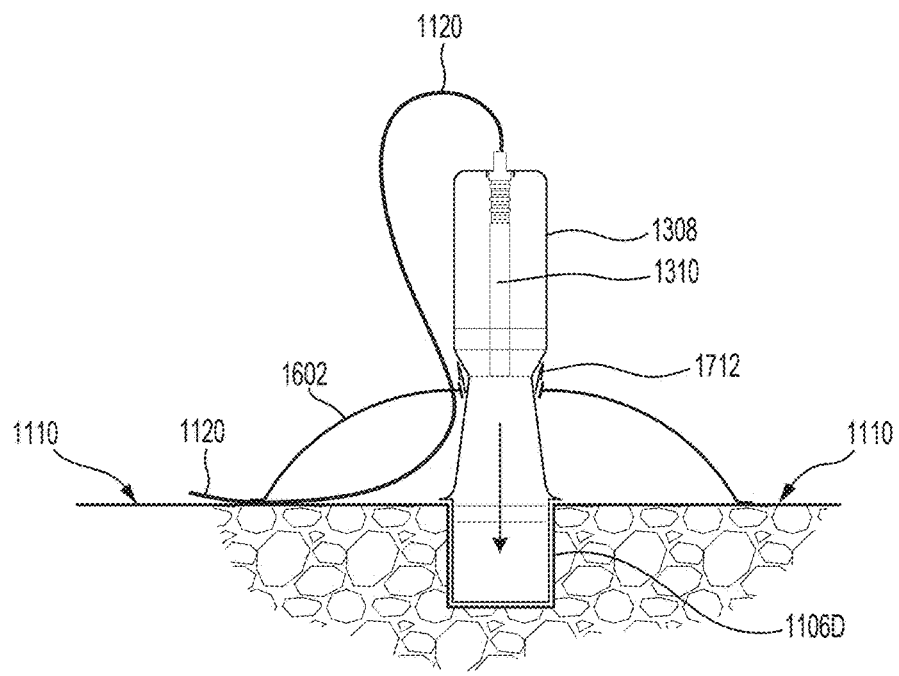
FIG. 8E is a cross-sectional sketch of the explosive device held partially above and below the surface, i.e., in very shallow borehole, recess or depression, by a stabilizer.

As shown in FIG. 8E, a QPWG can be supported and/or stabilized by way of a support/stabilization structure or device 1602 such that a distal portion or section of the QPWG is below Earth surface 1110 in a shallow/very shallow borehole, recess or depression 1106D, while other portions or sections of the QPWG extend above Earth surface 1110. Support of a QPWG in such a manner can occur by way of support/stabilization structures or devices analogous or similar to those described above, e.g., by a stabilizer (the tripod stabilizer, the cone stabilizer, or the spike stabilizer), and the ED support 1312 of the stabilizer can contact and support the QPWG 1102 substantially at or around a waist 1712 of the QPWG 1102, as shown in FIG. 8E—or the set of support structures can contact and support the outer casing 1312 substantially at or around a waist of the outer casing 1312 in a similar manner to that shown in FIG. 8E.

The system, kit and apparatus described herein can include mechanisms for blast suppression, including a rigid QPWG holding structure, device, or apparatus, and one or more blast suppression materials. In an on-surface deployment in which the QPWG's explosive charge is not surrounded, enclosed, or encased by the Earth in a borehole, noise, air blast, and/or debris (e.g., fly rock and/or shrapnel) suppression can occur by way of surrounding the QPWG with the rigid QPWG holding structure, device, or apparatus, and/or the one or more blast suppression materials in the form of energy absorbing materials, substances, or compositions. The energy absorbing materials can include one or more foam based materials, e.g., a foam based material such as described in one or more of:

Pater, L. L., Shea, J. W. 1981. An Internet report by the US Naval Surface Weapons Centre. Use of Foam to Reduce Gun Blast Noise Levels. March 1981.

Raspet, R. 1981. An Internet report by the US Army Construction Engineering Research Laboratory. Use of Aqueous Foam to Mitigate Demolitions Noise. December 1981.

Rand, P. B. (1984). Stabilized aqueous foam systems and concentrate and method for making them. U.S. Pat. No. 4,442,018A.

Raspet, R., Butler, P. B., Jahani, F. 1986. The Reduction of Blast Overpressures from Aqueous Foam in a Rigid Confinement. Applied Acoustics 22 (1987) 33-45.

Hartman, W. F., Boughton, B. A., Larsen, M. E. 2006. Blast Mitigation Capabilities of Aqueous Foam. Sandia report prepared by Sandia National Laboratories Albuquerque, NM. February 2006.

Del Prete, E., Chinnayya, A., Domergue, L., Hadjadj, A., Haas, J. F. 2012. Blast wave mitigation by dry aqueous foams. Shock Waves. 2 Aug. 2012.

Carton, E. P. 2018. AIR BLAST MITIGATION USING WATER FOAM COVERAGE. Conference Paper. Conference: Military Aspects of Blast and Shock (25th MABS), At The Hague (The Netherlands) 28 Sep. 2018.

van der Eerden, F., Carton, E. P. 2012. Mitigation of open-Air explosions by blast absorbing barriers and foam. Conference Paper. Conference: 41st International Congress and Exposition on Noise Control Engineering 2012 (INTER-NOISE 2012). January 2012.

In some embodiments, an aqueous expandable/highly expandable foam can be delivered around/over the QPWG by way of an air pump blower, and created from a suitable surfactant formulation that provides a long lasting stable foam. A representative foam can have an expansion ratio of approximately 1:500, and thus a considerable amount of foam can be generated from a minimal amount of liquid.

The foam can be contained in a rigid QPWG holding structure in the form of a foam containment device which is lightweight, portable, and re-usable. A cross sectional area/diameter and height of the foam containment device can be equidistant. There is typically no lid on the containment device nor any floor, and hence the foam containment device can essentially be a blast-resistant wall in the form of a cylindrical structure or cylinder that surrounds the QPWG. The foam containment device can include a lid to keep the foam stable during rain or snow. The foam containment device and the QPWG can be secured and kept in position during windy conditions using suitable anchoring devices and points on the foam containment device (such as loops or straps) so as not to create extra shrapnel during the blasting operation. The foam containment device and the QPWG can be made out of suitable materials that will minimise the creation of extra shrapnel during the blasting operation. The foam containment device can be light and compact enough so that it can be transported from a remote depot, e.g., manually or via mechanized, automated, or autonomous devices, e.g., an aerial or land-based remotely piloted vehicle (e.g., a drone), to a designated re-supply point in or adjacent to or within walking distance of the exploration area (also referred to as the "blasting area"), and return with remnant of used foam containment devices and other rubbish. The system, kit and apparatus described herein can include the vehicle and an electronic controller that controls and guides the vehicle.

The system, kit and apparatus described herein can include the foam generator. The foam generator can include the air pump blower. The foam generator can include a battery to power it. The foam generator can reside in a transport structure of the vehicle, or be carried by a person (operator), e.g., in a back pack, from site position to site position. The foam generator can generate and deliver the foam efficiently so that the expansion ratio of the foam is controlled and reproducible. The foam generator may use minimal foam generating solution and deliver required or optimum bubble sized foam that can attenuate the blast effectively and reduce the noise.

The system, kit and apparatus described herein can include foam generating solution. The foam generating solution is a solution that generates a stable foam forming bubbles of the required size at the required density and expansion ratio. The foam generating solution may be degradable without significant or long term adverse impacts on the environment. The foam generating solution may require only minimal personal protective equipment (PPE) for the worker or operator. The foam that is generated may be very stable—e.g., it loses approximately 1.5% by weight through draining after 60 minutes. The expansion ration may be approximately 1:500. The foam generating solution is in a form that can be transported by manually, or by mechanized/automated/autonomous devices (e.g., the aerial and/or land-based remotely piloted vehicle) to the designated re-supply point, e.g., a base. The system, kit and apparatus described herein can include refillable foam supply containers that can be returned by the persons to the re-supply point for return to the remote depot by the vehicle. Inaccessible areas can be readily reached by walking by the operator personnel who do not have to carry too much foam generating solution to be able to walk.

As shown in FIGS. 10, 11B, 11C, 11D, 11E, 11F, 11H, 12, 13 and 14, on-surface QPWG deployment, and/or near or very near surface QPWG deployment in which a distal portion of the QPWG is slightly below the surface of surrounding ground (e.g., in a depression in the ground having a depth between approximately 1-5 cm) and remaining portions of the QPWG are above ground level, can also occur by way of a special purpose pole or deployment accessory, which can be in the form of a housing or sleeve structure 1200 providing an enclosure (e.g., a rigid and/or reinforced enclosure) configured for surrounding the QPWG, and at least partially internally suppressing and containing lateral/vertical/radial explosive energy release, air blast, and debris. The special purpose pole or accessory need not be inserted into a pre-dug borehole, but may instead be pushed onto or into the Earth, thus effectively forming or digging a very shallow depression or borehole. The housing or sleeve structure 1200 (e.g., a rigid and/or reinforced housing or sleeve structure) can provide a base portion into which a QPWG (e.g., in cartridge form) is insertable. As shown in FIGS. 9A and 9B, the QPWG 1102 can be formed as or into a cartridge 1900 (portions of which can be substantially cylindrical) which includes an ID hole 1902 at its proximal end to receive the initiation device 1310 into the QPWG 1102.

Figure 11A:
FIGS. 11A to 11H are sketches of steps in a method for deploying the explosive device in association with geophysical or seismic exploration operations, processes, or procedures.
Figure 11B:
Figure 11C:
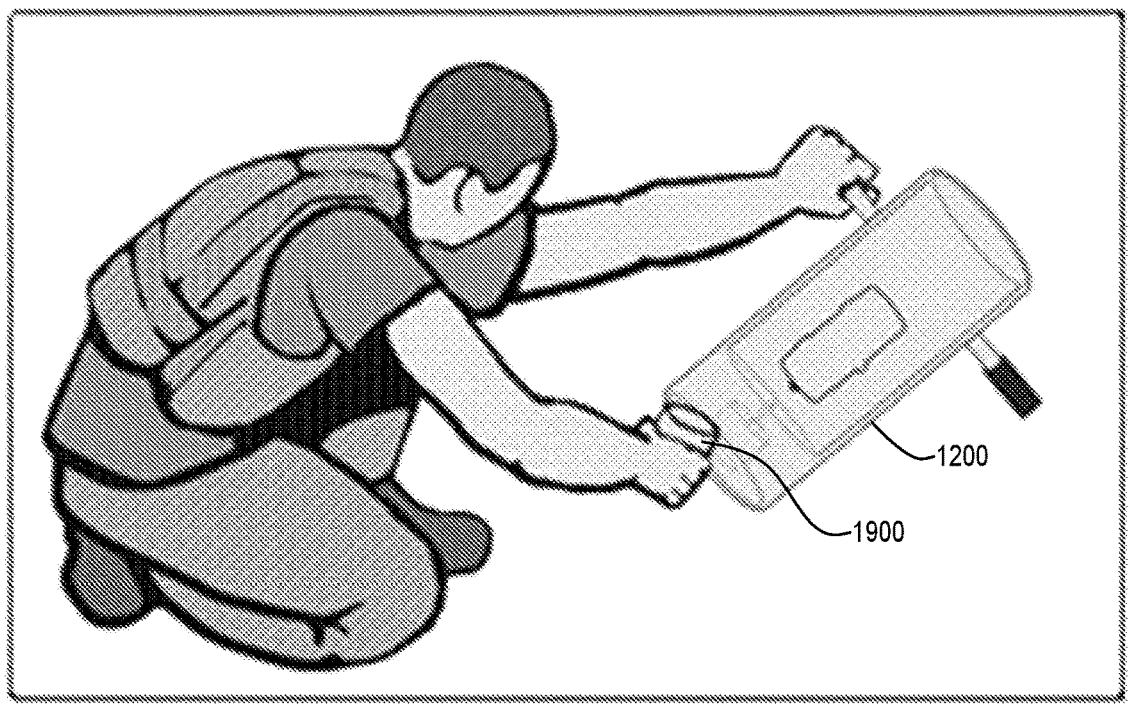

The housing or sleeve structure 1200 can include a detonation chamber element 1204 (e.g., a replaceable stainless steel detonation chamber element) that can overlay and surround the QPWG 1102 and the cartridge 1900, and can matingly engage with the base portion of the housing or sleeve structure 1200 as shown by the arrow (indicating manual insertion) in FIG. 10 and by the operator in FIG. 11C.

Figure 11D:
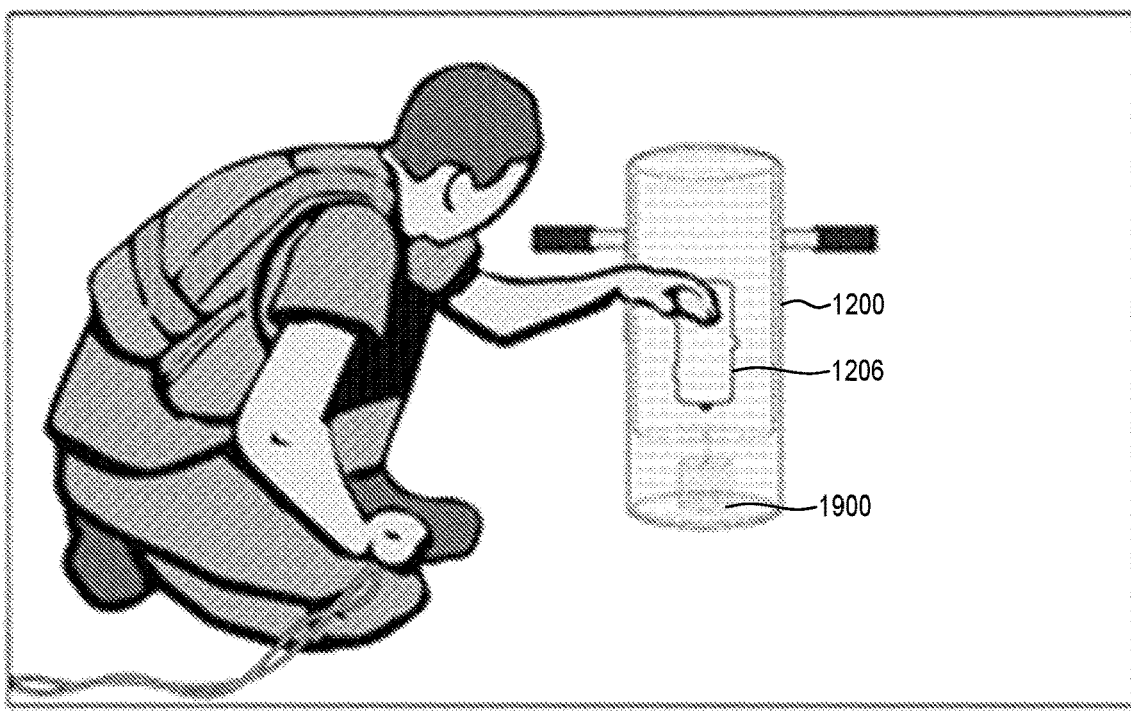
Figure 11E:
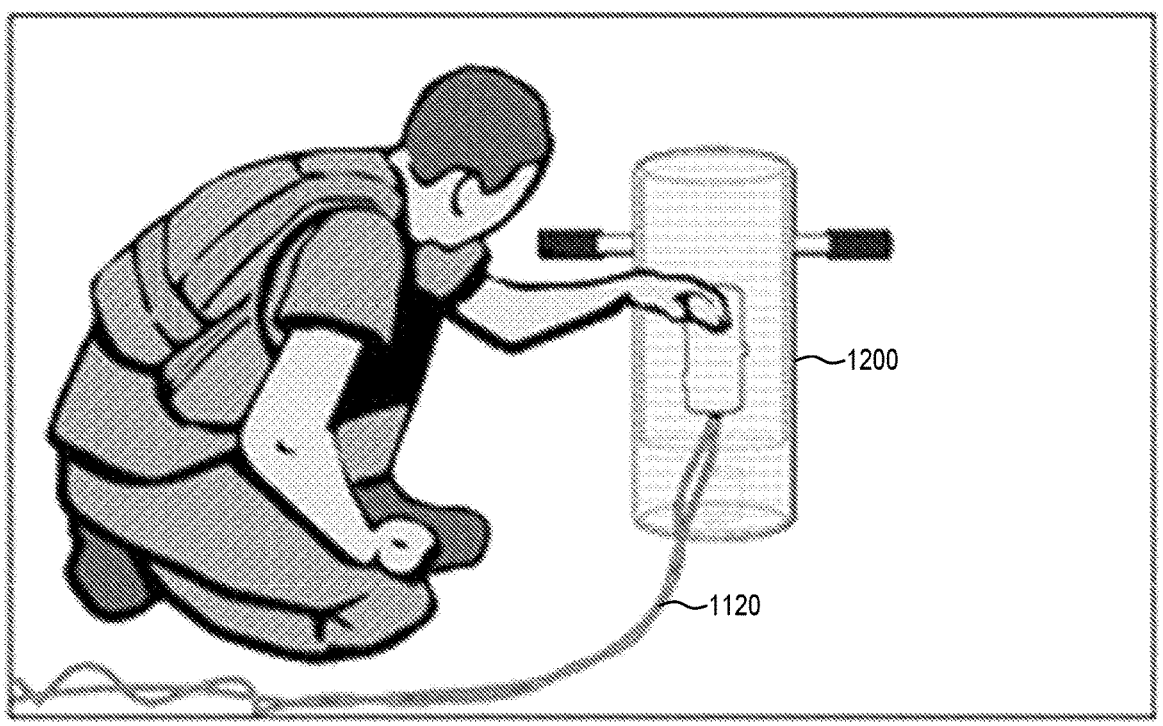

As shown in FIG. 10, the sleeve structure 1200 can include a door 1206 in a side of the sleeve structure for receiving the initiating device 1310 for the QPWG 1102 into the ID hole 1902 in the cartridge 1900 (once installed or mounted in the sleeve structure 1200), as shown by the operator in FIG. 11D. The door 1206 can also receive the cord 1120, as shown in FIG. 11E, and can be closed to seal the QPWG 1102 inside the sleeve structure 1200 during detonation. As shown in FIG. 10, the housing or sleeve structure 1200 can include two handles 1214 attached on opposite sides (i.e., lateral sides that are substantially vertical in use) towards its proximal end (upper end while in use) for manually pressing, rotating and driving the housing or sleeve structure 1200 onto or into the surface of the Earth, e.g., like a post hole digger.

A small crew of workers or operators can surface deploy and initiate/detonate QPWGs using the system, kit or apparatus including the surface deployment device, e.g., a crew of 3 workers or operators. As shown in FIG. 11A, the operators can include: a first operator with a backpack carrying a plurality of QPWG cartridges 1900; a second operator carrying a corresponding plurality of initiation devices 1310 and possibly non-electric, electric, and/or electronic couplings, links, lines, or cords 1120 corresponding to the initiation devices 1310 (and optionally a seismic mini-gun); and a third operator carrying batteries and an initiation control unit or box 1130 (i.e., a controller to signal to the initiation devices 1310 as described hereinafter), batteries, and another or a counterpart set of cords or a coupling harness 1122 or a wireless transmitter configured for signal/data communication with the initiation devices 1310; and a portable or hand held geolocation/geopositioning device 1135, which is configured for receiving Global Navigation Satellite System (GNSS) signals/data, such as global positioning satellite (GPS) signals/data, in a manner readily understood by individuals having ordinary skill in the relevant art. Once a given QPWG cartridge 1900 has been deployed (on-surface in the embodiment presently under consideration, or alternatively in-hole in other embodiments) at its intended explosive initiation position, the third operator (or another operator) can position the geolocation/geopositioning device 1135 over the QPWG cartridge 1900 to determine and record the QPWG cartridge's geolocation.

Figure 11F:
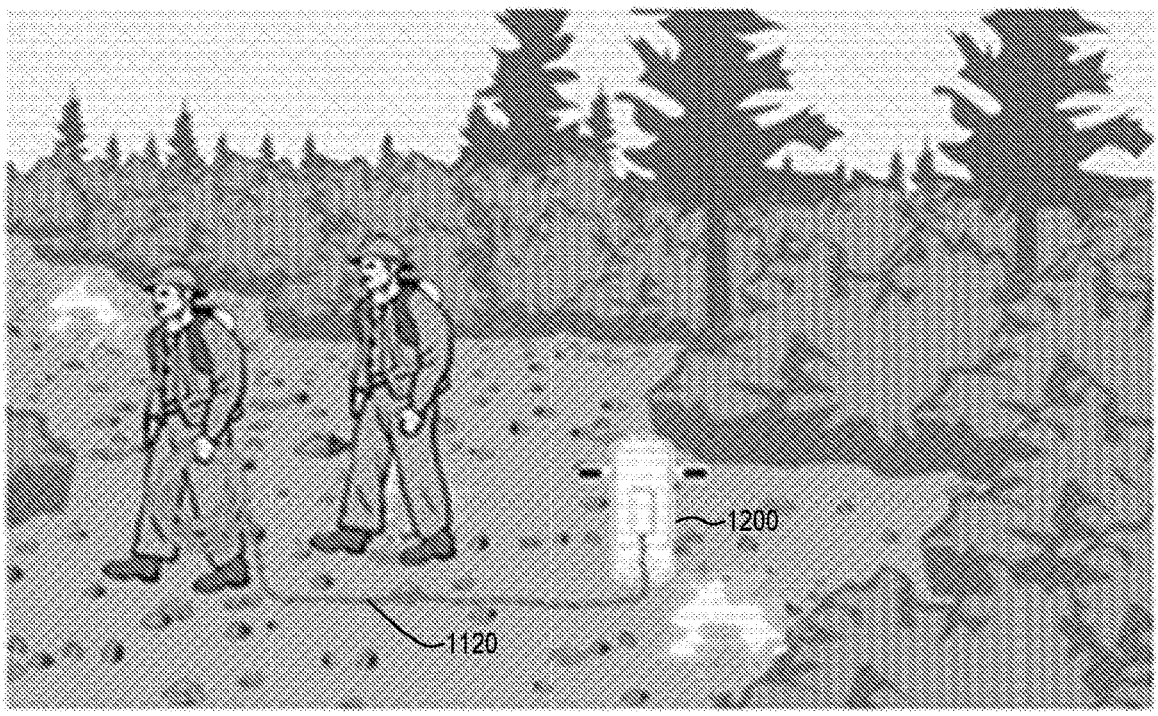
Figure 11G:
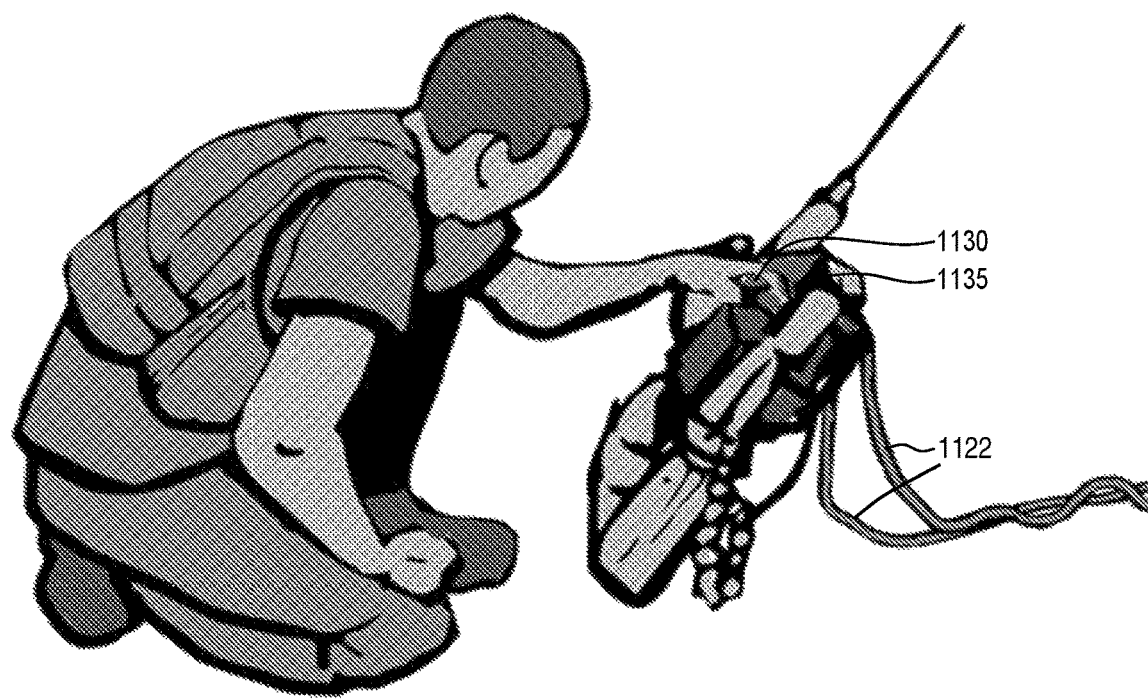
Figure 11H:
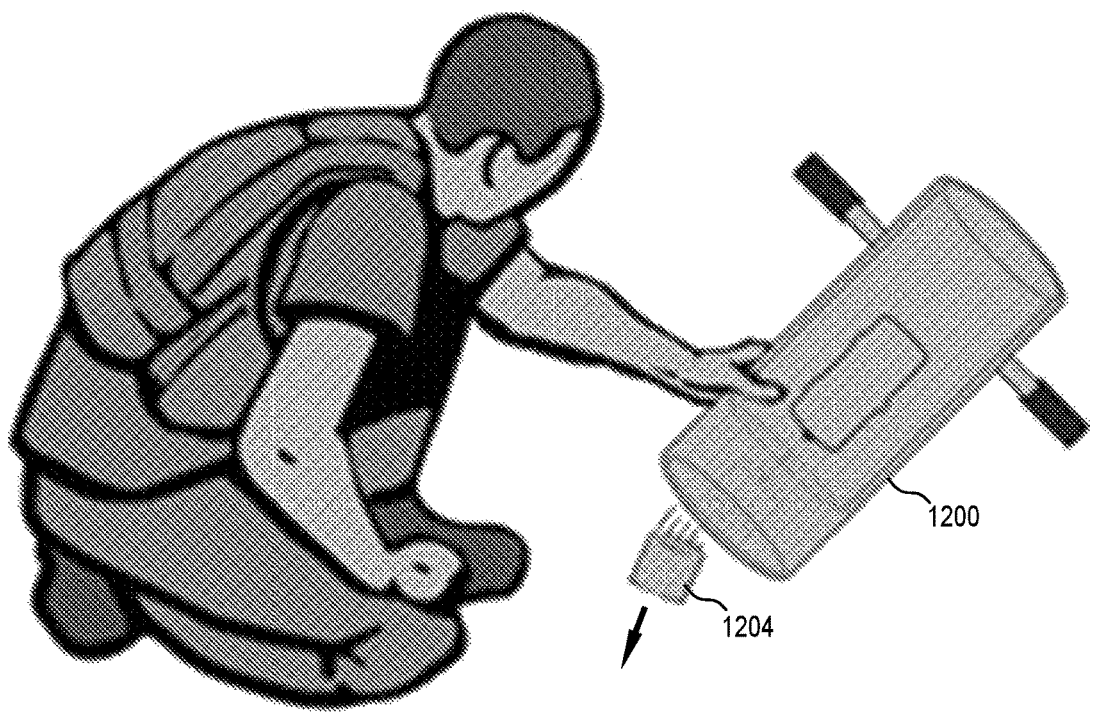

The method of seismic exploration includes:
a. providing the kit, system and apparatus at the exploration area, as shown in FIG. 11B;
b. manually inserting the cartridge 1900 with the QPWG 1102 into the base of the sleeve structure 1200, as shown in FIG. 11C;
c. manually inserting the initiating device 1310 for the QPWG 1102 into the ID hole 1902 in the cartridge 1900 through the door 1206, as shown in FIG. 11D;
d. manually connecting the cord 1120 to the initiating device 1310 through the door 1206, as shown in FIG. 11E; or alternatively wirelessly connecting to the initiating device 1310;
e. manually closing the door 1206;
f. clearing the exploration area of humans including the operators, as shown in FIG. 11F;
g. initiating the initiating device 1310 via the cord 1120 as shown in FIG. 11G, or wirelessly, as described in more detail hereinafter; and
h. manually removing any remaining detonated products, e.g., the detonation chamber element 1204, from the sleeve structure 1200, as shown in FIG. 11H, and recovering the sleeve structure 1200 for re-use.

Figure 12:
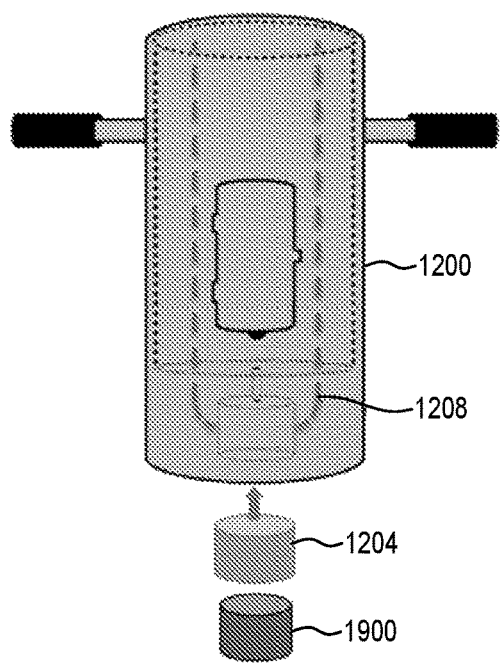
FIG. 12 is a cross-sectional diagram of the sleeve structure with gas vents.

In some embodiments, the housing or sleeve structure 1200 can include explosive gas venting structures, ports, passages, and/or tubes therein. As shown in FIG. 12, the explosive gas venting structures 1208 can lead from a cavity (in the sleeve structure 1200 that receives the detonation chamber element 1204) to the proximal end of the sleeve structure 1200 (i.e., the upper end when in use).

Figure 13:
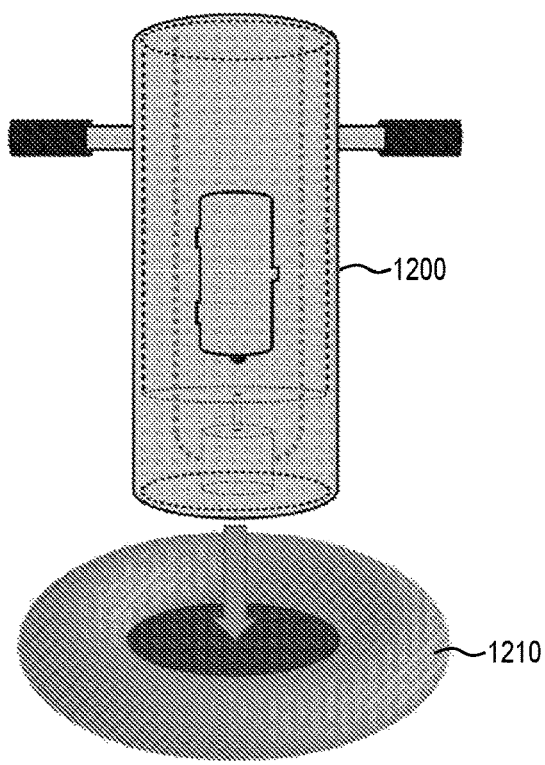
FIG. 13 is a sketch of the sleeve structure being inserted into a torus shaped sandbag.

Additionally or alternatively, in some embodiments a distal end (i.e., the terminal or ground-side end) of the housing or sleeve structure 1200 can be positioned inside a torus shaped sandbag 1210 to aid mitigation of the emission or projection of gasses, dust, and debris in radial directions away from the terminal or ground-side end of the housing or sleeve structure, e.g., the sleeve structure 1200 can be inserted into the torus shaped sandbag 1210 as shown by the arrow in FIG. 13.

Figure 14:
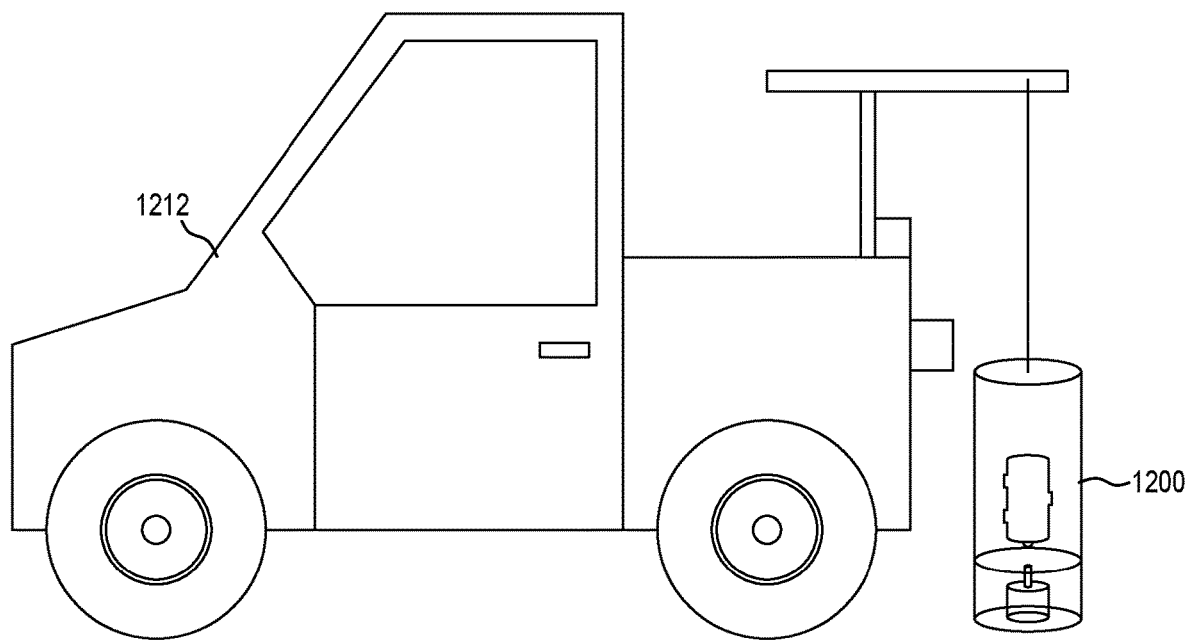
FIG. 14 is a sketch of vehicle equipped with the sleeve structure.

In addition or as an alternative to the foregoing, the system, kit and apparatus can include a QPWG deployment/blast support vehicle, e.g., an All-Terrain Vehicle (ATV) 1212, which can be equipped with the housing or sleeve structure 1200 and a mounting apparatus that selectively/selectably positions the housing or sleeve structure 1200 in a very shallow borehole, on-ground, or above/slightly above ground, e.g., as shown in FIG. 14. Such an ATV 1212 or an auxiliary ATV can carry a plurality of QPWG cartridges, detonators/initiation devices, and/or other accessories required for the method described herein.

It can be noted with respect to essentially any of the QPWGs and deployment devices indicated herein, deployment can occur manually, and/or can be supported or occur by way of one or more types of mechanized, automated, and/or autonomous vehicles (e.g., aerial and/or land-based drones) configured for carrying/transporting particular QPWG related components and/or performing particular operations in association with a seismic exploration operation.

The aerial and/or land-based remotely piloted vehicles or drones can communicate with land resident or land-based equipment in communication with or couplable/coupled to the QPWG, such as GNSS devices in communication with or couplable/coupled to or carried by the QPWG, to establish QPWG (and/or borehole) locations, and/or coordinate or control QPWG arming and firing or shooting.

Depending upon embodiment details, a QPWG can be armed and/or initiated by way of wire-based signal transfer from a remotely located control unit or controller to the QPWG, or wireless signal transfer from the control unit or controller to the QPWG. With respect to wireless signal transfer, the QPWG includes a wireless communication unit configured for wireless communication with the remotely located control unit or controller. In the context of the present disclosure a wireless QPWG refers to a QPWG that does not require or utilize wires that link the QPWG to an external control apparatus or controller located remote from the wireless initiation device for the transfer of signals, data, and commands (e.g., arming and firing commands) between the external control apparatus or controller and the QPWG, but which rather utilizes wireless communication (e.g., magnetic induction (MI) based communication, or propagating electromagnetic wave based communication) for such signal, data, and command transfer.

Wireless QPWGs can be "slept" or remain quiescent/inactive for significant periods of time (e.g., days, weeks, or months) prior to their arming and initiation. Just before their arming and initiation, they can be woken up by way of wirelessly communicated commands, after which they can be fired or shot. An aerial or land-based communications drone can carry the remotely located control unit or controller, or serve as a communication intermediary between the remotely located control unit or controller and the wireless QPWGs. Wireless QPWGs can have a structure analogous to Orica WebGen™ wireless initiation devices produced by Orica International Pte Ltd, but with internal structures (or internal structural elements) configured for transforming (specifically collimating) an explosive shock wave into a quasi-planar output shock wave that is output from the explosive device's distal end to form the seismic wave, e.g., as described hereinafter with reference to FIGS. 15 to 26, configured for intentionally transforming an explosive shock wave into a collimated and/or quasi-planar shock wave that is output across portions of the QPWG's distal end. A wireless QPWG can also include a GNSS unit configured for receiving or determining the QPWG's geo-location (e.g., GNSS coordinates), which can be wirelessly communicated to the remotely located control unit or controller. At or immediately prior to its initiation, a wireless QPWG can communicate an initiation confirmation signal or an initiation time signal to the remotely located control unit or controller, such that the remotely located control unit or controller can store the QPWGs firing time.

One or more aerial and/or land-based remotely piloted vehicles or drones can additionally carry a set of imaging devices, e.g., visible/visual band and infrared band cameras, and can scan the exploration area in which one or more QPWGs are scheduled or intended to be fired or shot to determine or verify that no humans and no animals are currently present at the time of firing or shooting. Such determination or verification can occur on an automated or autonomous basis, and may occur in association with human review (e.g., second-level review/confirmation). The aerial and/or land-based drone(s) can communicate captured images and/or videos to a remote computer system or server for the analysis thereof as part of determining or verifying that no humans or animals are currently present in the exploration area under consideration, and QPWGs can be fired or shot as scheduled or intended.

In some embodiments, the arming and/or firing of wireless QPWGs can occur by way of one or more aerial and/or land-based remotely piloted vehicles or drones, e.g., once it has been verified that no humans or animals are currently present in the exploration area under consideration. For instance, wireless QPWG arming can occur by way of an aerial and/or land-based remotely piloted vehicle or drone; and wireless QPWG firing can occur by way of human instruction sent to a remotely located control unit or controller that is in wireless communication with the QPWG(s) under consideration.

The above description details certain aspects of systems, apparatuses, devices, techniques, and processes in accordance with particular non-limiting representative embodiments of the present disclosure. It will be readily understood by a person having ordinary skill in the relevant art that modifications can be made to one or more aspects of these and related embodiments without departing from the scope of the present disclosure.

Explosive Devices

An initiable, explosive, explodable, or detonable device in accordance with various embodiments of the present disclosure includes a body structure that internally carries or confines (a) a set of explosive charge masses (hereafter "explosive charges" for purpose of brevity), each of which can be defined as "active" device component in that each explosive charge mass is capable of generating an explosive shock wave by way of releasing internally-stored explosive energy (e.g., each explosive charge mass itself within the set of explosive charge masses is detonable); and (b) a non-explosive wave shaping structure, which can be defined as a "passive" device component in that the wave shaping structure itself does not or need not include any explosive composition therein, and does not or need not internally store explosive energy (e.g., the wave shaping structure itself is non-detonable, or explosively inert from a chemical composition perspective). The body structure includes a set of internal volumes, chambers, or cavities in which the set of explosive charges and the wave shaping structure reside. The set of explosive charges and the wave shaping structure are cooperatively structured and disposed relative to each other such that the explosive device or explosive wave shaping device outputs explosive energy exhibiting a quasi-planar wave front at or adjacent (e.g., directly adjacent) to a principal output end of the body structure. Portions of this quasi-planar wave front can travel quasi-unidirectionally (e.g., in a downward direction) as the quasi-planar wave front propagates away from the principal output end of the body structure, thereby significantly, greatly, or dramatically enhancing the amount of explosive energy that propagates in an intended or target direction, and/or which is couplable or coupled into an intended or target material, substrate, or environment (e.g., geologic substrata) below the body structure's principal output end compared to a conventional explosive device that outputs explosive energy exhibiting a spherical, hemispherical, or approximately hemispherical (e.g., a prolate spheroid shape, profile, or contour, or a teardrop shape having a lower or wider region that resembles, approximates, or corresponds to a hemispherical shape) type of wave front at an analogous output end rather than a quasi-planar wave front, as further elaborated upon below.

FIGS. 15-22 are schematic illustrations showing vertical cross-sections of particular non-limiting representative embodiments of explosive devices or quasi-planar explosive shock wave generation devices 10a-g in accordance with the present disclosure, where such vertical cross-sections are taken through or along a central, lengthwise, longitudinal, or vertical axis (e.g., a z axis) of each such device 10a-g, e.g., a central axis 5 definable or defined along or through the height or depth of a body structure or body 100 of the device 10a-g. Unless explicitly indicated, e.g., in the context of pointing out particular distinguishing aspects of or differences between one or more representative embodiments of the explosive devices 10a-g shown in FIGS. 15-22, for purpose of brevity and clarity, any, some, or all of such devices 10a-g may be referred to using reference numeral 10 in portions of the following description, in a manner readily understood by individuals having ordinary skill in the relevant art.

In multiple embodiments, the body structure or body 100 of an explosive device 10 has a first, proximal, or upper portion 110 providing a first, proximal, or upper body end or face 112; an opposing second, distal, or lower portion 120 providing a second, distal, or lower body end or face 122, which forms the body's principal output end; and a height, depth, length, or longitudinal or axial extent between the proximal and distal ends or faces 112, 122. A set of exterior or external surfaces or outer walls 130 of the body 100 resides or extends between the body's proximal end 112 and distal end 122. The central, lengthwise, longitudinal, or vertical axis (e.g., a z axis) 5 can be defined relative to or through a centroid or center point of the body's cross-sectional area perpendicular to the central axis 5. The body 100 is commonly symmetric about the central axis 5 (e.g., along the body's height).

For purpose of simplicity and clarity with respect to the description that follows, the terms "upper," "above," or the like (e.g., "top," or "on top of") correspond to or define a spatial region, position, location, or site that is closer in relative terms to the proximal end 112 of the body 100 than the distal end 122 of the body 110 for a given point within a cross-sectional area of the body 100 perpendicular to the central axis 5; and the terms "lower," "below," or the like (e.g., "beneath" or "under") correspond to or define a spatial region, position, location, or site that is closer in relative terms to the distal end 122 of the body 100 than the proximal end 112 of the body 100 for a given point within a cross-sectional area of the body 100 perpendicular to the central axis 5. The terms "downward" and "downwardly" correspond to or define one or more spatial directions away from the proximal end 112 of the body 100 toward and/or beyond its distal end 122; and the terms "upward" and "upwardly" correspond to or define one or more spatial directions away from the distal end 122 of the body 100 toward and/or beyond its proximal end 112. Additionally, the terms "inward," "inwardly," or the like (e.g., "inner") correspond to or define one or more spatial directions toward the central axis 5, and the terms "outward," "outwardly," or the like (e.g., "outer") correspond to or define one or more spatial directions away from the central axis 5. The terms "thickness," "height," or "depth" are defined as distances parallel to or along the central axis 5. The term "cross-sectional area" is typically defined perpendicular to the central axis 5, unless otherwise stated. Additionally, the terms "lateral" and "radial" are defined with respect to a plane (e.g., an x-y plane) that is perpendicular to the central axis 5.

The aforementioned relative spatial location or direction related terms are used for purpose of simplicity and aiding understanding. Individuals possessing ordinary skill in the relevant art will understand that these relative spatial location or direction related terms can be defined in a different manner for a given explosive device 10 in accordance with an embodiment of the present disclosure, yet regardless of such terminology difference(s), the explosive device's structure remains fundamentally consistent, unchanged, or the same.

With reference again to FIGS. 15-22, in several embodiments particular portions of the body 100 geometrically resemble or correspond to a tapered cylindrical structure (e.g., particular portions of the body 100 have a generally conical or conical profile). For instance, at least part of the upper portion 110 of the body can correspond to a cylinder having a tapered region or a tapered set of first outer walls 130a, such that the body 100 is narrowest at its proximal end 112. Below the tapered set of first outer walls 130a, portions of the body 100 can correspond to a non-tapered cylinder, or a differently tapered cylinder (e.g., a more steeply sloped, yet progressively widening/slightly widening cylinder). For instance, the body 100 can include a vertical set of second outer walls 130b below the tapered set of first outer walls 130a, extending from a lower border of the tapered set of first outer walls 130a to the body's distal end 122. Notwithstanding, in other embodiments the body 100 can exhibit or correspond to another shape or geometry, for instance, a tapered pyramidal structure having polygonal surfaces that approximate the shape of a tapered cylinder; or a non-tapered cylinder.

The body 100 typically includes or is formed as a rigid structure, and can be manufactured using or from one or more types of polymer or plastic materials, for instance, polyurethane, nylon (e.g., nylon 6, 6), or acetal (e.g., DuPont™ Delrin®). The body 100 can be manufactured in multiple manners, such as by way of molding (e.g., injection molding), machining, and/or additive manufacturing (e.g., three dimensional (3D) printing) techniques, processes, or procedures. In some embodiments, one or more portions of the body 100 include a composition that is at least somewhat or partially degradable (e.g., by way of biodegradability and/or photodecomposition) within the explosive device's application environment, for instance, by way of one or more additives provided during body manufacture. Depending upon embodiment details, such additives can include d2W (Symphony, Hertfordshire, UK), TDPA™ (EPI Environmental Technologies Inc, BC, Canada), and/or another type of substance or chemical composition or compound. Additionally or alternatively, one or more portions of the body 100 can include or be partially composed of one or more materials that are at least somewhat or partially inherently degradable in the explosive device's application environment. Such materials that are inherently degradable can include materials that have been shown to be biodegradable or compostable (e.g., within a functionally relevant time scale) by way of various techniques and/or applicable standards, which will be readily apparent to individuals having ordinary skill in the relevant art (e.g., in Europe, EN 13432; or in the United States, ASTM D6400), or which have been or can be demonstrated to be at least somewhat or partially degradable or compostable in an application environment under consideration. Correspondingly, one or more portions of the body 100 can include one or more plant-derived plastics, including Poly-Lactic Acid (e.g., Ingeo 3251D, Natureworks LLC, MN USA); potato starch (e.g., BiomeEP1, Biome Technologies plc, Southampton UK); corn starch (e.g., PLANTIC™ RE, Plantic Technologies Limited, Australia), and/or another type of substance or chemical composition or compound. It should be noted that when the body 100 includes a set of at least somewhat or partially degradable compositions or materials, the amount of such composition(s) included in the body 100 should be sufficiently low that the slope of the shock Hugoniot remains within an intended, target, or optimal range, as further elaborated upon below.

The set of explosive charges includes at least a first, upper, or donor explosive charge mass (hereafter "donor charge" or "donor" for purpose of brevity) 200 that is confined within the body 100, and which resides above (e.g., directly above) the wave shaping structure or wave shaper 300 (hereafter "shaper" for purpose of brevity). In various embodiments, such as shown in FIGS. 16A-22, the set of explosive charges also includes a second, lower, receptor, or acceptor charge mass (hereafter "acceptor charge" or "acceptor" for purpose of brevity) 400 that is confined within the body 100, and which resides below (e.g., directly below) the wave shaper 300.

The body 100 includes a passage, channel, slot, well, or chamber 101 therein, into which at least portions of an initiation device or initiator 20 (e.g., a detonator, an optical or laser based initiation device, or another type of initiation device depending upon embodiment details) is insertable, inserted, or disposed. The initiation device 20 is configurable, configured, or activatable for initiating or triggering the release of explosive energy by the donor charge 200, such that the donor charge 200 correspondingly or responsively generates a self-propagating explosive shock wave, as understood by individuals having ordinary skill in the relevant art. In various embodiments, the passage 101 is an elongate structure that extends from an aperture or opening formed at the proximal end 112 of the body 100 to a predetermined depth or length within the body 100, toward or to the upper end 212 of the donor charge 200. The passage 101 typically has a centroid or center point through which the central axis 5 of the body 100 extends. The passage 101 commonly has a generally cylindrical or cylindrical shape. The passage 101 can be tapered along its height or depth, e.g., such that a lower portion of the passage 101 has a larger (e.g., slightly larger) cross-sectional area perpendicular to the central axis 5 than an upper portion of the passage 101 near or at the device's proximal end 112. The passage 101 can additionally or alternatively accommodate, carry therein, or incorporate one or more types of structural features configured for aiding retention of the initiation device 20. The structural details of the passage 101 depend upon the type of initiation device 20 employed, in a manner that individuals possessing ordinary skill in the relevant art will readily comprehend. For purpose of simplicity and clarity, initiating devices 20 are not shown throughout the entirety of the FIGs., yet individuals having ordinary skill in the relevant art will clearly, directly, and unambiguously understand the manner in which an explosive device 10 in accordance with an embodiment of the present disclosure and an initiation device 20 are configured for cooperative engagement and operation with each other.

The donor charge 200 can be configured for generating explosive energy (e.g., a donor charge shock wave) providing a donor charge wave front exhibiting a generally or approximately hemispherical spatial profile or distribution. The wave shaper 300 is configured for (a) receiving particular downwardly propagating portions of the donor charge wave front at particular times; (b) altering, transforming, or reshaping the spatial profile or distribution of those portions of the donor charge wave front that the wave shaper 300 has received up to a given time relative to other downwardly propagating portions of the wave front that the wave shaper 300 has not yet received, but will receive, in order to collimate the wave front; and (c) outputting a substantially downwardly propagating transformed (and collimated) shock wave having a wave front that exhibits a non-hemispherical, quasi-planar spatial profile or distribution, and which can serve as a shock initiation source for initiating the acceptor charge 400. In response to its initiation by the quasi-planar wave front received from the wave shaper 300, the acceptor charge 400 generates explosive energy providing an acceptor charge wave front that correspondingly has a similarly non-hemispherical, quasi-planar spatial profile or distribution, and which can be coupled into a target material, substrate, or environment external to the explosive device 10.

Each of the donor charge 200 and the receptor charge 400 includes at least one type of energetic formulation or explosive composition or compound. A wide variety of explosive compositions or compounds are suitable for use in explosive devices 10 in accordance with embodiments of the present disclosure. Typically, each of the donor charge 200 and the acceptor charge 400 includes or is a secondary explosive composition. Suitable secondary explosive compositions include pentaerythritol tetranitrate (PETN); a blend of trinitrotoluene (TNT) and PETN, e.g., 50% TNT and 50% PETN, generally referred to as Pentolite, which can vary in the relative proportions of the two main components and can include other components; Composition B (50% trinitrotoluene (TNT) and 50% cyclotrimethylenetrinitramine, where cyclotrimethylenetrinitramine is generally referred to as Research Department eXplosive (RDX); pressed RDX, which is a combination of RDX and a wax (e.g., 90% RDX and 10% wax); and PBX (92% PETN and 8% inert polymer).

In several embodiments, the donor charge 200 and the acceptor charge 400 are each formed of the same type of explosive composition. For instance, in a non-limiting representative implementation, each of the donor charge 200 and the acceptor charge 400 includes Pentolite (e.g., the donor charge 200 and the acceptor charge 400 can each carry or be formed of an identical Pentolite formulation), which can provide a good balance of explosive performance and safety. In other embodiments, the donor charge 200 and the acceptor charge 400 are formed of different types of explosive compositions. For a given explosive device 10, particular set of energetic formulations or compositions for the donor charge 200 and/or the acceptor charge 400 can be selected in accordance with the reaction rate(s) of the explosive composition(s) and/or explosive reaction zone thickness(es) thereof, such that the quasi-planar shock wave output by the explosive device 10 exhibits a desired or required duration and/or acoustic or sonic frequency content or frequency spectrum (e.g., which is suitable or well-suited to a given explosive application or environment under consideration, such as seismic exploration). Thus, the frequency content of an explosive device 10 in accordance with an embodiment of the present disclosure can be established, selected, or customized based on the energetic properties of the donor charge 200 and/or the acceptor charge 400. Individuals having ordinary skill in the relevant art will understand that the selection of a given type of donor charge or acceptor charge explosive composition can influence or determine the range of techniques by and/or relative ease with which an explosive device 10 in accordance with an embodiment of the present disclosure can be manufactured.

The donor charge 200 includes a first or upper end 212 and a second or lowest end 222, where the upper end 212 of the donor charge 200 is closer to the proximal end 112 of the body 100 than the lowest end 222 of the donor charge 200. At the lowest end 222 of the donor charge 200, the body 100 has a predetermined thickness perpendicular to the central axis 5, i.e., lowest end 222 of the donor charge 200 is laterally or horizontally offset away from the outer wall(s) 130 of the body 100 by a predetermined minimum distance, as further detailed below.

The donor charge 200 also includes a set of peripheral surfaces that extend downwardly and outwardly, from the donor charge's upper end 212 to its lowest end 222. More specifically, the donor charge 200 includes a first or upper set of peripheral surfaces 230 sloping downwardly and outwardly toward the body's exterior walls(s) 130; and a second or lower set of peripheral surfaces 240 disposed closer to the body's distal end 122 than the upper set of peripheral surfaces 230, also sloping downwardly and outwardly toward the body's exterior walls(s) 130. The donor charge 200 additionally includes an intermediate point or end 214 (which can also be referred to as an indented point of the donor charge 200) disposed along the central axis below its upper end 212, where the intermediate end 214 resides above the donor charge's lowest end 222. The intermediate end 214 of the donor charge 200 defines a donor charge position or location at which the lower set of peripheral surfaces 240 intersects the central axis 5.

In view of the foregoing, in various embodiments the shape or structure of the donor charge 200 corresponds, approximately corresponds, or generally corresponds to or resembles a frustum of material that has a conical recess or void formed therein, where the conical recess defines the donor charge's intermediate end 214 and lower set of peripheral surfaces 240. The intermediate end 214 may therefore be referred to as a tip of this conical recess or void. The donor charge 200 carries one or more types or explosive compositions or compounds within its volume above this conical recess. For instance, in multiple embodiments the donor charge 200 geometrically corresponds, approximately corresponds, or generally corresponds to or is mathematically correlated with or resembles portions of a right circular frustum (i.e., a right circular cone truncated perpendicular to its axis of symmetry) of material (where the material includes one or more types or explosive compositions or compounds) having a right circular conical recess therein. More particularly, in several embodiments the donor charge's upper end 212, set of upper peripheral surfaces 230, and lowest end 222 correspond, approximately correspond, or generally correspond to a doubly-truncated first right circular cone, i.e., a first right circular cone having a horizontal first truncation associated with or corresponding to the donor charge's upper end 212, and a vertical second truncation associated with or corresponding to the donor charge's lowest end 222. More specifically, in such embodiments the doubly-truncated donor charge 200 corresponds to a first right circular cone that has been (a) horizontally truncated (e.g., by a horizontal plane) proximate to the first right circular cone's vertex; and (b) vertically truncated (e.g., by a cylinder) at a predetermined radial or axial distance away from the central axis 5, around the central axis 5. Moreover, the donor charge's intermediate end 214 and set of lower peripheral surfaces 240 correspond to the apex and lateral surface, respectively, of a second right circular cone that sits or defines a recess within this doubly-truncated first right circular cone, where the larger or lower base of the first right circular cone and the base of the second right circular cone share the same center point (through which the body's central axis 5 extends) and reside in a common plane, and the smaller or upper base of the perpendicularly truncated first right circular cone and the vertex of the second right circular cone are oriented in the same direction toward the proximal end of the body 10. At its lowest end 222, such a donor charge 200 spans or extends across a predetermined circular cross-sectional area perpendicular to the central axis 5 of the body 100, which corresponds to the radial distance away from the central axis 5 at which the aforementioned vertical truncation of the first right circular cone occurs. This type of doubly-truncated first cone can be referred to or defined as a quasi-cone, and thus such a donor charge 200 can be referred to or categorized or defined as non-cylindrical and quasi-conical in terms of its overall structure.

Individuals having ordinary skill in the relevant art will understand that in alternate embodiments, one or more portions of the donor charge 200 need not correspond to a cone having smooth lateral surfaces, but rather one or more portions of the donor charge 200 can be cone-like or approximately conical, e.g., at least some portions of the donor charge 200 can include or be formed as polygonal regions or surfaces such that the overall shape of the donor charge 200 resembles or approximately resembles a cone, e.g., a pyramidal cone. Individuals having ordinary skill in the relevant art will further recognize that the donor charge 200 need not closely resemble a cone, but instead can exhibit another shape, e.g., a pyramidal shape that is readily distinguishable from a conical shape. However, the use of a donor charge 200 having portions that correspond to or which resemble (e.g., closely resemble) a cone can reduce, minimize, or optimize the mass of explosive material(s) that the donor charge 200 needs to carry for the explosive device 10 to function as intended.

As will be understood by individuals having ordinary skill in the relevant art in view of the preceding description directed to the initiating device 20 and the passage 101, the donor charge 200 is typically initiated at an initiation region or site located at and/or proximate to (a) the donor charge's upper end 212, and (b) the central axis 5 of the body 100. The aforementioned horizontal truncation of the donor charge 200 proximate to the first right circular cone's vertex eliminates any donor charge structural singularity that can unpredictably or adversely affect the generation of a self-propagating shock wave within the donor charge 200. Following its initiation, the donor charge 200 releases explosive energy in the form of a shock wave exhibiting a hemispherical or approximately hemispherical wave front, which propagates radially outward with respect to the initiation site. For purpose of simplicity and brevity, in the description that follows the shock wave generated by the donor charge 200 is considered to exhibit a hemispherical wave front. In various embodiments, the donor charge 200 has a thickness or height along the central axis 5 between its upper end 212 and its intermediate end 214 that is sufficient to enable the shock front generated within the donor charge 200 to propagate, transition, or run up to detonation by the time it reaches the donor charge's intermediate end 214 (e.g., by the time the hemispherical shock front generated by the donor charge 200 arrives at the donor charge's intermediate end 214, the hemispherical shock wave has transitioned into a hemispherical detonation front).

The wave shaper 300 is disposed below or adjacent (e.g., directly adjacent) to the donor charge's intermediate end 214 and lower peripheral surface(s) 240, such that the wave shaper 300 receives downwardly-traveling portions of the hemispherical wave front generated by the donor charge's release of explosive energy. The wave shaper 300 includes at least one type of material structured and/or shaped for selectively affecting or attenuating the propagation speed of downwardly propagating portions of the wave front received from the donor charge 200 as a function of time relative to other downwardly propagating portions of the wave front that the wave shaper 300 has not yet received from the donor charge 200. More particularly, the wave shaper 300 is cooperatively structured or shaped relative to the structure or shape of the donor charge 200 such that after downwardly propagating portions of the hemispherical wave front received by the wave shaper 300 have propagated into and through the wave shaper 300, a terminal surface 322 of the wave shaper 300 outputs a downwardly propagating first quasi-planar or essentially planar shock wave across at least 40%-70% (e.g., 50%-60%), or across the majority, or across essentially the entirety of the cross-sectional area of its terminal surface 322 perpendicular to the body's central axis 5. The wave shaper 300 thus transforms (collimates) downwardly propagating portions of the hemispherical wave front (e.g., a hemispherical detonation front) received from the donor charge 200 into a first quasi-planar wave front that is output at the wave shaper's terminal surface 322, and which further propagates downwardly therefrom.

The wave shaper 300 has a top end, peak, apex, or tip 314 that interfaces with or abuts the intermediate end 214 of the donor charge 200. The terminal surface 322 of the wave shaper 300 is disposed a predetermined distance away from the wave shaper's top end 314, and resides or approximately resides in a plane perpendicular to the body's central axis 5. The wave shaper 300 also includes a set of lateral surfaces 330 that extend downwardly and outwardly from the wave shaper's top end 314 to its terminal surface 322, thus the wave shaper 300 has a cone or conical shape (which may have a circular, elliptical or polygonal base), with its tip at the top end 314, that corresponds to and fits with the void defined by the donor charge 200 (which exhibits the geometric shape that is correlated with or which corresponds to the second cone). Typically, the wave shaper's set of lateral surfaces 330 abut the donor charge's set of lower peripheral surface(s) 240. The wave shaper's terminal surface 322 has a predetermined cross-sectional area perpendicular to the central axis 5 (e.g., the terminal surface 322 is typically circular), which is the wave shaper's maximum cross-sectional area. In various embodiments, the cross-sectional area of the terminal surface 322 of the wave shaper 300 matches and is aligned (e.g., precisely aligned) with the cross-sectional area of the lowest end 222 of the donor charge. Thus, the wave shaper 300 does not extend to the outer wall(s) 130 of the body 100, but instead is laterally or horizontally disposed inward of the outer wall(s) 130 by the same predetermined distance as the lowest end 222 of the donor charge 200.

Because the wave front of the explosive energy generated by the donor charge 200 is hemispherical and propagates radially away from an initiation site located at and/or proximate to the upper end 212 of the donor charge 200 at and/or proximate to the central axis 5 of the body 100, with respect to a given horizontal cross-sectional area or "slice" of the wave shaper 300, i.e., perpendicular to the central axis 5 of the body 100, that resides proximate to the wave shaper's top end 314 (i.e., a perpendicular "slice" of the wave shaper 300 that is closer to the wave shaper's top end 314 than its terminal surface 322), locations within this wave shaper cross-sectional area that are closer to the central axis 5 receive downwardly propagating portions of the hemispherical wave front generated by the donor charge 200 earlier in time than locations within this wave shaper cross-sectional area that are further from the central axis 5. In order to enhance or increase the planarity of earlier-received downwardly propagating portions of the hemispherical wave front generated by the donor charge 200 relative to later-received downwardly propagating portions of this hemispherical wave front, the wave shaper 300 is structured such that (a) those portions of the downwardly propagating hemispherical wave front that the wave shaper 300 receives earlier in time have their speed attenuated during their propagation within the wave shaper 300 over a longer distance, and hence a longer time interval, than those portions of the downwardly propagating hemispherical wave front that the wave shaper 300 receives later in time; and (b) at the wave shaper's terminal surface 322, the original hemispherical wave front that was received by the wave shaper 300 and which has propagated through and is output by the wave shaper 300 has been transformed into the first quasi-planar wave front.

In view of the foregoing, in various embodiments the wave shaper 300 includes or is formed of a rigid and/or solid piece of material having a thickness or height that varies with distance away from the central axis 5: the wave shaper 300 in various embodiments can therefore be referred to as a solid structure comprising the solid material. More particularly, the wave shaper 300 is thickest or tallest along the body's central axis 5 (i.e., between the wave shaper's top end 312 and its terminal surface 322 along the central axis 5).

The wave shaper 300 typically exhibits a triangular or approximately triangular two dimensional (2D) profile within a vertical cross-section of the device 10 taken along the central axis 5 based on its cone or conical shape. Also, as indicated above, at its terminal surface 322, the wave shaper's cross-sectional area or diameter perpendicular to the central axis 5 approximately defines or defines the cross-sectional area or diameter, respectively, spanned by the donor charge's lowest end 222. In general, the upwardly facing portions of the wave shaper 300, i.e., the wave shaper's top end 314 and set of lateral surfaces 330, correspond or conform to the geometry of the donor charge's set of lower surfaces 240. Thus, the geometry of the wave shaper 300 is correlated with or depends upon the geometry of the donor charge 200 (and vice versa). The set of lateral surfaces 330 define a conical face or surface that faces the donor charge 200 and that defines the upper face of the cone or conical shape of the wave shaper 300. Regardless of the details of any given embodiment, the wave shaper 300 is designed, configured, or structured such that following the donor charge's release of explosive energy exhibiting a hemispherical or generally hemispherical wave front, the wave shaper 300 transforms and collimates downwardly propagating portions of this wave front to become quasi-planar by the time the wave front has propagated through the wave shaper 300 and has reached the wave shaper's terminal surface 322.

The wave shaper 300 includes or is formed as a rigid structure, and can be manufactured from one or more types of polymer or plastic materials, such as polyurethane or nylon 6, 6. The wave shaper 300 can be manufactured in multiple manners, such as by way of molding (e.g., injection molding), machining, and/or additive manufacturing (e.g., 3D printing) techniques, processes, or procedures. Depending upon embodiment details, the wave shaper 300 and the body 100 can be manufactured together as an integral unit (e.g., simultaneously in the same manufacturing process or procedure); or the wave shaper 300 can be manufactured separately from the body 100, and inserted, affixed, or adhered therein. Further depending upon embodiment details, the wave shaper 300 can be formed of the same material(s) as the body 100, or the wave shaper 300 can carry one or more materials that the body 100 does not include. Also, the wave shaper 300 can be composed of one or more types of materials and/or include one or more types of additives that facilitate or enable wave shaper degradability in the explosive device's application environment, such as indicated above for the body 100.

Figures 15, 16A:
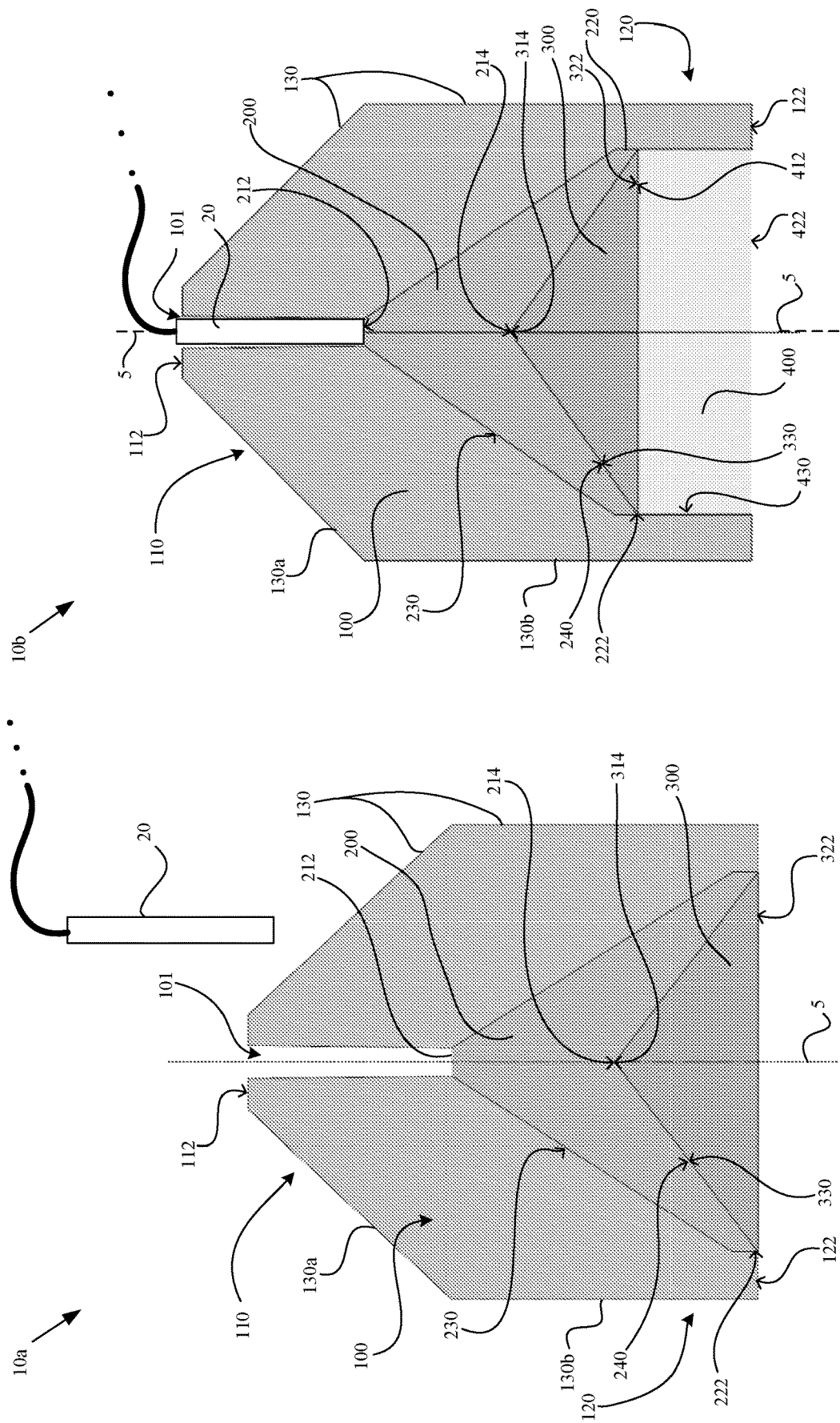

In an explosive device 10a such as that shown FIG. 15, the set of explosive charges includes only the donor charge 200 and the wave shaper 300, i.e., no acceptor charge 400 is present. This type of embodiment can be useful in applications in which further explosive amplification of the quasi-planar shock wave output by the wave shaper 300 is not required, and this quasi-planar shock wave can be coupled or delivered into a material, substrate, or environment external to the device 10a to achieve an intended result.

As indicated in several representative embodiments of explosive charges 10b-h shown in FIGS. 16A-22, an explosive device 10 can also include an acceptor charge 400 in addition to the donor charge 200. The acceptor charge 400 resides below the wave shaper 300, and carries at least one type of explosive composition or compound therein. More particularly, the acceptor charge 400 includes an upper surface 412 disposable or disposed adjacent (e.g., directly adjacent) to the terminal surface 322 of the wave shaper 300; a lower or bottom surface 422 disposable or disposed at a predetermined distance below the upper surface 412, e.g., such that the lower surface 422 opposes the upper surface 412 and is typically coincident with the terminal end 122 of the body 100; and a set of peripheral surfaces 430 extending between the upper and lower surfaces 412, 422 along an acceptor charge thickness or height.

The first quasi-planar shock wave output at the terminal surface 322 of the wave shaper 300 serves as a shock initiation source for initiating the acceptor charge 400. The acceptor charge 400 is configured for explosively amplifying the first quasi-planar shock wave while retaining or approximately maintaining wave front quasi-planarity (of the propagated shock wave) to generate a second quasi-planar shock wave (or "output shock wave") that is output at the acceptor charge's lower surface 422 (e.g., such that the spatial distribution, profile, or curvature and directionality of the second quasi-planar shock wave are nearly or essentially identical to the spatial distribution, profile, or curvature and directionality of the first quasi-planar shock wave), e.g., for delivery into the Earth. The thickness of the acceptor charge 400 is commonly selected such that the second quasi-planar shock wave has run up to detonation at least by the time it reaches the lower surface 422 of the acceptor charge 400, and thus at its lower surface 422, the acceptor charge 400 outputs a quasi-planar detonation front that propagates downwardly away from the distal end 122 of the body 100.

The wave shaper 300, the donor charge 200, and the acceptor charge 400 are cooperatively aligned relative to each other such that the maximum lateral or horizontal spatial extent or span of the wave shaper 300 coincides with, limits, approximately establishes, or establishes the maximum lateral or horizontal spatial extent or span of the donor charge 200 and the acceptor charge 400. Moreover, none of the donor charge, the wave shaper 300, and the acceptor charge 400 laterally or horizontally extend to the outer wall(s) of the body 100, but rather their maximum lateral or horizontal spatial extent perpendicular to the central axis 5 coincides with or is determined by the perpendicular cross-sectional area of the terminal surface 322 of the wave shaper 300. That is, the acceptor charge 400 has a perpendicular cross-sectional area that does not extend to the outer wall(s) 130 of the body 100, but rather is laterally or horizontally disposed inward of the body's outer wall(s) 130 by the same predetermined distance as the terminal surface 322 of the wave shaper 300 and the lowest end 222 of the donor charge 200. This predetermined distance can be determined, e.g., as a minimum body width perpendicular to the central axis 5, by the material properties of the body 100. More particularly, this predetermined distance can correspond to or be defined by a minimum or consistently reliable body material width for which no significant deformation of the body 100 (e.g., less than 5-15% deformation of those portions of the body's terminal end 122 that extend along the thickness or height of the acceptor charge 400) occurs where the terminal surface 322 of the wave shaper 300 interfaces with the upper surface 412 of the donor charge 400 when the acceptor charge 400 is initiated by the quasi-planar shock wave output at the wave shaper's terminal surface 322.

The aforementioned vertical truncation of the frustum or first cone corresponding to the donor charge 200 occurs at the lateral, horizontal, or radial border(s) or radius of the wave shaper's terminal surface 322. Thus, the quasi-conical donor charge 200 is not entirely or wholly conical. Rather, proximate to its lowest end 222, a cylinder-like, generally cylindrical, approximately cylindrical, or cylindrical donor charge lower section or segment 220 is vertically aligned with and directly adjacent to the terminal surface 322 of the wave shaper 300, and extends upwards from the lowest end 222 of the donor charge 200 about or around the periphery of the wave shaper's terminal surface 322 by a predetermined thickness or height, above which the conical, approximately conical, or generally conical upper peripheral surface(s) 230 of the donor charge 200 extend or taper towards the donor charge's upper end 212. In an alternate embodiment, the lower donor charge section 220 can be slightly conical, e.g., corresponding to a cone having a lateral surface that is nearly vertical. The presence of the lower donor charge section 220 allows or ensures that the shock wave in the donor charge maintains full detonation as it travels along the entirety of the wave shaper's lateral surface(s) 330, thereby eliminating undesirable or excessive curvature at the outer edge(s) of the shock wave progressing into and through the acceptor charge 400. Depending upon embodiment details, the thickness or height of the lower donor charge section 220 relative to the overall donor charge thickness or height can be approximately 2.5%-7.5%, e.g., approximately 5%. Furthermore, explosive devices 10 in accordance with several embodiments of the present disclosure having different overall donor charge thicknesses or heights can have an identical lower donor charge section thickness or height.

The cooperative structural design and disposition of the donor charge 200, the wave shaper 300, and the acceptor charge 400 relative to each other as well as the outer walls 130 of the body 100 can ensure that (a) for any horizontal "slice" of the wave shaper 300 throughout the wave shaper's thickness or height, a downwardly propagating shock wave remains at steady state detonation across the horizontal "slice" of the wave shaper 300 including at the wave shaper's lateral surface(s) 330; (b) the quasi-planar shock wave output at the terminal surface 322 of the wave shaper 300 is at steady state detonation across the entirety of the surface area of the terminal surface 322 of the wave shaper 300 and the entirety of the surface area of the upper surface 412 of the acceptor charge 400 at the onset of propagation therein, thereby reducing the extent to which the shock wave output by the explosive device 10 exhibits non-planarity toward portions of the explosive device's outer walls 130 near the device's distal end 122.

Further to the foregoing, explosive devices 10 in accordance with various embodiments of the present disclosure can output a quasi-planar shock wave at their terminal ends 122 regardless of the type(s) of explosive compositions or energetic formulations confined therein, and regardless or independent of whether the VoD corresponding to the donor charge 200 is less than, equal to, or greater than the VoD corresponding to the acceptor charge 400, enabling highly flexible selection of donor charge energetic properties and acceptor charge energetic properties essentially independent of each other. In various embodiments, the energy release properties of the donor charge 200 are consistent or constant throughout the thickness or height of the donor charge 200; however, the energy release properties of the acceptor charge 400 can be constant or vary as a function of acceptor charge thickness or height depending upon embodiment details.

Explosive devices 10 in accordance with the present disclosure can exhibit multiple variations in structural configuration and/or material composition, depending upon embodiment details and/or application objectives or requirements. Individuals having ordinary skill in the relevant art will understand that the structural and/or compositional characteristics, properties, or details of an explosive device 10 in accordance with embodiments of the present disclosure can depend upon the particular type of explosive application or blasting operation (e.g., a commercial blasting operation) in which the explosive device 10 is deployed or used, and/or conditions in the explosive device's external environment. A number of non-limiting representative embodiment variations in accordance with the present disclosure are further elaborated upon hereafter.

As previously indicated, in certain embodiments such as shown in FIG. 15, an explosive device 10a includes a donor charge 200, but is not configured to engage, interface, or mate with or carry an acceptor charge 400 (e.g., the distal end 122 of such a device 10a, at which the quasi-planar shock wave is output, approximately coincides or coincides with the terminal surface 322 of the wave shaper 300).

With respect to embodiments of explosive devices 10b-h that are configured for carrying an acceptor charge 400, in several of such embodiments such as shown in FIGS. 16A, 16B, and 19-22, the body 100 of the explosive device 10b, 10e-g is a unitary structure, and the acceptor charge 400 is formed or fabricated within the body 100 as part of explosive device manufacture (e.g., such that the acceptor charge 400 is inserted or formed in or built into the unitary body 100 during explosive device manufacture, and is intended to be non-removable or securely/permanently fixed in position with respect to the unitary body 100 once disposed therein). However, in other embodiments such as shown in FIGS. 17-18, the body 100 is a non-unitary structure, and the explosive device 10d,e includes multiple couplable or connectable sections that can be selectively engaged, mated, or attached to each other, and possibly disengaged or detached from each other.

Figure 20:
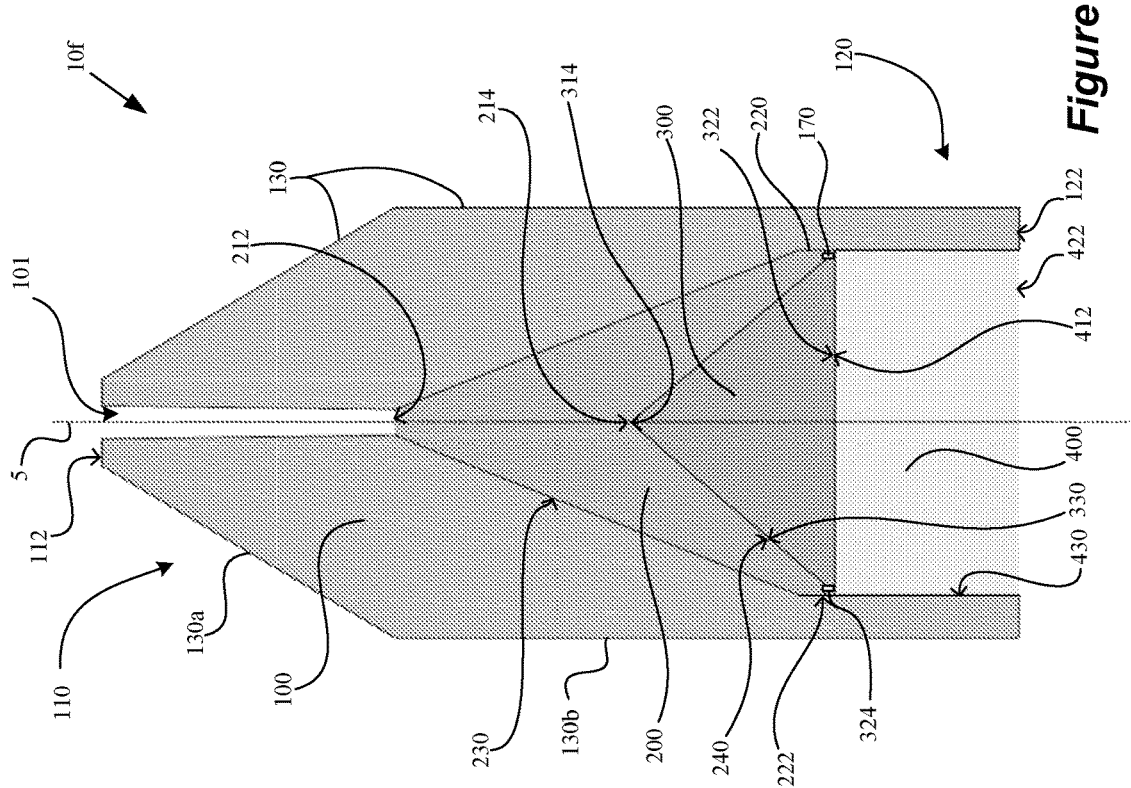

Further to the foregoing, different embodiments of explosive devices 10 can vary with respect to one or more of (a) acceptor charge cross-sectional areas perpendicular to the central axis 5, and correspondingly maximum donor charge and maximum wave shaper perpendicular cross-sectional areas; (b) overall donor charge height, and correspondingly overall acceptor charge height; and (c) net explosive mass, where the net explosive mass of a given explosive device 10 can be defined as the total mass of explosive material(s) provided by the donor charge 200 and the acceptor charge 400. For instance, FIG. 20 illustrates an embodiment of an explosive device 10f for which the cross-sectional area of the acceptor charge 400 perpendicular to the central axis 5, and hence the maximum cross-sectional area of the wave shaper 300 and the donor charge 200 perpendicular to the central axis 5, can be smaller than the counterpart or corresponding cross-sectional areas for the explosive devices 10b-e shown in FIGS. 16A-19; and the overall height of each of the donor charge 200 and the wave shaper 300 can be respectively larger than the overall height of each of the donor charge and the wave shaper for the explosive devices 10b-e shown in FIGS. 16A-19. The net explosive mass of the device 10 shown in FIG. 6 can be less than that of the explosive devices shown in FIG. 16A-19.

Still further, the thickness or height of the acceptor charge 400 can differ depending upon embodiment and/or explosive device application or environment details, such as indicated by the explosive device 10e shown in FIG. 19 compared to that shown in FIGS. 16A-18; and/or the type(s) of explosive composition(s) provided by the acceptor charge 400 can differ depending upon embodiment details. Thus, the energy release properties and/or the amount of stored explosive energy provided by the acceptor charge 400 can differ or be selected or customized depending upon embodiment and/or device application or deployment environment details.

In several embodiments, an explosive device 10c,d can include a first or upper section or piece 102 that carries the donor charge 200 and the wave shaper 300; and a second, lower, or base section or piece 104 that carries or retains the acceptor charge 400, and which can be selectively coupled, engaged, mated, or connected to the upper piece 102. The lower piece 104 in which the acceptor charge 400 resides typically forms a disk or "puck" of explosive material(s). The upper piece 102 and the lower piece 104 can be coupled or connected by way of counterpart snap-fit structures 106 that enable snap-fit engagement between the upper and lower pieces 102, 104, such as shown in FIG. 17; or counterpart rotational or screw thread structures 108 that enable rotational or screw-type engagement of the upper and lower pieces 102, 104, such as shown in FIG. 18. These or other types of engagement structures 106, 108 can be carried by (e.g., extend or project from, and/or be formed within) predetermined portions of the upper and lower pieces 102, 104, such as portions of the non-unitary body's outer walls 130, in a manner readily understood by individuals having ordinary skill in the relevant art. In each of the embodiments shown in FIGS. 17-18, the lower piece 104 of the body 100 securely retains the acceptor charge 400 therein.

Further to the foregoing, an explosive device 10c-d such as shown in FIGS. 17-18 can include an upper piece 102 providing a predetermined mass of donor charge 200, which is couplable to multiple different or distinct lower pieces 104 (e.g., non-identical lower pieces 104). Each such lower piece 104 provides or retains an acceptor charge 400 providing at least one predetermined explosive composition or compound of predetermined mass. Different lower pieces 104 can retain different acceptor charge masses, and/or different acceptor charge explosive compositions or compounds therein. Thus, different lower pieces 104 can have different explosive energy release or output characteristics or properties (e.g., different or distinguishable quasi-planar shock wave amplitude, frequency content, duration, and/or velocity at the acceptor charge's lower surface 422) relative to each other. A specific lower piece 104 can be selected for coupling or be coupled to the upper piece 102 relative to the other lower pieces 104 based on whether the quasi-planar shock wave that the explosive device 10c,d will output by way of the specific lower piece 104 is suitable, better-suited, or best-suited to a given explosive application or environment under consideration compared to the other lower pieces 104.

In a related embodiment, multiple lower pieces 104 (e.g., two or more lower pieces 104) can be selectively coupled or joined together to form a cooperatively aligned (e.g., directly vertically aligned with respect to the central axis 5) stack of lower pieces 104, thus providing a stack of donor charges 400, which can be selectively coupled or joined with an upper piece 102 such as that described above. In such embodiments, different lower pieces 104 (e.g., two lower pieces 104, which carry first and second acceptor charges 400 that can be identical or different with respect to acceptor charge thickness/net explosive mass, explosive composition, and/or energy release properties) can be coupled or joined together by way of compatible or counterpart engagement structures, such as snap-fit or rotational or screw-type engagement structures.

Hence, an explosive device 10c-d such as shown in FIGS. 17-18 can have an upper piece 102 that is engageable (e.g., directly matingly engageable) with any one of multiple lower pieces 104. Depending upon embodiment details, one or more of such lower pieces 104 can be (a) engageable (e.g., directly matingly engageable) with another lower piece 104 to form a stack of lower pieces 104, e.g., creating or providing "stacked pucks" of donor charges 400; or (b) non-engageable (e.g., not directly matingly engageable) with another lower piece 104. For a given upper piece 102 under consideration, multiple lower pieces 104 can be interchangeably coupled to the upper piece 102 (and thus multiple lower pieces 104 can be defined as interchangeable with respect to each other for this upper piece 102).

In embodiments such as shown in FIGS. 17-18, a single top piece 102 can be selectively or customizably coupled to any one lower piece 104 from among multiple lower pieces, or possibly two (or more) stacked lower pieces 104, thus facilitating, enhancing, or maximizing explosive device deployment and/or operational flexibility in accordance with application and/or environmental objectives, requirements, or constraints. The final, as-deployed, or in-use energy release characteristics of one or more explosive devices 10c-d, each of which includes multiple joinable/separable pieces 102, 104 can be established, selected, tailored, customized after the manufacture of the explosive device pieces 102, 104, prior to explosive device use. More particularly, after the manufacture of (i) a top piece 102 providing a particular donor charge 200, and (ii) multiple lower pieces 104 that each provide or retain a distinct or different acceptor charge 400 (e.g., with respect to explosive composition type(s) and/or formulation(s) therein, and/or the mass(es) thereof), an assembled explosive device 10c-d can be formed (e.g., shortly before or effectively at the time of deployment, in the field) by coupling or mating the top piece 102 with a single selected lower piece 104, or possibly a stack of multiple selected lower pieces 104, which can output a quasi-planar shock wave having intended, expected, or desired peak amplitude, duration, and/or frequency content.

Thus, multiple embodiments in accordance with the present disclosure provide an explosive device 10c-d for which the device's energy release characteristics can be established, (re)configured, selected, adjusted, changed, or customized after fabrication of those portions of the explosive device 10c-d that carry, contain, or confine its explosive composition(s), and prior to explosive device use or deployment, for instance, "on the go" or "on the fly" in the field, e.g., on a flexible or dynamic basis depending upon the particular application and/or environment in which the explosive device 10c-d will be deployed. As a non-limiting representative example, in an application such as a seismic survey in which multiple or many explosive devices 10c-d such as shown in FIGS. 17-18 are to be used, the energy release characteristics of one or more explosive devices 10c-d can be flexibly or dynamically selected or modified in the field during the progress of the seismic survey to account or compensate for unforeseen, expected, or sensed changes in geology (e.g., as indicated by data obtained during a geophysical survey) and/or signal levels (e.g., background seismic noise levels).

Figure 21:
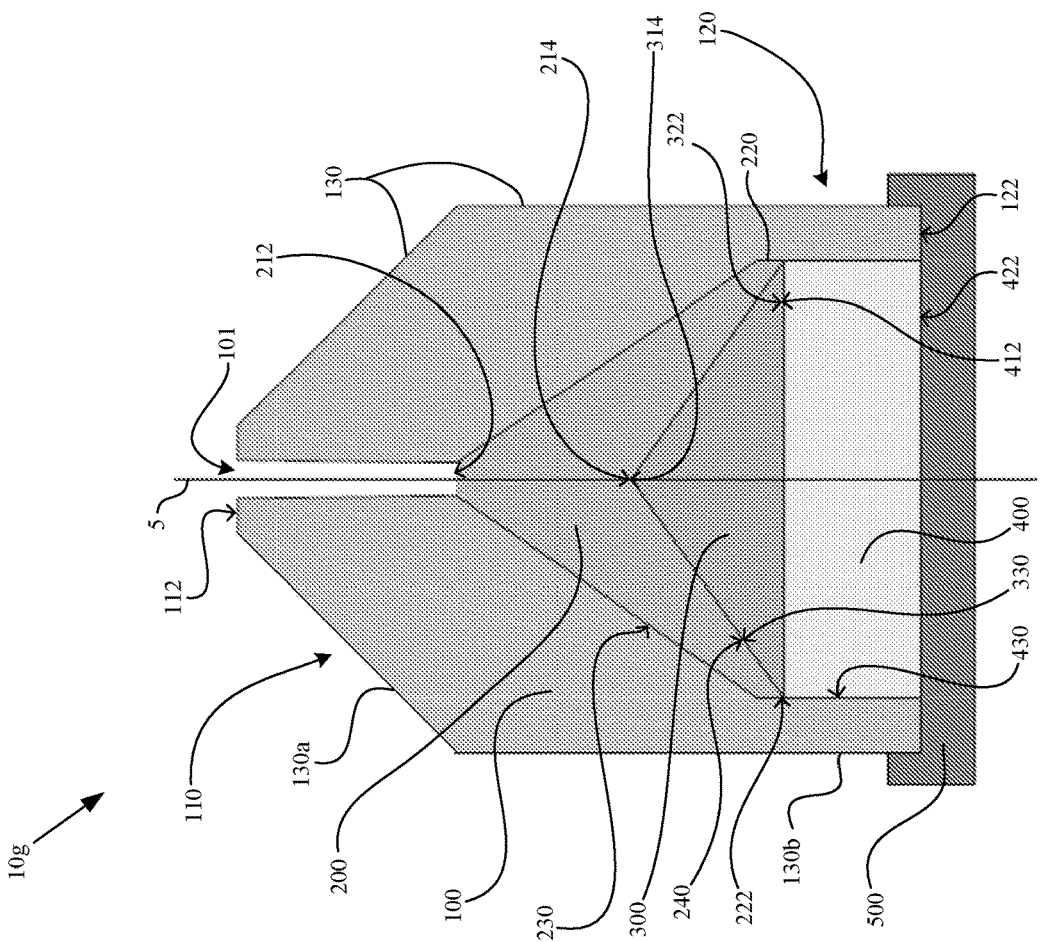

In yet another embodiment in accordance with the present disclosure, an explosive device 10 can be selectively couplable or coupled to or include a shock wave attenuation structure at its principal output end. For instance, FIG. 21 shows an explosive device 10g having an attenuation structure, member, element, cover, or cap 500 disposed across the distal end 122 of the body 100. The attenuation cap 500 is intended to overlay or cover (e.g., entirely overlay) the lower surface 422 of the acceptor charge 400, such that the attenuation cap 500 resides between (e.g., directly between) the lower surface 422 of the acceptor charge 400 (as well as the body's distal end 122) and a material or substrate into which the quasi-planar shock wave output by the explosive device 10g is to be coupled. The attenuation cap 500 typically provides an approximately planar or planar underside that rests upon or against portions of the material or substrate under consideration. The attenuation cap 500 can adjust or customize the amount or frequency content of the quasi-planar shock wave energy coupled or imparted into the material or substrate (e.g., the attenuation cap 500 can serve as a low pass frequency filter).

The attenuation cap 500 can be couplable, securable, or attachable/fixable to the explosive device 10g in one or more manners, depending upon embodiment details. For instance, the attenuation cap 500 can include a set of engagement structures, such as snap-fit or rotational or screw-type engagement structures, that enable mating engagement with the explosive device's body 100, e.g., in a manner analogous or essentially identical to that described above. Alternatively, the attenuation cap 500 can be secured to the explosive device 10g by way of an adhesive layer. The attenuation cap 500 can include or be formed of one or more types of materials, such as a polymer or plastic material (e.g., High Density Polyethylene (HDPE), or another type of material such as cardboard). Depending upon embodiment and/or application details, the attenuation cap 500 can additionally or alternatively provide a chemically resistant barrier between the lower surface 422 of the acceptor charge 400 and the material or substrate under consideration.

FIG. 22 is a cross-sectional view along the central axis 5 showing dimensions for a non-limiting representative implementation of an explosive device 10b such as that shown in FIG. 16A, or analogously an explosive device 10c-d,g such shown in FIGS. 17, 18, and/or 21, which provides a net explosive mass of 330 g.

As indicated above, explosive devices 10 in accordance with the present disclosure can be manufactured in multiple manners. In an embodiment, a unitary body 100 and the wave shaper 300 are formed as an integral unit from polymer materials, such as polyurethane or nylon 6, 6, e.g., by way of molding, machining, or additive manufacturing. An important or key material property corresponding to the body 100 and the wave shaper 300 for the attainment of a quasi-planar shock wave is the slope of the shock Hugoniot, which reflects the compressibility of the material(s) from which the body 100 and wave shaper 300 are constructed under shock conditions. A properly selected, optimized, or optimal value of this property reduces manufacturing error/aids manufacturability, and appropriately establishes, reduces, optimizes, or minimizes the total amount or net mass of explosive material(s) required for generating a quasi-planar shock wave suitable for a specific application or environment, or particular range of applications or environments, in which the explosive device 10 is deployable or deployed. In various embodiments, the slope of the shock Hugoniot is between 1.5-1.7, e.g., approximately 1.6.

FIGS. 23A-23B show non-limiting representative implementations of explosive device bodies 100 having wave shapers 300 therein, which are configured carrying net explosive masses of 300 g and 110 g. Depending upon embodiment details, an explosive device body 100 and a wave shaper 300 can be formed as an integral unit; or they can be formed separately, and the wave shaper 300 can be introduced, inserted, or affixed into the body 100. In several embodiments, the body 100 includes a set of first or upper internal walls 140a that define a first or upper cavity or chamber 160 within the body 100, which establishes the geometric boundaries or borders of the donor charge 200, and which can be referred to as a donor charge chamber 160; and a set of second or lower internal walls 140b that define a second or lower cavity or chamber 180 within the body 100, which establishes the geometric boundaries or borders of the acceptor charge 400, and which can be referred to as an acceptor charge chamber 180.

Following the manufacture of a body 100 and a wave shaper 300 as an integral unit or unitary structure, or after the insertion of a separately formed wave shaper 300 into a body 100 that was fabricated separately from or without the wave shaper 300, a melt-castable energetic material or explosive composition, e.g., Pentolite, can be introduced or poured into the body 100 and allowed to solidify to thereby form the donor charge 200 and the acceptor charge 400 within the body's upper chamber 160 and lower chamber 180, respectively. In some embodiments, the manufacture or formation of the donor charge 200 and the acceptor charge 400 within the body 100 occurs separately or sequentially, e.g., by way of different or non-temporally overlapping portions of the overall explosive device manufacturing process. For instance, in one manufacturing process portion, Pentolite can be poured through the body's passage 101 into the upper internal chamber 160 that establishes the geometric borders of the donor charge 200 (e.g., with the body 100 oriented right side up), such that the solidified Pentolite within the upper internal chamber 160 forms the donor charge 200; and in a separate or subsequent manufacturing process portion, Pentolite can be poured directly into the body's lower internal chamber 180 that establishes the geometric borders of the acceptor charge 400 (e.g., with the body 100 inverted or oriented upside down), such that the solidified Pentolite within the lower internal chamber 180 forms the acceptor charge 400.

Figure 23C:
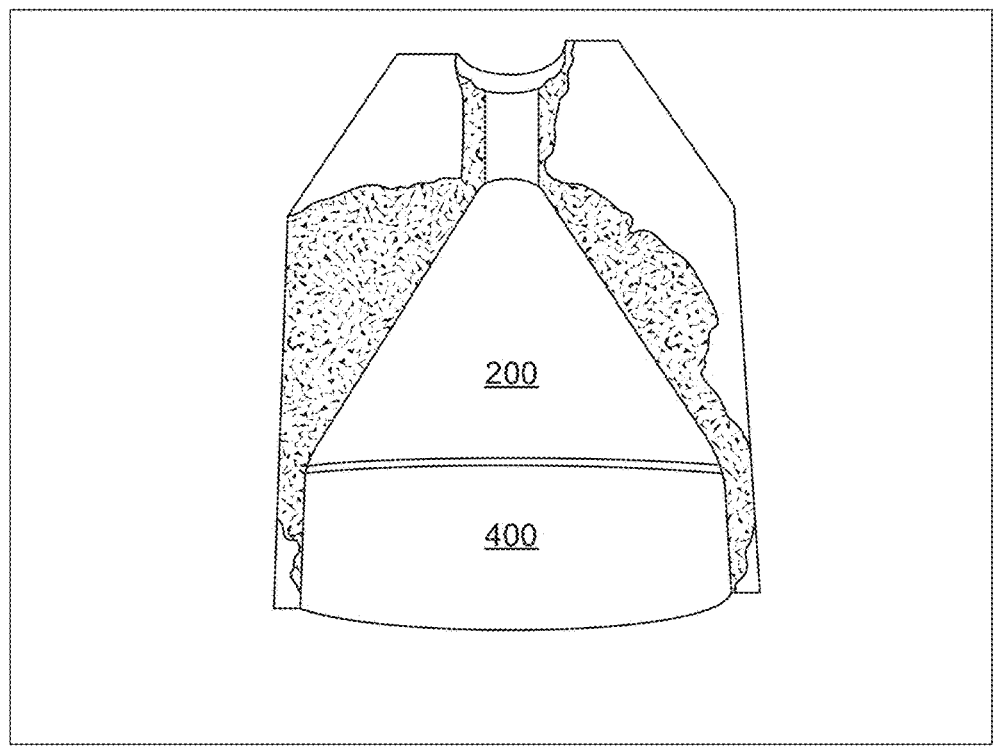
FIG. 23C is an image of a cutaway the explosive device in FIG. 23A

FIG. 23C shows a cutaway view of portions of an explosive device 10 corresponding to FIG. 23A, including the acceptor charge 200 and donor charge 400 thereof, each of which includes or is formed of melt-cast Pentolite in a non-limiting representative limitation, such that the explosive device 10 provides a net explosive mass of 330 g.

In some embodiments, e.g., as indicated in FIGS. 1B, 17, 18, 20, and 22, the body 100 includes a set of internal gaps, pathways, conduits, or channels 170 that fluidically or fluidly couples the upper internal chamber 160 to the lower internal chamber 180, such that a flowable or melt-castable energetic material or explosive composition, e.g., Pentolite, can flow between the upper and lower internal chamber 160, 180 when introduced into one or the other of such chambers 160, 180. In such embodiments, the donor charge 200 and the acceptor charge 400 can be formed by way of a single manufacturing process portion, or temporally overlapping manufacturing process portions, such that the melt-castable energetic material, e.g., Pentolite, is introduced into portions of the upper internal chamber 160 and the lower internal chamber 180 concurrently. For instance, molten Pentolite can be poured into the upper internal chamber 160 by way of the body's initiating device passage 101, and some of the molten Pentolite introduced into the upper internal chamber 160 flows from the upper internal chamber 160 into the lower internal chamber 180 by way of the internal channel(s) 170. After the lower internal chamber 180 has been completely filled the upper internal chamber 160 can be completely filled with molten Pentolite as the introduction or pouring thereof into the upper internal chamber 160 continues or progresses, because Pentolite flow through the internal channel(s) 170 into the lower internal chamber 180 no longer occurs. The upper internal chamber 180 can be filled to a predetermined maximum level, e.g., corresponding to the location within the body 100 at which the upper internal chamber 160 meets the body's passage 101, or a target location along the height of the passage 101. As the molten Pentolite within the explosive device 10 cools, the donor and acceptor charges 200, 400 are formed, in a manner readily understood by individuals having ordinary skill in the relevant art. During such a manufacturing process, the body 100 can be positioned such that its distal end 122 resides upon an essentially planar or planar surface of material to which the melt-cast energetic material does not adhere, or does not significantly adhere, and which has a higher or significantly higher melting point than the melt-cast energetic material. Such a material can include or be, for instance, Teflon. In an alternate technique in which the body 100 is inverted, the molten Pentolite can be poured into the lower internal chamber 180, in which case it can flow into the upper internal chamber 160 by way of the internal channel(s) 170. A plug made of a material such as Teflon can be inserted into the body's passage 101 during such a procedure, and removed or withdrawn after the donor charge 200 and acceptor charges 400 have formed, leaving the passage 101 free of the energetic material.

Depending upon embodiment details, the body 100 and the wave shaper 300 can be fabricated as separate elements, parts, or pieces, and the wave shaper 300 can be inserted, clipped, or snap-fit into the body 100 by way of counterpart engagement/retention structures, elements, or members, such as clip structures formed in the donor charge 200 and the wave shaper 300 themselves, e.g., at particular locations at or around the periphery of the donor charge's lowest end 222 and the periphery of the wave shaper's terminal surface 322, e.g., such as on a lower lip structure 324 of the wave shaper 300, which enable secure retention of the wave shaper 300 against the donor charge 200. The aforementioned set of internal channels 170 can be formed to include apertures or openings in this lower lip structure 324, and/or in one or more portions of the body 100.

In other embodiments, one or each of the acceptor charge 200 and the donor charge 400 can be formed of a pressable or pressed energetic material or explosive composition, such as an RDX—wax blend. For instance, an RDX—wax blend can be pressed directly into the body's upper interior chamber 160 and/or the lower interior chamber 180 to respectively form the acceptor charge 200 and/or the donor charge 400 by way of a pressing apparatus, in a manner readily understood by individuals having ordinary skill in the art. Alternatively, one or more energetic compounds can be pressed and then inserted into one or more preformed chambers of the explosive device 10 to form the donor charge 200 and/or the acceptor charge 400, as further detailed below.

With respect to various embodiments of an explosive device 10c-d that can be assembled by engaging a top piece 102 with any one of multiple lower pieces 104, or coupling the top piece 102 to a stack of lower pieces 104, the top piece 102 can include or provide a first or upper internal chamber 160 into which an energetic material or explosive composition can be introduced, and the lower piece 104 can include or provide a second or lower internal chamber 180 into which the same or a different energetic material or explosive composition can be introduced, in a manner analogous to that set forth above. For instance, a flowable or melt-castable energetic material can be introduced into the upper chamber 160, e.g., in a manner indicated above, to form the top piece 100 and its internally carried acceptor charge 200. Depending upon embodiment details, a flowable or melt-castable energetic material can be introduced into one or more lower internal chambers 180; and/or one or more pressable energetic materials can be pre-pressed into intended donor charge shapes (e.g., within a ring of material such as Teflon), and then assembled (e.g., glued) into one or more corresponding lower internal chambers 180 to form lower pieces 104 and the donor charges 400 retained thereby.

In still further embodiments in accordance with the present disclosure, one or each of the acceptor charge 200 and the donor charge 400 can be produced by way of additive manufacturing. Hence, depending upon embodiment details, one or more of the body 110 (whether the body 110 is produced as a unitary structure or a multi-part structure, e.g., having a top piece 102 that is couplable to a set of lower pieces 104), the donor charge 200, the wave shaper 300, and the acceptor charge 400 can be produced by way of additive manufacturing.

Particular non-limiting representative implementations of explosive devices 10 manufactured in accordance with an embodiment of the present disclosure were tested in a representative in-field seismic spread trial. The tested explosive devices 10 were analogous or corresponded to the embodiment shown in FIG. 16B, and carried a doubly-truncated (e.g., horizontally and vertically truncated) type of cylindrical donor charge 200 such as described above. More particularly, for the seismic spread trial, explosive devices 10 having net explosive masses of 330 g and 110 g were fabricated. The seismic spread trial was conducted by deploying or positioning the fabricated explosive devices 10 such that their distal ends 112 resided directly against the surface of the earth, that is, this trial was conducted without the explosive devices 10 residing in boreholes. Prior to the in-field initiation of the test explosive devices 10, ambient or background seismic noise at the field test site was measured using Sercel SG-5 geophones, which were also used to measure reflected seismic signals corresponding to the quasi-planar shock waves output by the tested explosive devices 10 after their in-field initiation.

Figure 24:
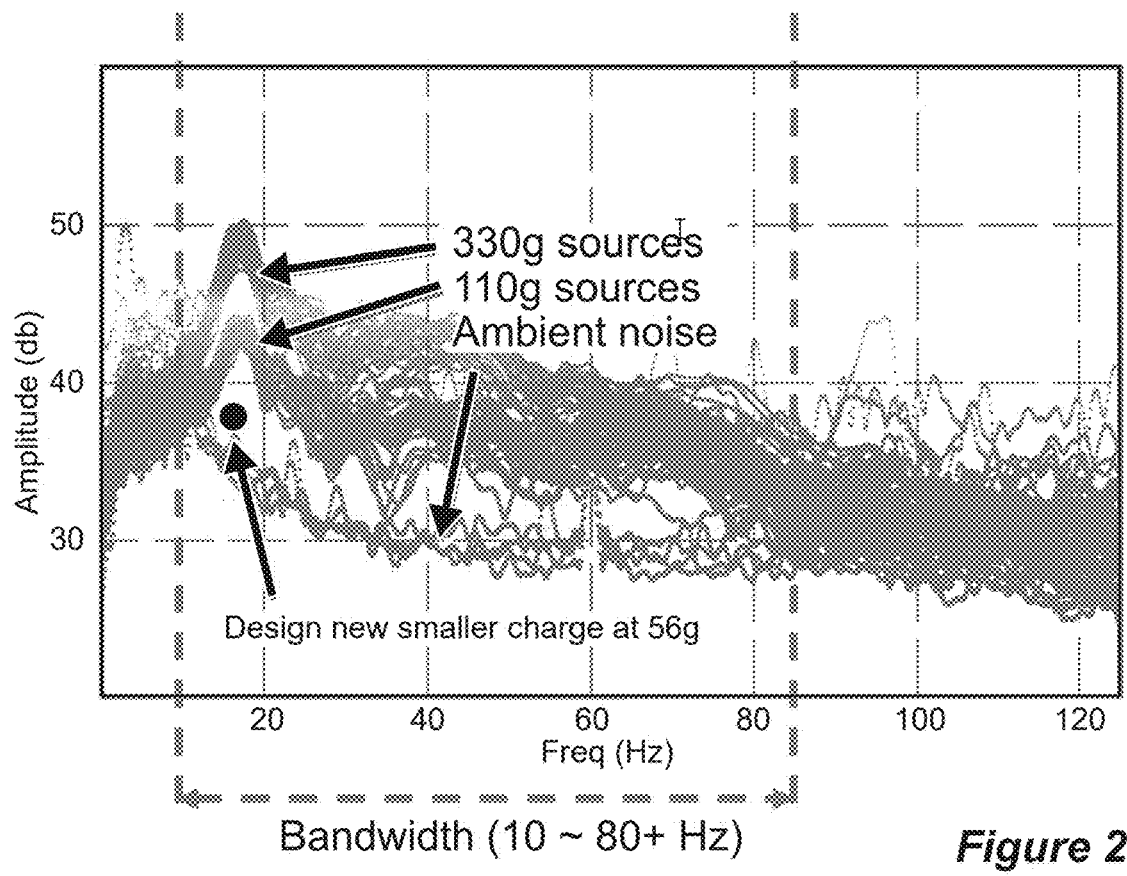
FIG. 24 is a plot showing measured reflected seismic signals and ambient seismic noise signals.

FIG. 24 is a plot showing reflected seismic signals measured during the in-field seismic spread trial, as well as ambient seismic noise signals measured prior to the in-field seismic spread trial. As indicated in FIG. 24, within a useful or practical seismic signal bandwidth between approximately 10-85 Hz, the reflected seismic signals corresponding to the tested 330 g and 110 g explosive devices 10 demonstrated a good to very good signal-to-noise (S/N) ratio. Hence, explosive devices 10 in accordance with embodiments of the present disclosure can be used or deployed in seismic exploration applications (e.g., land-based seismic exploration) by disposing the distal ends 112 of such devices 10 directly on or against the surface of the earth (or disposing one or more of explosive devices 10 that include an attenuation cap 500 such that the attenuation cap 500 resides directly against the surface of the earth), in the absence or outside of boreholes. Furthermore, in view the results shown in FIG. 24, explosive devices 10 in accordance with embodiments of the present disclosure can additionally or alternatively be deployed or used in seismic exploration applications by positioning such devices in shallow or very shallow holes or boreholes formed in the earth, e.g., holes or boreholes having a depth of 0.05-2.5 meters, which is much shallower than the depth of boreholes drilled into the earth as part of conventional seismic exploration applications.

Based on the measured data corresponding to FIG. 24, a net explosive charge mass of 56 g was calculated by a linear curve fit in amplitude—frequency space to be a smaller or minimum practical or useful net explosive charge mass relative to the ambient seismic noise at the field trial site or similar sites, i.e., a net explosive mass that would generate a seismic signal that upon reflection from underlying substrata up to a depth of approximately 20-150 meters (e.g., approximately 30-100 meters, or approximately 40-80 meters) or more (e.g., up to approximately 200, 250, 300, 350, 400, 450, or 500 meters) would be reliably discernible above the ambient seismic noise level across the aforementioned seismic signal bandwidth.

Figure 25:
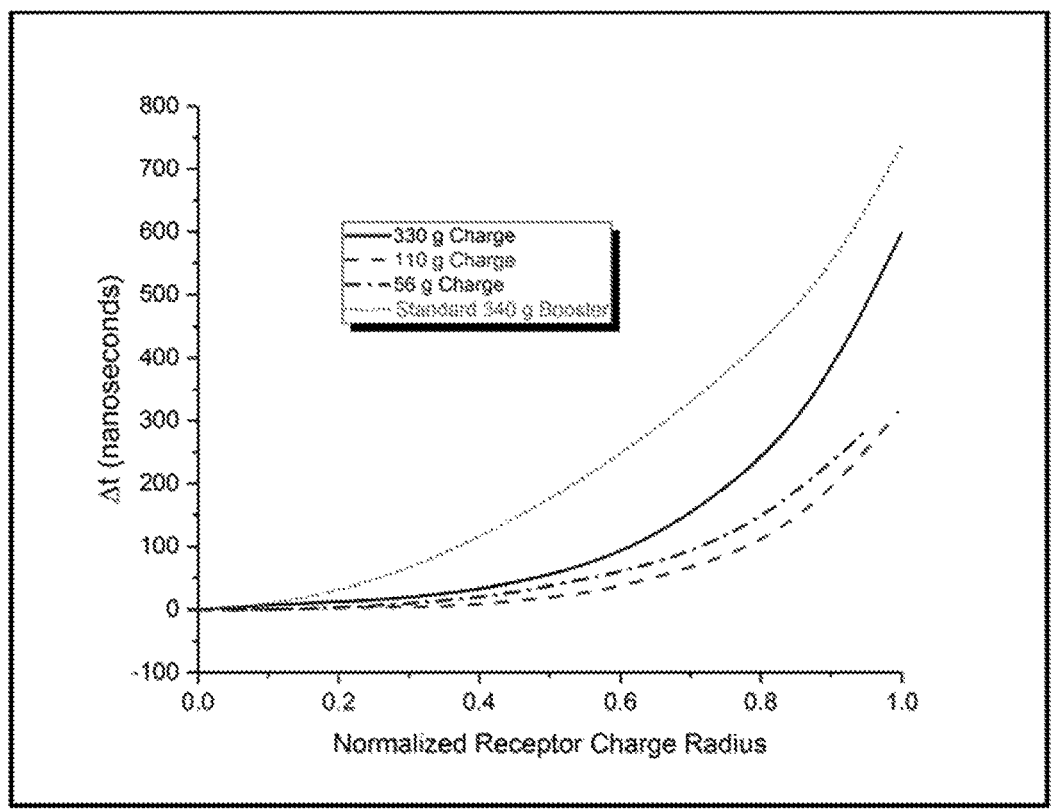
FIG. 25 is a graph showing simulation results corresponding to curvature of shock wave fronts output from the distal end of explosive devices described herein and a standard or conventional cylindrical explosive booster.

FIG. 25 is a graph showing numerical simulation or modelling results corresponding to the curvature of (a) shock wave fronts output from the distal end 122 of explosive devices 10 in accordance with embodiments of the present disclosure such as those tested in the seismic spread trial for three non-limiting representative net explosive masses, namely, 330 g, 110 g, and 56 g; and (b) the shock wave front output at an analogous or corresponding distal end of a standard or conventional (e.g., commercially available, centrally initiated) cylindrical explosive booster (hereafter "standard booster") having an explosive mass of 340 g, with respect to normalized radial distance away from the central axis 5 of the explosive devices 10 and an analogous or corresponding axis of symmetry of the standard booster.

It is readily apparent from the numerical simulation results that the shock fronts output at the distal ends 122 of the explosive devices 10 in accordance with embodiments of the present disclosure are significantly less hemispherical, and significantly more planar, than the shock front output at a corresponding end of a standard cylindrical booster. Among the three explosive devices 10 having net explosive masses of 330 g, 110 g, and 56 g, the shock front output at the distal end 122 of the 110 g device showed the lowest relative curvature, and hence the highest relative planarity, across the radial extent of the explosive device 10, which was nearly matched by the shock front output by the 56 g device. The 330 g device output a shock front having a relative curvature, and hence a relative planarity, between that of the 56 g device and the standard booster. It can further be seen that at least up to a normalized radial distance of 0.4-0.6 (e.g., approximately 0.5) away from the central axis 5, the shock fronts output by the 110 g and 56 g devices exhibited dramatically less curvature, and hence dramatically greater planarity, than the shock front output by the standard booster. For each shock front curve shown in FIG. 25, a closest-fit parabola corresponding to the underlying shock front curve simulation data was determined; and the focus of each such parabola along the z-axis (i.e., along the central axis 5 of each explosive device 10 under consideration, or along the axis of symmetry of the standard booster) referenced to the corresponding device distal end was calculated, in a manner readily understood by individuals having ordinary skill in the relevant art. The parabola focus value calculated for the standard booster can define a reference or benchmark parabola focus value. Therefore, the value of the parabola focus corresponding to each explosive device 10 under consideration relative to the reference parabola focus value can provide a quantitative measure that indicates or is correlated with the extent to which the corresponding shock wave is less hemispherical than the shock wave output by the standard booster, and is more planar than hemispherical, and thus can provide a numerical indicator or measure of shock wave quasi-planarity. Table 1 below shows the calculated distances of parabola foci corresponding to each shock front curve of FIG. 25, as well as corresponding $R^2$ values that indicate how well the parabolas fit the underlying data for the shock fronts, as individuals having ordinary skill in the relevant art will readily understand.

TABLE 1

Calculated focus for a parabola fit to each shock front curve of FIG. 25

| Explosive Charge Geometry | Net Explosive Mass (g) | Parabola Focus | R2 |
| --- | --- | --- | --- |
| Conical-type Donor Charge | 56 | 9.65E−04 | 0.83 |
| Conical-type Donor Charge | 110 | 1.09E−03 | 0.88 |
| Conical-type Donor Charge | 330 | 5.33E−04 | 0.91 |
| Standard Cylindrical Booster | 340 | 3.59E−04 | 0.99 |

As indicated by Table 1, the shock wave output by the standard cylindrical booster had a reference parabola focus value of 3.59E-04. This reference parabola focus value was the smallest parabola focus value for the shock wave data sets consideration. Also, the standard cylindrical booster output the most parabolic, or the least planar, shock wave, as indicated by its R2 value.

The shock wave output by the explosive device 10 having a net explosive mass of 110 g had a parabola focus value of 1.09E-03, which defines an upward or vertical parabola focus shift along the z-axis of approximately 203.6% with respect to the reference parabola focus. Consequently, at the distal end 122 of the 110 g device, the shock wave exhibited much greater planarity than the shock wave output at the analogous end of the standard booster. Furthermore, the shock wave output by the 110 g device was the least parabolic of the shock waves under consideration.

The shock wave output by the explosive device 10 having a net explosive mass of 56 g had a parabola focus value of 9.65E-04, which defines an upward or vertical parabola focus shift along the z-axis of approximately 168.8% with respect to the reference parabola focus. Hence, at the distal end 122 of the 56 g device, the shock wave also exhibited much greater planarity than the shock wave output at the analogous end of the standard booster. The shock wave output by the 56 g device was the second-least parabolic of the shock waves output by the explosive devices 10 under consideration.

Finally, the shock wave output by the explosive device 10 having a net explosive mass of 330 g had a parabola focus value of 5.33E-04, which defines an upward or vertical parabola focus shift along the z-axis of approximately 48.5% with respect to the reference parabola focus. Hence, at the distal end 122 of the 56 g device, the shock wave was significantly more planar than the shock wave output at the analogous end of the standard booster. As indicated by its $R^2$ value, the shock wave output by the 330 g device was the next-least parabolic of the shock waves output by the explosive devices 10 under consideration.

Because the lower surface 422 of the acceptor charge 400 outputs a quasi-planar shock wave, i.e., a shock wave that is significantly or dramatically less parabolic or hemispherical than that output by a standard cylindrical booster, the distal end 122 of an explosive device 10 in accordance with embodiments of the present disclosure can preferentially couple or deliver explosive energy into an adjacent target material, substrate, or environment much more effectively than the analogous or similar end of the standard booster.

Further to the information provided in FIG. 25 and Table 1, Table 2 below provides numerical modelling or simulation data showing the percentage of explosive energy output across the entirety of (a) the lower surface 422 of the acceptor charge 400, relative to overall stored chemical energy for the 56 g, 110 g, and 330 g explosive devices 10; and (b) the analogous or corresponding distal end of the 340 g standard cylindrical booster.

TABLE 2

Percentage of explosive energy output across distal end relative to overall stored chemical energy

| Explosive Charge Geometry | Net Explosive Mass of Device (g) | Explosive Energy Output at Principal Output End (% Stored Chemical Energy) |
| --- | --- | --- |
| Conical-type Donor Charge | 56 | 24.4 |
| Conical-type Donor Charge | 110 | 27.5 |
| Conical-type Donor Charge | 330 | 10.1 |
| Standard Cylindrical Booster | 340 | 2.4 |

As indicated in Table 2, the 110 g, 56 g, and 330 g explosive devices 10 respectively released 27.5%, 24.4%, and 10.1% of their stored explosive energies across their acceptor charge lower surfaces 422, whereas the 340 g standard booster released only 2.4% of its explosive energy across its corresponding distal end, which represents an increase in distal end energy release of 1045.8%, 916.6%, and 320.8% for the 110 g, 56 g, and 330 g explosive devices 10 relative to the 340 g standard booster. Hence, explosive devices 10 in accordance with embodiments of the present disclosure exhibit significantly, greatly, or dramatically increased distal end explosive energy release compared to standard cylindrical boosters (e.g., at least by a factor of 2).

The seismic energy imparted into a target material, substrate, or substance disposed at the distal end 122 of an explosive device 10 in accordance with an embodiment of the present disclosure depends not only on net explosive charge mass, but also upon donor charge geometry. That is, the relative efficiency that an explosive device 10 exhibits in converting its stored explosive energy into a quasi-planar shock wave output at the device's distal end 112 also depends upon donor charge geometry.

Figure 26:
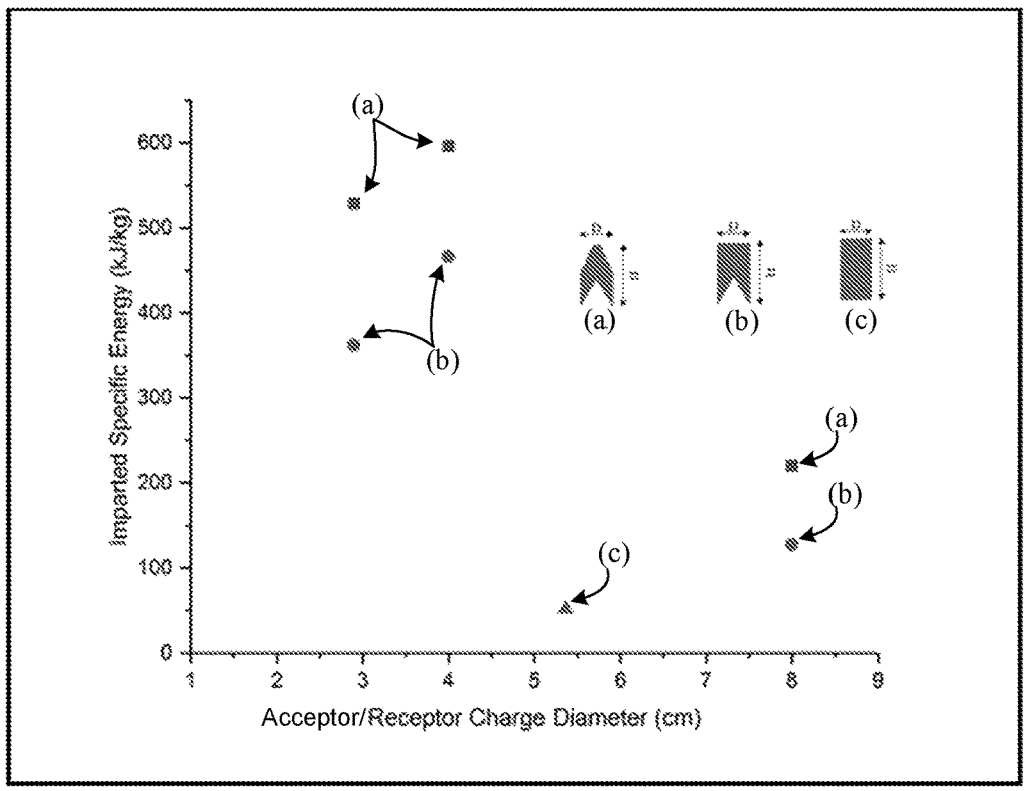
FIG. 26 is a plot showing simulation results for specific seismic energy imparted versus donor charge diameter (D) by explosive devices described herein and a standard or conventional cylindrical explosive booster.

FIG. 26 is a plot showing numerical simulation or modelling results for specific seismic energy imparted versus donor charge diameter (D) by (a) an explosive device 10 a having quasi-conical donor charge 200, a wave shaper 300, and an acceptor charge 400 as set forth above, and a net explosive charge mass of 330 g; (b) an explosive device 10 having a cylindrical rather than quasi-conical donor charge 200, plus a wave shaper 300 and an acceptor charge 400 as set forth above, and a net explosive charge mass of 330 g; and (c) a 340 g standard booster, where each of such device have an identical height (H), e.g., corresponding to the height value shown in FIG. 22. As indicated in FIG. 26, the specific seismic energy imparted by an explosive device 10 having a quasi-conical donor charge 200 is significantly greater than that of an explosive device 10 having a cylindrical donor charge 200, both of which are dramatically or significantly greater than that of a standard booster.

Table 3 below provides non-limiting representative approximate structural dimension values or value ranges for certain embodiments of explosive devices 10, e.g., explosive devices having net explosive masses between approximately 56 g-330 g, in accordance with the present disclosure.

TABLE 3

Representative approximate structural dimension parameter values or value ranges for explosive devices, e.g., having net explosive masses between approximately 56 g-330 g.

| Dimension | Approx. Value(s) |
| --- | --- |
| Donor Charge Peak Angle off Axis of Symmetry (deg) | 8-32 |
| Minimum Acceptor Charge Thickness (mm) | 24 |
| Minimum Net Explosive Mass (g) | 50-55 |
| Minimum Total Device height (mm) | 125 |
| Distance from Well to Wave Shaper Apex (mm) | 25-42 |
| Minimum Acceptor Charge Diameter (mm) | 29 |
| Wave Shaper Apex Angle (degrees) | 37.5-43.3 |
| Thickness of Wave Shaper Retaining Clip (mm) | 2.7-2.9 |

The above description details aspects of explosive devices 10 configured for outputting quasi-planar shock waves at their distal ends 112 in accordance with particular non-limiting representative embodiments of the present disclosure. It will be readily understood by a person having ordinary skill in the relevant art that various modifications can be made to one or more aspects or portions of these and related embodiments without departing from the scope of the present disclosure. As a non-limiting representative example, a multi-piece explosive device 10 can have a first piece 102 that carries the donor charge 200, and a second piece 104 that carries both the wave shaper 300 and the acceptor charge 400, e.g., where such pieces 102, 104 can be coupled to or engaged with each other in a manner set forth above.

Further Aspects of Deployment and Geophysical/Seismic Exploration Systems

As indicated above, in several embodiments QPWGs are configured for wireless communication, e.g., involving MI communication signals and/or radio frequency (RF) communication signals. Further aspects of wireless QPWGs, and manners of QPWG deployment and QPWG initiation that can be particularly well-suited to seismic/geophysical exploration using wireless QPWGs, are described below with reference to FIGS. 27-31.

FIG. 27 is a block diagram of a wireless QPWG 2000 or W-QPWG 2000 in accordance with an embodiment of the present disclosure. A given W-QPWG 2000 includes a cartridge/body structure 1900 having a set of explosive charges therein, e.g., configured for outputting a collimated and/or quasi-planar shock wave across a distal end 1904 of the cartridge/body structure 1900 in a manner set forth above; and a wireless control unit 2020 couplable or coupled to the cartridge/body structure 1900. The W-QPWG 2000 is further configured for carrying an initiation element or device 1310, such as a detonator, that can trigger explosive initiation of an explosive composition carried within the cartridge/body structure 1900, e.g., as also set forth above. The W-QPWG 2000 can be another embodiment of a quasi-planar explosive shock wave generation devices 10h, corresponding or analogous to quasi-planar explosive shock wave generation devices 10a-g described above. The W-QPWG 2000 can be similar, analogous to, or based on portions of an Orica WebGen wireless initiation apparatus or device (Orica International Pte Ltd, Singapore), as individuals having ordinary skill in the relevant art will readily comprehend from the present description and accompanying drawings. Aspects of representative types of WebGen devices are described in U.S. Patent Publication No. 20180231361.

With respect to a given W-QPWG under consideration, its wireless control unit 2020 includes: a power unit 2022 having a set of power sources, e.g., a set of batteries and/or capacitors; a wireless communications unit 2024; an initiation control unit 2026; and possibly or optionally a geolocation unit 2035 configured for receiving and storing geolocation or geospatial position signals/data, such as GNSS signals/coordinates, which can be Global Positioning Satellite (GPS) or similar/analogous types of geolocation/geospatial position signals. For purpose of simplicity and brevity, the geolocation unit 2035 can be referred to as a GPS unit 2035, which is configured for receiving and storing GPS data/signals or coordinates. The power unit 2022, the wireless communication unit 2024, the initiation control unit 2026, and the GPS unit 2035 can be coupled by a set of signal/data pathways, links, lines, or wires, such as a set of signal/data buses, in a manner readily understood by individuals having ordinary skill in the relevant art. The wireless communication unit 2024, the initiation control unit 2026, and the GPS unit 2035 include integrated circuitry, as also readily understood by such individuals.

The wireless communication unit 2024 is configured for at least receiving wireless communication signals (i.e., one-way wireless communication); and in various embodiments is configured for receiving and transmitting or sending wireless communication signals (i.e., two-way wireless communication). As individuals having ordinary skill in the relevant art will readily comprehend, the wireless communication unit 2024 includes a set of antennas configured for receiving and possibly sending wireless communication signals in accordance with the wireless communication mode(s) that the W-QPWG 2000 supports, which encompasses the type(s) of wireless signals by which the W-QPWG 2000 can or is configured to communicate with external/remote devices, apparatuses, subsystems, and/or systems. For instance, the wireless communication unit 2024 can include a set of RF communication antennas; and/or a set of magnetometers and/or MI communication antennas. The wireless communication unit 2024 also includes electronic circuitry configured for decoding and possibly encoding wireless signals, as individuals having ordinary skill in the relevant art will further readily understand.

The initiation control unit 2026 includes a processing unit (e.g., which includes integrated circuitry configurable or configured as a state machine, microcontroller, or microprocessor); a memory (e.g., storing data and program instructions executable by the processing unit); and clock/timing circuitry. The initiation control unit 2026 is configured for processing and executing commands/instructions received from one or more types of external/remote devices, apparatuses, subsystems, and/or systems, including an external/remote blast control unit or controller 2500. Such commands include, but are not limited to, commands directed to establishing one or more of (i) a group identifier (GID) that defines a group of W-QPWGs 2000 to which this given W-QPWG 2000 belongs; (ii) timing data that facilitates or enables precise initiation countdown timing and possibly timing synchronization with respect to or across one or more other W-QPWGs 2000 (e.g., W-QPWGs 2000 sharing the same GID); (iii) ARM and FIRE commands that enable explosive initiation of the W-QPWG 2000 in an intended manner; and (iv) possibly status/state query commands, in response to which the initiation control unit 2026 in association with the wireless communication unit 2024 wirelessly transmits or outputs current or most-recent W-QPWG status/state information directed to an external/remote destination, e.g., the device, apparatus, subsystem, or system that issued the status/state query command(s).

In a given W-QPWG 2000 having a GPS unit 2035, the GPS unit 2035 is configured for receiving and storing GPS signals/data that identify, establish, or define the W-QPWG's current or as-deployed (e.g., in-field on-surface or in-hole) geolocation. The GPS unit 2035 can include, be based on, or be a commercially available GPS chip. Depending upon embodiment details, GPS signals/data corresponding to the given W-QPWG 2000 can be stored in a memory of the GPS unit 2035, and/or the memory of the initiation control unit 2026. The wireless communication unit 2024 can be configured for wirelessly communicating this W-QPWG's geolocation to an external/remote destination, e.g., as part of the initiation control unit 2026 responding or replying to an appropriate status/state query command.

Some embodiments of W-QPWGs 2000 omit or exclude a GPS unit 2035 that is carried by or internal to the W-QPWG 2000 itself. In such embodiments, the geolocation or geospatial position/coordinates of a particular W-QPWG 2000 can be determined manually by a work crew member as part of W-QPWG deployment (e.g., in-field on-surface or in-hole deployment), such as by way of a hand held GPS device 1035 that the work crew member carries, and positions directly or nearly directly over the top of the W-QPWG 2000. The GPS coordinates of the hand held GPS device 1035, corresponding to or sufficiently representing the as-deployed GPS coordinates of this W-QPWG 2000, can be stored in the hand held GPS device 1035 and subsequently wirelessly communicated from the hand held GPS device 1035 to an external or remote destination (e.g., a remote blast control/blast analysis system); and/or wirelessly communicated from the hand held GPS device 1035 to the W-QPWG 2000 by way of the W-QPWG's wireless communication unit 2024 and a wireless communication unit provided by the hand held GPS device 1035, in a manner individuals having ordinary skill in the relevant art will clearly understand.

W-QPWGs 2000 can be used in various types of geophysical/seismic exploration systems. FIGS. 28A-31 are block diagrams showing aspects of geophysical/seismic exploration systems in accordance with particular representative embodiments of the present disclosure.

Figure 28B:
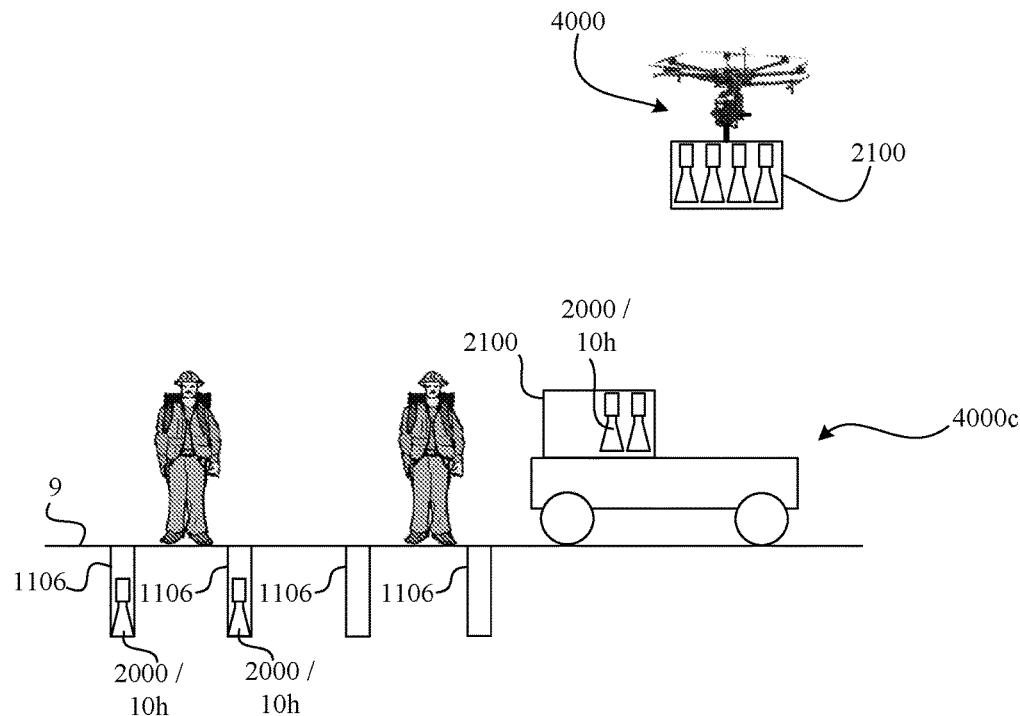

FIGS. 28A-28B are a block diagrams showing portions of W-QPWG based geophysical/seismic exploration deployment systems 2a,b forming part of the system described herein in accordance with particular embodiments of the present disclosure. In an embodiment, such a deployment system 2a,b includes a set of automated and/or autonomous (e.g., unmanned) deployment support vehicles 400, including a set of explosive device/W-QPWG deployment support vehicles 4000a, and set of seismic signal sensor deployment support vehicles 4000b.

As indicated in FIG. 28A, the set of automated/autonomous support vehicles 4000 can include one or more airborne/aerial vehicles, e.g., unmanned aerial vehicles (UAVs), remotely piloted aircraft (RPA), or aerial drones. In several embodiments, an airborne/aerial W-QPWG deployment support vehicle 4000a is configured for picking up a container, box, or magazine 2100 of W-QPWGs 2000 or separate yet couplable/connectable W-QPWG components 2000 (e.g., including a cartridge/body structure 1900 and a wireless control unit 2020 corresponding to each W-QPWG 2000) from a remote site or depot, and carrying or transporting the W-QPWG magazine 2100 to an in-field location at which members of a work crew are progressively positioning W-QPWGs 2000 (a) in boreholes 1106 formed in the ground 9, or (b) on the surface of the earth or ground 9. In several embodiments, a work crew member having a container, bag, or backpack carrying initiation elements 1310 can remove a W-QPWG 2000 or W-QPWG components 2000 from the magazine 2100, and can couple an initiation element 1310 obtained from the container, bag, or backpack to a given counterpart set of W-QPWG components 2000 as part of assembling a complete W-QPWG 2000. The work crew member(s) can subsequently position each complete W-QPWG 2000 at or approximately at an intended location, such as in a particular borehole 1160. As the work crew progressively empties a given W-QPWG magazine 2100a during in-field deployment of W-QPWGs 2000 obtained from the W-QPWG magazine 2100a, the same or another airborne/aerial W-QPWG support vehicle 4000 can deliver/drop off another W-QPWG magazine 2100b to the work crew, and can also pick up and remove an empty W-QPWG magazine 2100 from a current or recent work crew location and return it to the remote site or depot.

As indicated in FIG. 28B, a land-based W-QPWG deployment support vehicle 4000c is configured for land-based transport of one or more W-QPWG magazines 2100, e.g., to the work crew from a remote site or depot; and movement or displacement of the W-QPWG magazine(s) 2100 in coordination with the work crew's physical location as the work crew deploys W-QPWGs 2000 in-field. The land-based W-QPWG support vehicle 4000c includes a platform coupled to one or more power sources, a drive train, a plurality of wheels and/or drive tracks, a control unit, and typically a wireless communication unit, in a manner individuals having ordinary skill in the relevant art will readily comprehend. In certain embodiments, a land-based W-QPWG deployment support vehicle 4000c includes a support surface (e.g., a tray) to which an airborne/aerial W-QPWG deployment support vehicle 4000a can deliver one or more W-QPWG magazines 2100.

The geophysical/seismic exploration deployment systems 2a,b can further include one or more types of devices or apparatuses for forming boreholes 1160, such devices or apparatuses described above and/or at least one compact, portable borehole drilling rig (e.g., a commercially available compact borehole drilling rig) depending upon embodiment, environmental, and situational details, in a manner readily understood by individuals having ordinary skill in the relevant art.

As also shown in FIGS. 28A-28B, in various embodiments the system described herein include a seismic signal sensor deployment support vehicle 4000b in the form of an unmanned vehicle, for instance, an airborne/aerial vehicle such as an airborne/aerial vehicle of the type described above, which is configured for carrying a plurality of seismic signal sensing apparatuses or devices 3000. In some embodiments, the seismic signal sensor deployment support vehicle(s) 4000b can include or be a set of unmanned land-based vehicles, for instance, an unmanned land-based vehicle analogous to the land-based W-QPWG support vehicle 4000c of FIG. 28B, but configured for carrying a plurality of seismic signal sensing apparatuses or devices 3000. In multiple embodiments, a seismic signal sensor deployment support vehicle 4000b is configured for picking up or receiving a container, box, or magazine 3100 of seismic signal sensing apparatuses or devices 3000 from a remote site or depot; and carrying/dropping off the seismic signal sensing device container 3100 to a work crew involved in deploying seismic signal sensing devices 3000 at particular locations. The seismic signal sensor deployment support vehicle 4000b can also pick up or receive an empty seismic signal sensing device container 3100 from a current or recent work crew location, and transport it back to the remote site or depot.

The seismic signal sensing device container 3100 carries a plurality of seismic signal sensing apparatuses or devices, such as conventional commercially available wireless nodal seismic signal sensors and logging/recording devices, e.g., conventional commercially available wireless nodal geophone apparatuses or devices 3000 configured for detecting/sensing and logging/recording seismic signals. The nodal geophone devices 3000 are configurable or configured for coupling with the ground 9 to enable the detection and logging/recording of seismic signals generated by seismic signal sources such as the QPWGs described herein, in a manner readily understood by individuals having ordinary skill in the relevant art.

In particular embodiments, seismic signal sensor deployment can occur by way of an automated or autonomous airborne/aerial vehicle such as described in "Seismic Surveying with Drone-Mounted Geophones" by Srikanth K. V. Sudarshan et al., 2016 IEEE International Conference on Automation Science and Engineering (CASE). In such embodiments, geophones can be coupled with the ground by way of kinetic energy associated with downward motion of the airborne/aerial vehicle. In other embodiments, individual seismic signal sensors can be air-dropped from an automated or autonomous airborne/aerial vehicle (e.g., an inflatable airborne vehicle), and the seismic signal sensors can couple to the ground 9 by way of kinetic energy gained during their drop.

Figure 29A:
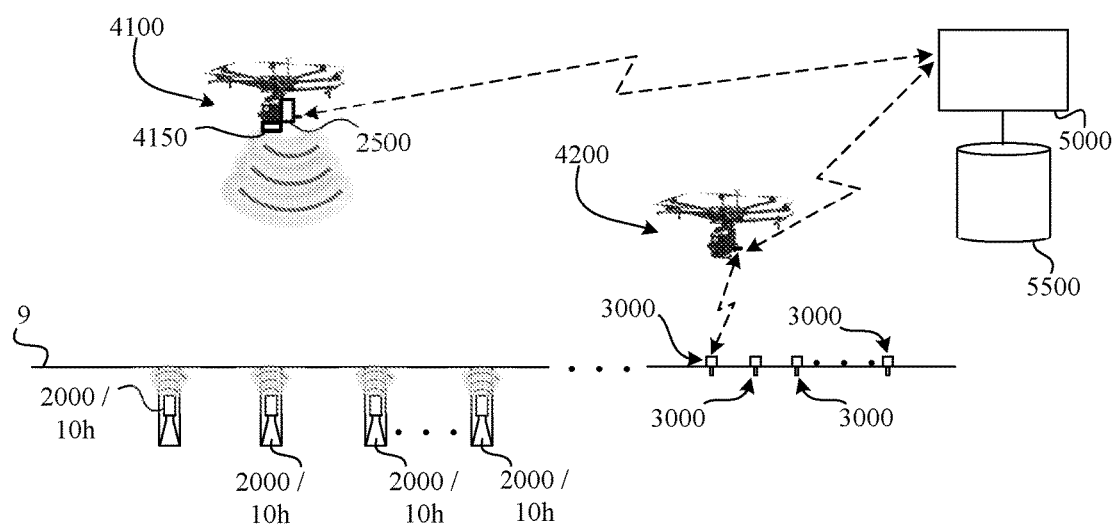

FIGS. 29A-29C are block diagrams of W-QPWG based geophysical/seismic exploration control systems 4a-c forming part of the system described herein in accordance with particular embodiments of the present disclosure. In embodiments such as shown in FIGS. 29A-29B, at least one airborne/aerial blast support vehicle 4100 such as a UAV, RPA, or aerial drone is configured for carrying a blast control unit 2500 configured for wireless communication with W-QPWGs 2000 as well as with a remote blast control/analysis system 5000, which can be coupled to a corresponding database 5500. Depending upon embodiment details, communication between the blast control unit 2500 and the W-QPWGs 2000 can occur by way of MI signal and/or RF signal communication, which can be TTE communication. For instance, as shown in FIG. 29B, in embodiments in which the blast control unit 2500 is configured for communicating with W-QPWG devices 2000 by way of MI signal communication, the airborne/aerial blast support vehicle 4100 is configured for carrying a coil or loop antenna 2520 by which MI signal communication occurs. In embodiments such as shown in FIG. 29C, at least one land-based blast support vehicle 4180 carries the blast control unit 2500. In embodiments in which the blast control unit 2500 communicates with W-QPWGs 2000 by way of MI signals, the land-based blast support vehicle 4180 would also carry a coil or loop antenna in a manner analogous to that indicated for the airborne/aerial blast support vehicle 4100 of FIG. 29B.

The blast control unit 2500 carried by an airborne/aerial or land-based blast support vehicle 4100, 4180 can be configured for communication with the remote blast control/analysis system 5000 by way of conventional through-the-air (TTA) communication, for instance, involving wireless signals communicated from the blast control unit 2500 and/or the aerial blast support vehicle 4100 to one or more intermediary communication devices, apparatuses, systems, and/or communication networks, which can include a number of airborne/aerial and/or land-based devices, apparatuses, and/or systems, and one or more signal/data communication networks, e.g., possibly including the Internet and/or a cellular data communication network.

The blast control unit 2500 can communicate W-QPWG programming information to W-QPWGs 2000. By way of such programming information, particular groups/subsets of W-QPWGs 2000 can be assigned a GID; W-QPWGs 2000 can be provided with reference clock signals/data; and W-QPWGs 2000 can be provided with timing/clock synchronization signals and blast countdown timing signals/data. The blast control unit 2500 can further communicate ARM and FIRE commands to W-QPWGs 2000, where such ARM and FIRE commands are associated with at least one particular GID, such that the QPWGs belonging to the GID(s) can be activated in a coordinated manner, and fired in accordance with an intended firing pattern and firing timing sequence.

In several embodiments, W-QPWGs 2000 can communicate their GPS coordinates to a blast control unit 2500, which can communicate or relay such GPS coordinates to the remote blast control/analysis system 5000.

Further to the foregoing, at least one seismic signal sensing support vehicle, such as an airborne/aerial sensing support vehicle 4200 (e.g., which includes or is based on a UAV, RPA, or aerial drone) is configured for wireless communication, such as by way of RF communication signals, with seismic signal sensing devices 3000 as well as the remote blast control/analysis system 5000. The airborne/aerial sensing support vehicle 4200 is configured for issuing commands to the seismic signal sensing device 3000, for instance, to activate at least some of the seismic signal sensing devices 3000 during particular time intervals, for instance, a time interval during which when a certain group of W-QPWGs 2000 corresponding to a particular GID will be firing such that the seismic signal sensing devices 3000 can sense and record seismic signals corresponding to and synchronised with the firing of the W-QPWGs 2000 belonging to this GID.

Just prior to initiating a given blast, the remote blast control/analysis system 5000 can issue an activation or WAKE instruction intended for at least some seismic signal sensing devices 3000, e.g., one or more particular groups or lines of seismic signal sensing devices 3000, to the airborne/aerial sensing support vehicle 4200, which can communicate a WAKE command to the relevant seismic signal sensing devices 3000, including by moving/flying relative to the selected (group of) seismic signal sensing devices 3000 to improve wireless signal transmission to the seismic signal sensing devices 3000. The WAKE instruction can be associated with or include a current time or time stamp provided by the remote blast control/analysis system 5000.

The remote blast control/analysis system 5000 can subsequently issue a FIRE GROUP instruction that is associated with or which specifies the GID for a particular group of W-QPWGs 2000 to an appropriate blast support vehicle 4100, 4180 that is near, proximate to, or in communication range of this group of W-QPWGs 2000. The FIRE GROUP instruction can include a current time or time stamp corresponding to the remote blast control/analysis system 5000, i.e., a timing stamp to enable the synchronisation with recording of the seismic signals generated by these particular W-QPWGs 2000. The blast support vehicle can move relative to the selected (group of) W-QPWGs 2000 based on their recorded geolocations to improve wireless signal transmission to the W-QPWGs 2000. The blast support vehicle's blast control unit 4200 can issue a FIRE GID command (e.g., a FIRE command specifying a particular GID) to the group of W-QPWGs 2000 corresponding to the GID under consideration, record a local blast support vehicle time or time stamp at which the FIRE GID command was issued, and communicate this local time or time stamp back to the remote blast control/analysis system 5000 to facilitate or enable subsequent analysis of blast signals recorded by seismic signal sensing devices 3000. In embodiments or blast situations in which W-QPWGs 2000 corresponding to the GID under consideration are intended to trigger initiation after a particular or pre-programmed wait or countdown time (e.g., a number of seconds or minutes) following receipt of the FIRE GID command, each W-QPWG 2000 corresponding to this GID can communicate a local W-QPWG time or time stamp along with a unique identifier corresponding to the W-QPWG back to the blast support vehicle 4100, 4180, which can further communicate or relay the individual W-QPWGs identifier and its local W-QPWG time or time stamp to the remote blast control/analysis system 5000, which can further facilitate or enable the analysis of blast signals recorded by seismic signal sensing devices 3000.

Further to the above, as shown in FIGS. 29A-29B, a blast support vehicle 4100 can also carry a set of imaging devices 4150 configured for capturing images of a geographic area or regional/local environment in which QPWGs 2000 corresponding to an intended blast reside (e.g., in-field W-QPWGs 2000 residing in a next intended blast zone). Such images can be captured shortly prior to an intended blast time interval, and the blast support vehicle 4100 and/or the remote blast control/analysis system 5000 can analyse the captured images to determine whether any humans and/or animals appear to be in the geographic area or regional/local environment in which the blast will occur. If human/animal life is present, the blast can be delayed; otherwise, the blast support vehicle 4100 can issue appropriate FIRE commands to such W-QPWGs 2000 to trigger the intended blast. Such wireless communication between W-QPWGs 2000 can facilitate wireless communication reliability and/or verification of as-programmed blast information, and/or timing/clock synchronization among the W-QPWGs 2000 in a particular W-QPWG group or network.

Figure 30:
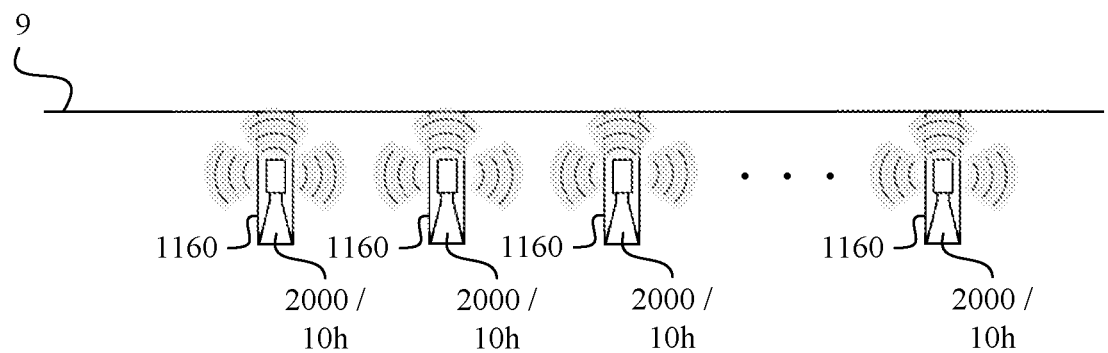
FIG. 30 is a block diagram showing a group of wireless explosive devices deployed in-field and configured for wireless communication with each other.

In addition to wireless communication between blast support vehicles 4100, 4180 and W-QPWGs 2000, in some embodiments W-QPWGs 2000 are configured for communication with each other, e.g., in-field nearest neighbour W-QPWGs 2000. FIG. 30 is a block diagram showing a further W-QPWG communication mode or method in accordance with an embodiment of the present disclosure, in which multiple W-QPWGs 2000 within a group or network of W-QPWGs 2000 (e.g., formed on an ad-hoc basis from multiple W-QPWGs 2000 deployed in-field and corresponding to a particular GID) are configured for wireless communication with each other. In such an embodiment, each W-QPWG 2000 includes a wireless communication unit 2024 configured for wirelessly sending signals to and receiving signals from other W-QPWGs 2000. Wireless communication between W-QPWGs 2000 deployed in-field can occur by way of MI or RF signals, which can be through-the-earth (TTE) signals.

Individuals having ordinary skill in the relevant art will understand that while the preceding description details representative instructions/commands corresponding to the activation/arming and firing of groups of W-QPWGs 2000, systems in accordance with embodiments of the present disclosure can also activate/arm and fire W-QPWGs 2000 on an individual or one-by-one basis.

Figure 31:
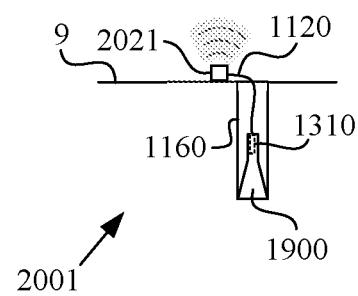
FIG. 31 is a block diagram of an alternate type of wireless explosive device suitable for geophysical/seismic exploration.

Geophysical/seismic exploration deployment systems 2a,b and geophysical/seismic blast control systems 4a-c can be configured for geophysical/seismic exploration by way of other and/or additional types of QPWGs configurable or configured for wireless communication. For instance, FIG. 31 is a block diagram of an alternate W-QPWG 2001 in accordance with an embodiment of the present disclosure, which includes a cartridge/body structure 1900 (which carries an initiation element 1310 therein) that is coupled by way of a cord or wire link 1120 to a wireless communication unit 2021, where the cartridge/body structure 1900 is separated from the wireless communication unit 2021 by a particular or predetermined distance corresponding to the length of the cord/wire link 1120. The wireless communication unit 2021 can include each element of the wireless communication unit 2020 described above with respect to FIG. 27, in a manner readily understood by individuals having ordinary skill in the relevant art. When the cartridge/body structure 1900 of the alternate W-QPWG 2001 resides in a borehole 1160 (e.g., entirely in the borehole 1160), the wireless communication unit 2021 can reside external to or outside of the borehole 1160, for instance, on the ground/earth surface 9 at a particular, selectable, predetermined, or minimum distance away from the borehole 1160. In such embodiments, deployment support vehicles 4000 can carry such wireless communication units 2021 along with cartridge/body structures 1900, e.g., in the same or an additional/different container, box, or magazine 2100 such as described above. Moreover, blast control units 2500 (e.g., carried by blast support vehicles 4100, 4180) can wirelessly communicate with such wireless communication units 2021, in a manner analogous or essentially identical to that described above.

Individuals having ordinary skill in the relevant art will also understand that geophysical/seismic exploration deployment systems 2a,b can be configured for distributing and deploying wire-based QPWGs instead of or in addition to W-QPWGs 2000, in which case deployment support vehicles such as airborne/aerial and/or land-based vehicles carry and distribute wire-based QPWGs and associated componentry such as cords 1120 and wire harnesses 1122.

INTERPRETATION

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavor to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A geophysical or seismic exploration system, comprising:
 a set of explosive device magazines configured for carrying a plurality of explosive device components, wherein the explosive device components are configurable to form individual explosive devices, and wherein each explosive device carries a set of explosive compositions and is configured for collimating an explosive shock wave produced thereby into a quasi-planar shock wave output from a distal end of the explosive device to produce a geophysical or seismic exploration wave;

a set of unmanned explosive device deployment support vehicles, wherein each unmanned explosive device deployment support vehicle comprises an aerial or land-based unmanned vehicle configured for carrying and delivering at least one of the set of explosive device magazines to a first in-field location at which each explosive device is deployable for carrying out a geophysical or seismic exploration operation; and a set of unmanned blast support vehicles, wherein each unmanned blast support vehicle is configured for selectively programming and controlling the explosive initiation of explosive devices deployed at the first in-field location by way of wireless communication with the explosive devices.

2. The geophysical or seismic exploration system of claim 1, further comprising:

a set of seismic signal detector magazines in which wireless nodal geophone devices reside; and a set of unmanned seismic signal detector deployment support vehicles, wherein each unmanned seismic signal detector deployment support vehicle comprises an unmanned aerial or land-based vehicle configured for carrying a seismic signal detector magazine configured for holding a plurality of wireless nodal geophone devices and delivering the seismic signal detector magazine to a second in-field location at which the nodal geophone devices are deployable for carrying out the geophysical or seismic exploration operation.

3. The geophysical or seismic exploration system of claim 2, further comprising a set of unmanned seismic signal sensing support vehicles configured for wireless communication with wireless geophone devices deployed at the second in-field location.

* * * * *